INVENTORS
BILLY BURKE CLAYTON
ROBERT ERNEST FAGEN
WILBUR WOOD MARSHMAN
HORACE MELTON WOLBRECHT

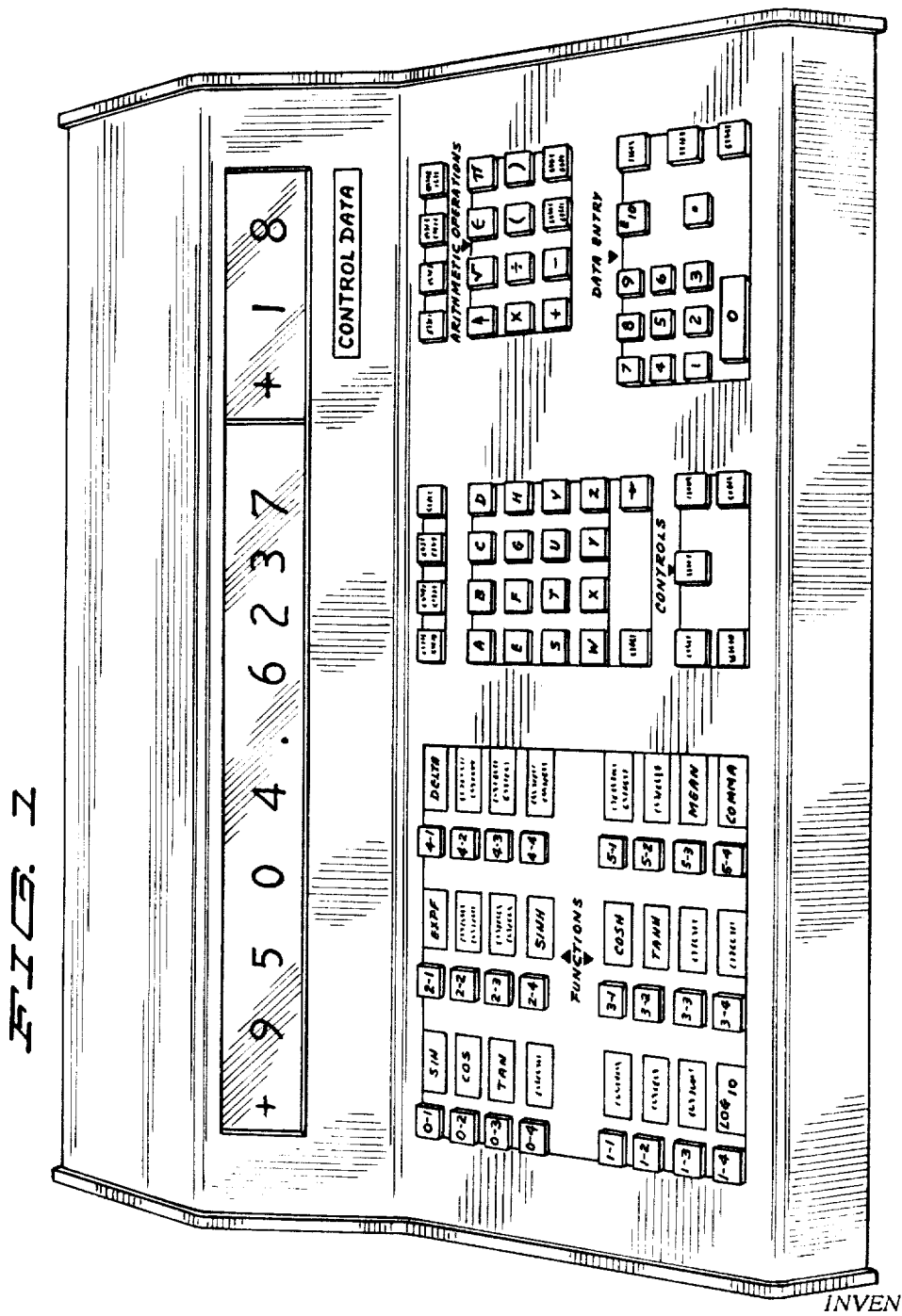

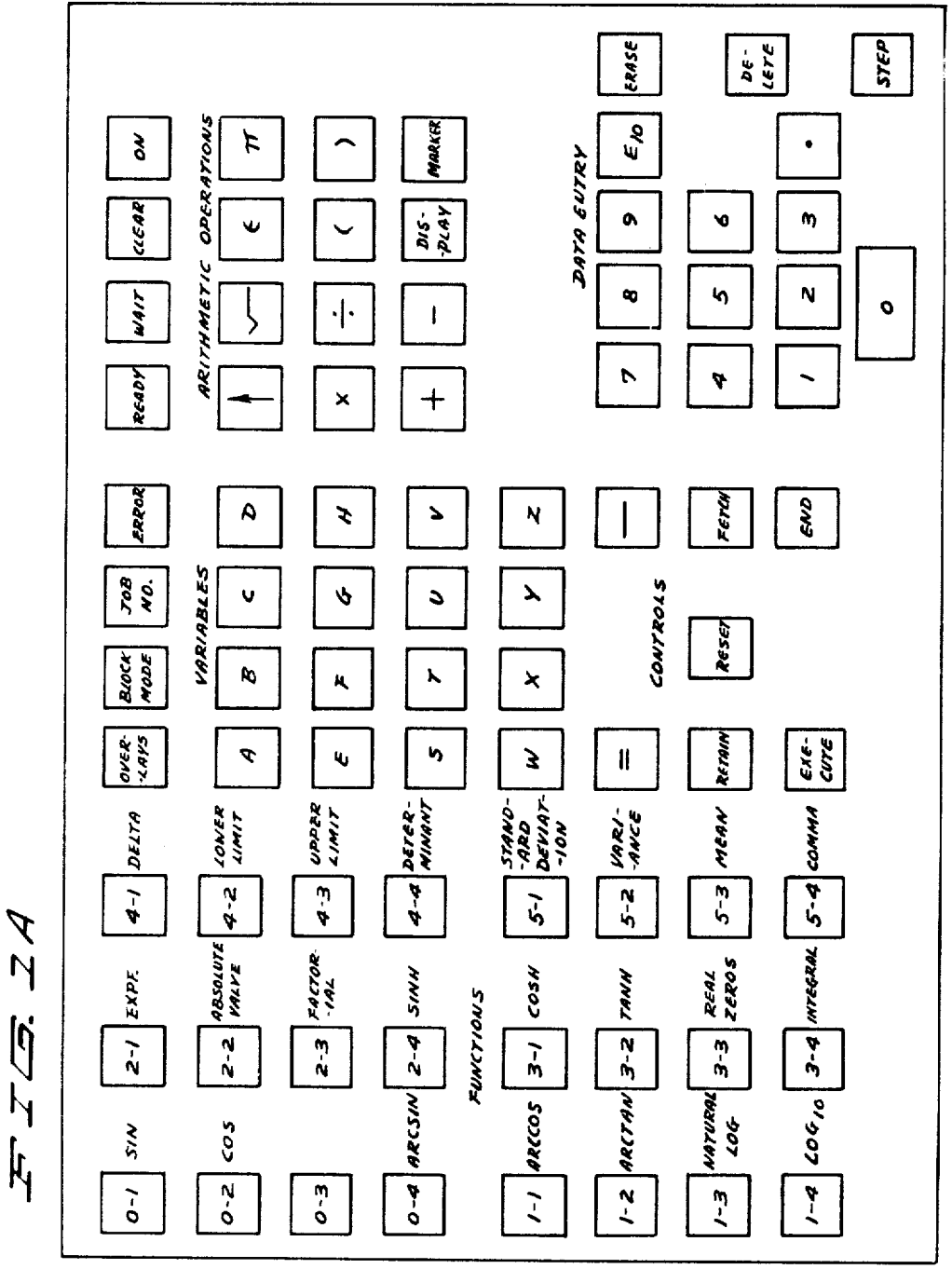

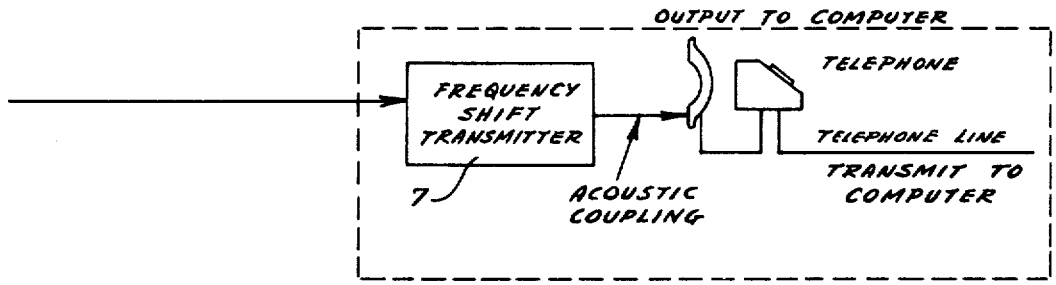
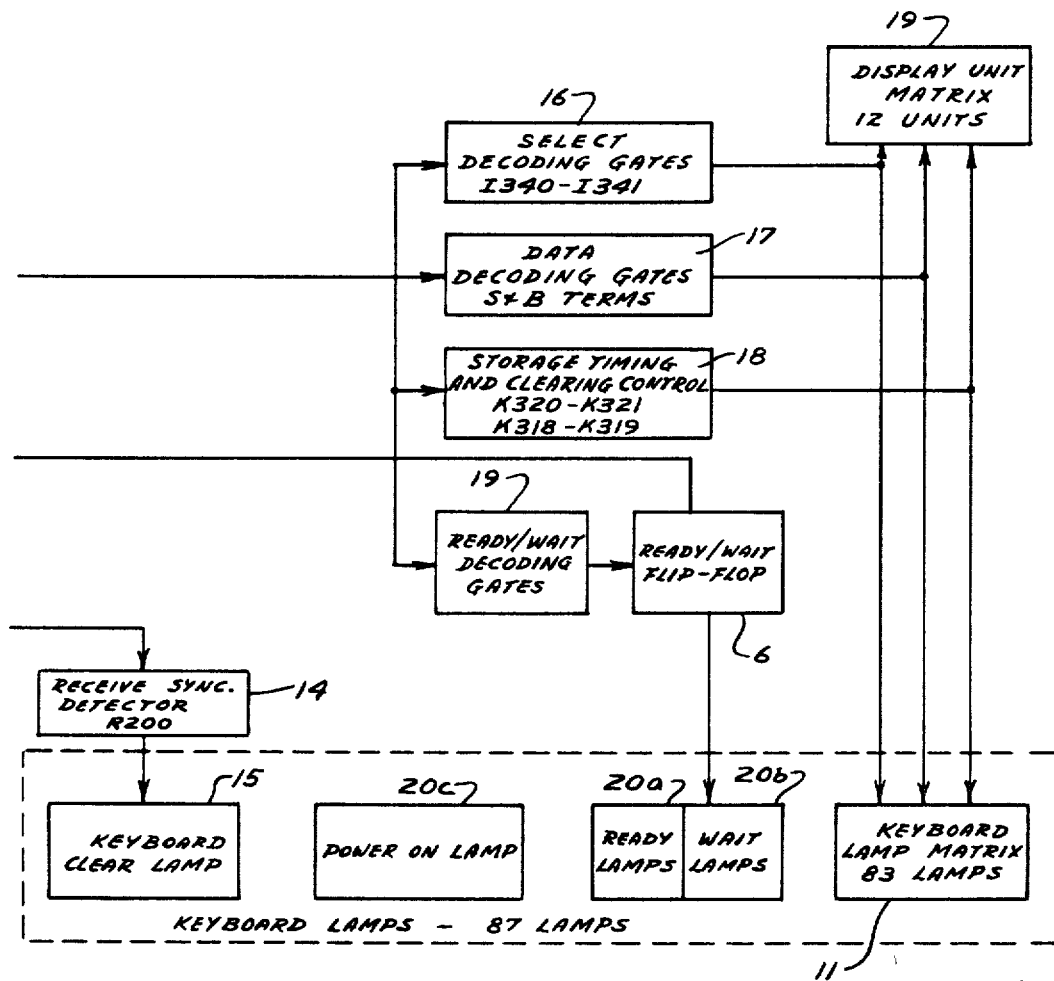
FIG. 2B
INVENTORS
BILLY BURKE CLAYTON
ROBERT ERNEST FAGEN
WILBUR WOOD MARSHMAN
HORACE MELTON WOLBRECHT
ATTORNEY

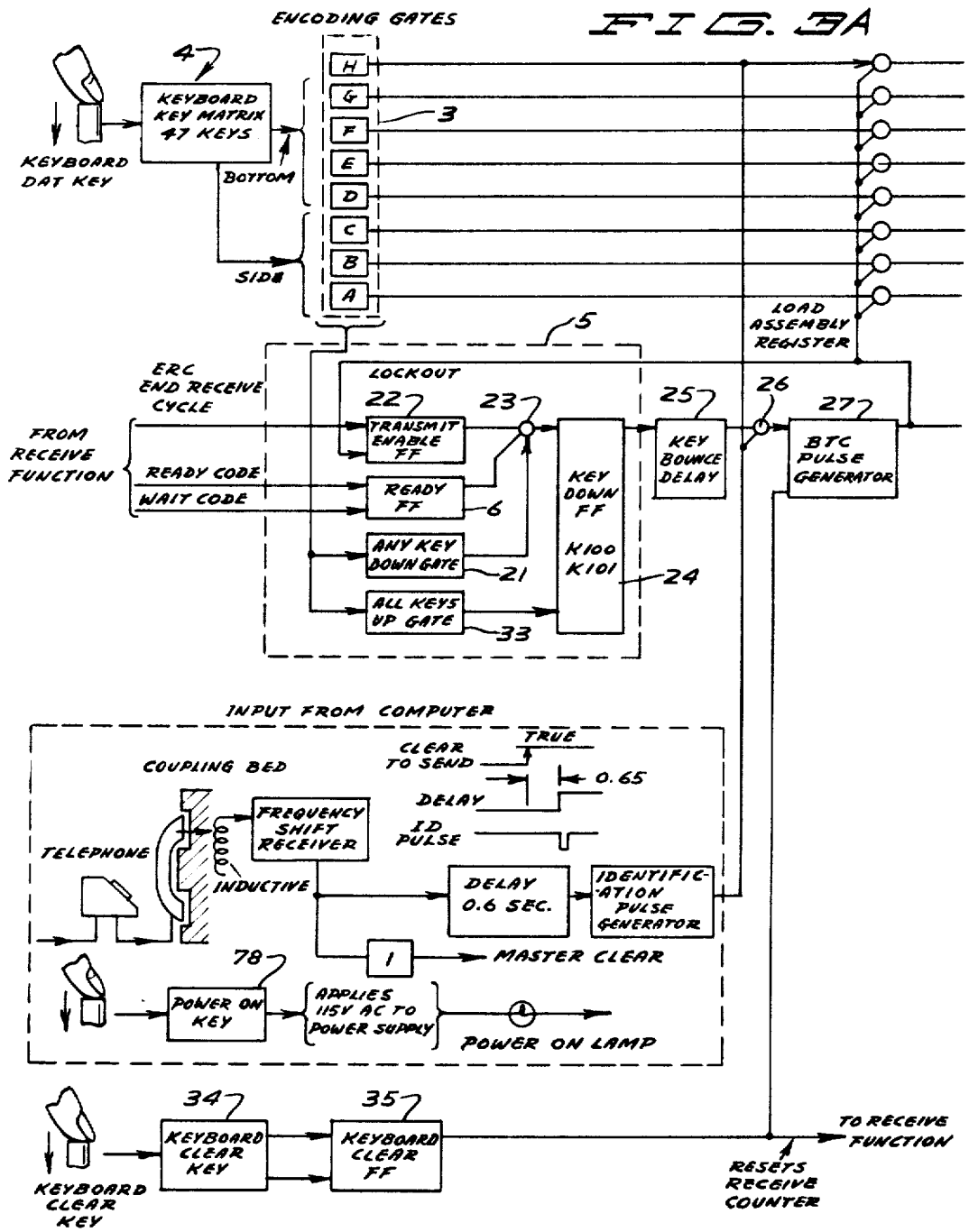

Thomas I. Devine
ATTORNEY

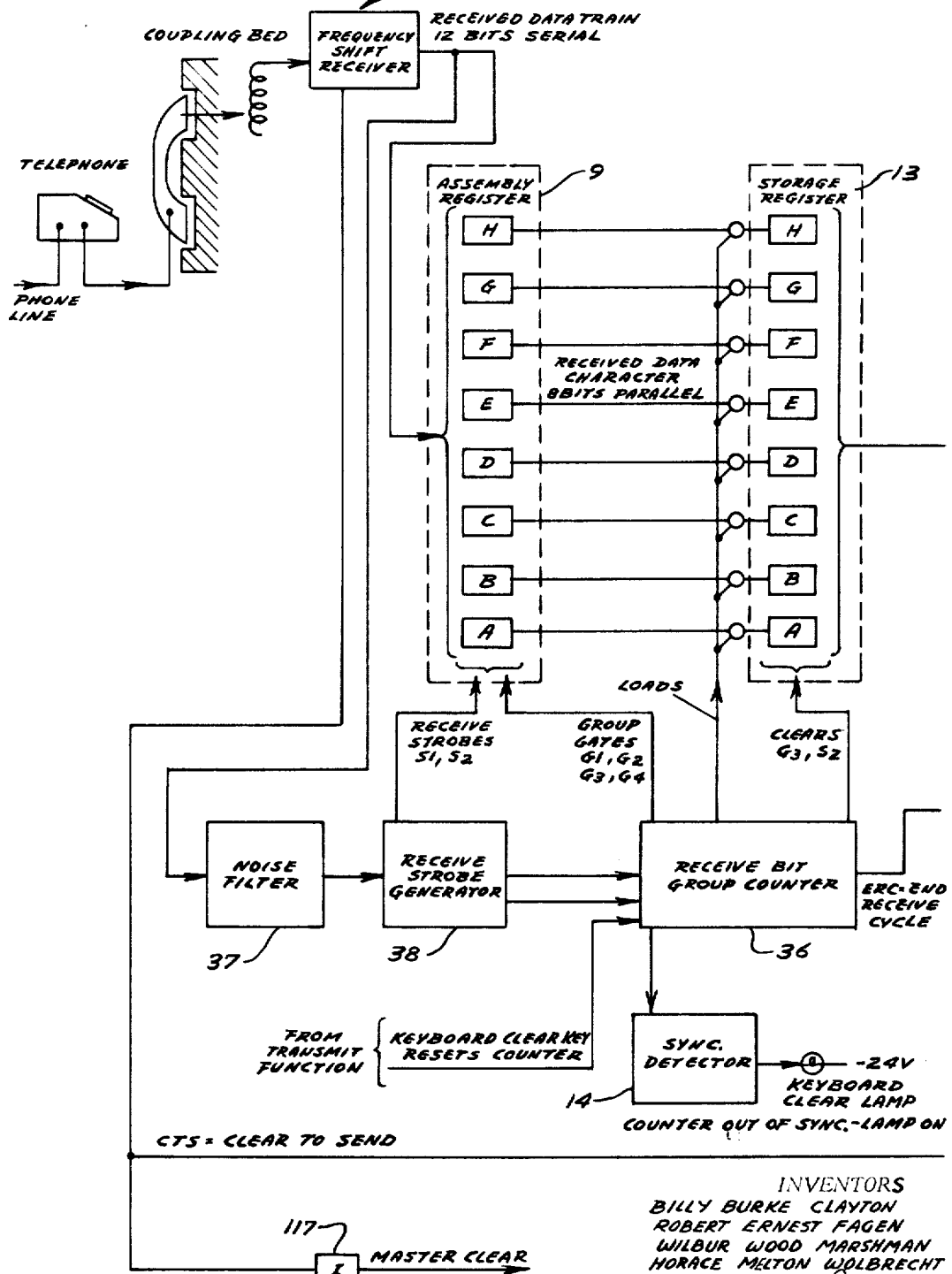

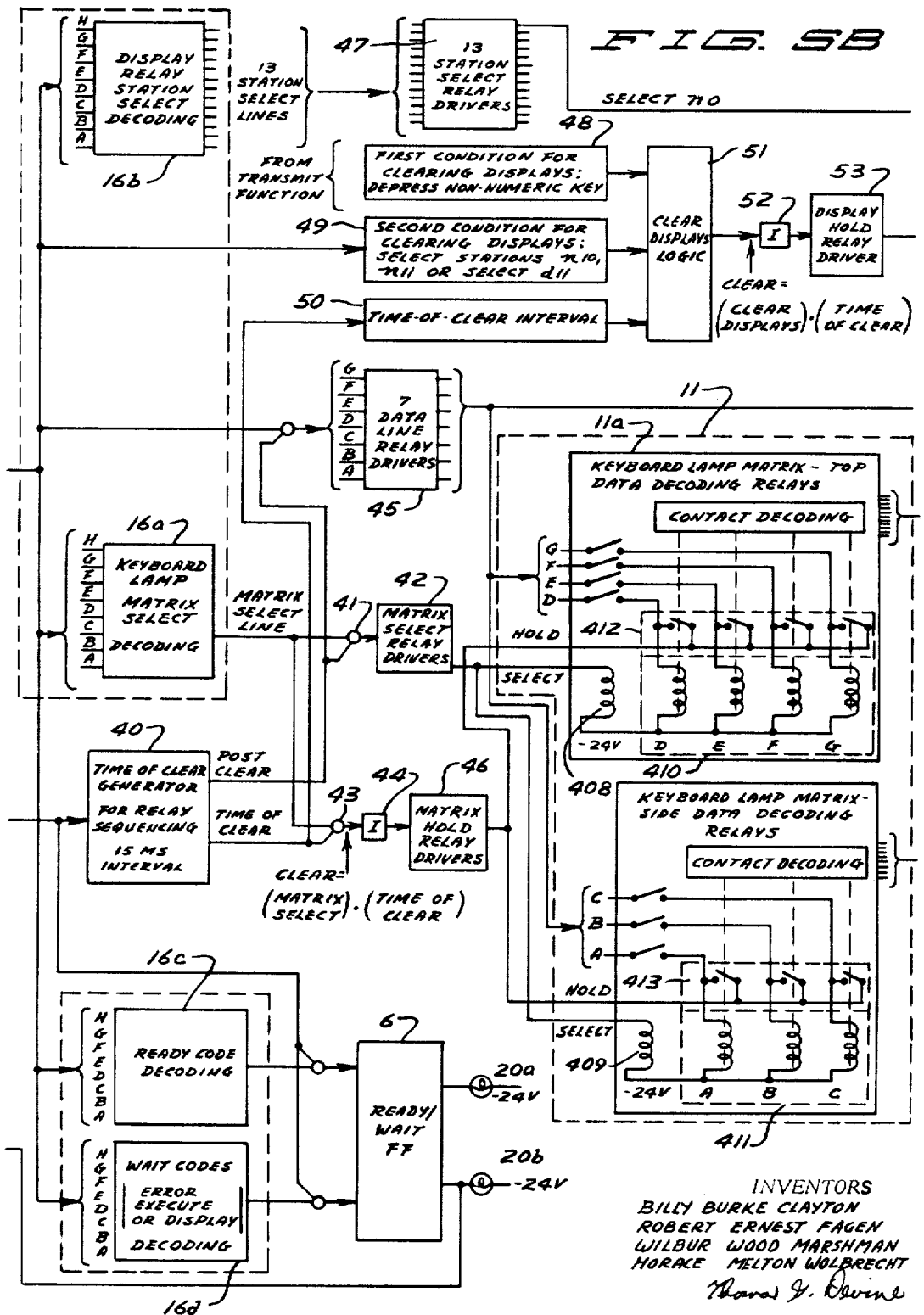

April 23, 1968    B. B. CLAYTON ET AL    3,380,031
REMOTE CALCULATOR
Filed Aug. 10, 1965    33 Sheets-Sheet 10

INVENTORS
BILLY BURKE CLAYTON
ROBERT ERNEST FAGEN
WILBUR WOOD MARSHMAN
HORACE MELTON WOLBRECHT

ATTORNEY

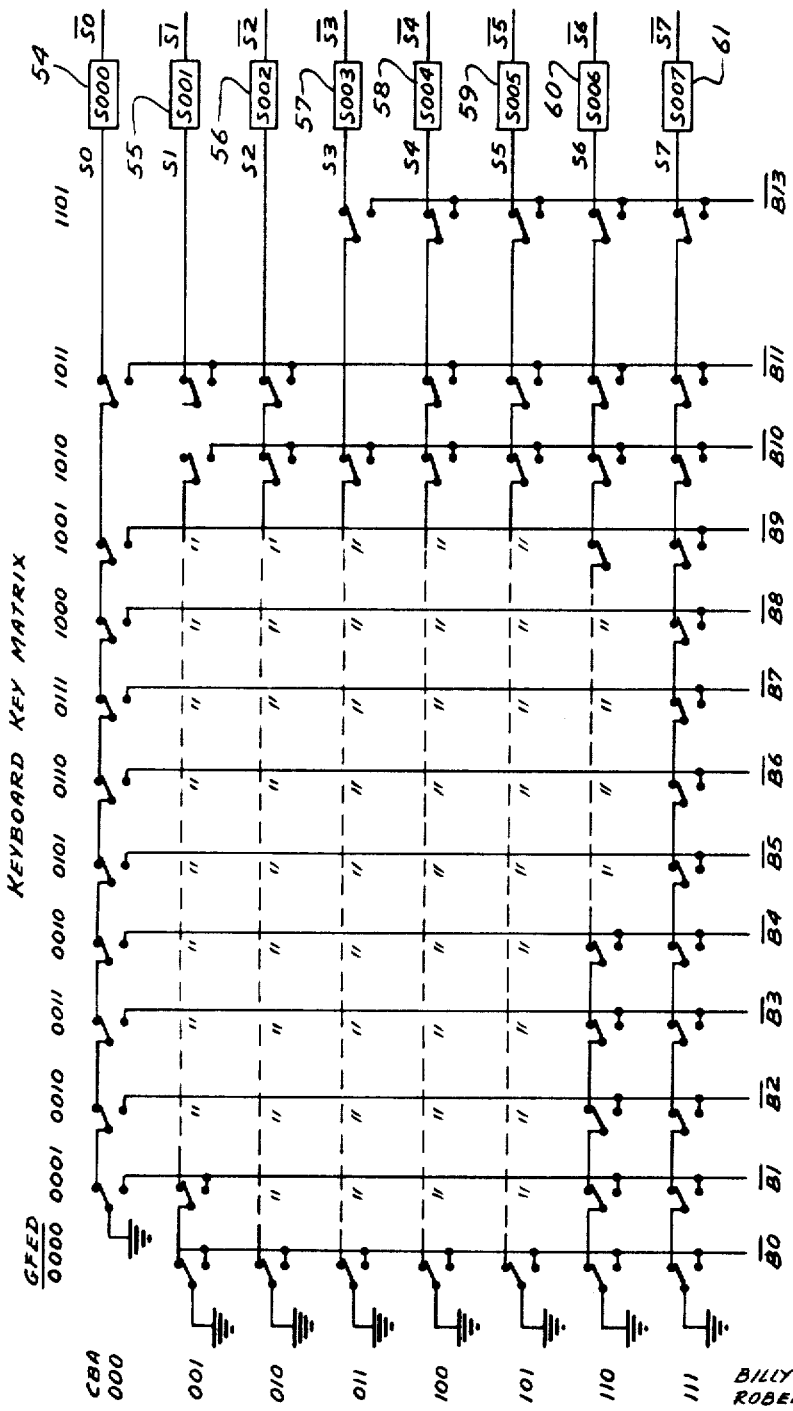

FIG. 8

COMPUTER INPUT CODE FORMAT

| DCBA \ HGFE | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 |  | P | ① | ⑰ | RESET |  |  |  | ID 0 | ID 16 | ID 31 | ID 45 | ID 64 | ID 80 | ID 96 | ID 117 |
| 0001 | A | Q | ② | ⑱ | ERROR | 0 |  |  | 1 | 17 | 32 |  |  |  | 97 | 118 |
| 0010 | B | R | ③ | ⑲ | EXECUTE | 1 |  |  | 2 | 18 |  |  |  |  |  |  |
| 0011 | C | S | ④ | ⑳ | DISPLAY | 2 |  |  | 3 | 19 |  |  |  |  |  |  |
| 0100 | D | T | ⑤ | ㉑ | ) | 3 |  |  | 4 |  |  |  |  |  |  |  |
| 0101 | E | U | ⑥ | ㉒ | ( | 4 |  |  |  |  |  |  |  |  |  |  |
| 0110 | F | V | ⑦ | ㉓ | ) | 5 |  |  |  |  |  |  |  |  |  |  |
| 0111 | G | W | ⑧ | ㉔ | → | 6 |  |  |  |  |  |  |  |  |  |  |
| 1000 | H | X | ⑨ | ㉕ | = | 7 |  |  |  |  |  |  |  |  |  |  |
| 1001 | I | Y | ⑩ | ㉖ | ↑ | 8 |  |  |  |  |  |  |  |  |  |  |
| 1010 | J | Z | ⑪ | ㉗ | ÷ | 9 |  |  |  |  |  |  |  |  |  |  |
| 1011 | K | Δ | ⑫ | ㉘ | × |  | MARKER |  |  |  |  |  |  |  |  |  |
| 1100 | L | LOWER LIMIT | ⑬ | ㉙ | − | END | ERASE |  |  |  |  |  |  |  |  |  |
| 1101 | M | UPPER LIMIT | ⑭ | ㉚ | + | JOB NO. | DELETE |  | 13 |  |  |  |  |  |  | 130 |
| 1110 | N | θ | ⑮ | e | E₁₀ | FETCH | . |  | 14 | 30 |  |  |  |  | 94 | 115 | 131 |
| 1111 | O |  | ⑯ | π | LIBRARY FUNCTION | RETAIN | STEP |  | ID 15 | ID 31 | ID 47 | ID 63 | ID 79 | ID 95 | ID 116 | ID 132 |

KEYBOARD KEY CODE GROUP — H BIT = 0 (A)

IDENTIFICATION CODE GROUP — H BIT = 1 (B)

FIG. 9

KEYBOARD KEY LABEL MATRIX

| CBA \ GFED | 0000 | 0001 | 0010 | 0011 | 0100 | 0101 | 0110 | 0111 | 1000 | 1001 | 1010 | 1011 | 1101 |
|---|---|---|---|---|---|---|---|---|---|---|---|---|---|
| 000 |  | H | P | X | ① | ⑨ | ⑰ | ㉕ | RESET | = |  | 7 |  |
| 001 | A | I | Q | Y | ② | ⑩ | ⑱ | ㉖ | ERROR | ↑ | 0 | 8 |  |
| 010 | B | J | R | Z | ③ | ⑪ | ⑲ | ㉗ | EXECUTE | ÷ | 1 | 9 |  |
| 011 | C | K | S | Δ | ④ | ⑫ | ⑳ | ㉘ | DISPLAY | × | 2 |  | MARKER |
| 100 | D | L | T | LOWER LIMIT | ⑤ | ⑬ | ㉑ | ㉙ | ) | − | 3 | END | ERASE |
| 101 | E | M | U | UPPER LIMIT | ⑥ | ⑭ | ㉒ | ㉚ | ( | + | 4 | JOB NUMBER | DELETE |
| 110 | F | N | V | θ | ⑦ | ⑮ | ㉓ | e | ) | $E_{10}$ | 5 | FETCH | . |
| 111 | G | O | W |  | ⑧ | ⑯ | ㉔ | π | → | LIBRARY FUNCTION | 6 | RETAIN | STEP |

KEYBOARD LAMP LABEL MATRIX

| CBA \ GFED | 0000 | 0001 | 0010 | 0011 | 0100 | 0101 | 0110 | 0111 | 1000 | 1001 | 1011 |
|---|---|---|---|---|---|---|---|---|---|---|---|
| 000 |  | H | P | X | ① | ⑨ | ⑰ | ㉕ | RESET | = |  |
| 001 | A | I | Q | Y | ② | ⑩ | ⑱ | ㉖ | ERROR | ↑ |  |
| 010 | B | J | R | Z | ③ | ⑪ | ⑲ | ㉗ | EXECUTE | ÷ |  |
| 011 | C | K | S | Δ | ④ | ⑫ | ⑳ | ㉘ | DISPLAY | × |  |
| 100 | D | L | T | LOWER LIMIT | ⑤ | ⑬ | ㉑ | ㉙ | ) | − | END |
| 101 | E | M | U | UPPER LIMIT | ⑥ | ⑭ | ㉒ | ㉚ | ( | + | JOB NUMBER |
| 110 | F | N | V | θ | ⑦ | ⑮ | ㉓ | e | ) | $E_{10}$ | FETCH |
| 111 | G | O | W | NO ANSWER | ⑧ | ⑯ | ㉔ | π | → | LIBRARY FUNCTION | RETAIN |

COMPUTER OUTPUT CODE FORMAT

HGFE

| DCBA | 0000 | 0001 | 0010 | 0011 | 0100 | 0101 | 0110 | 0111 | 1000 | 1001 | 1010 | 1011 | 1100 | 1101 | 1110 | 1111 |
|------|------|------|------|------|------|------|------|------|------|------|------|------|------|------|------|------|
| 0000 | ALL 0 | P | ① | ⑰ | RESET | | | | | | | | | | | |
| 0001 | A | Q | ② | ⑱ | ERROR | | | | | | | | | | | |
| 0010 | B | R | ③ | ⑲ | DELETE | | | | | | | | | | | |
| 0011 | C | S | ④ | ⑳ | DISPLAY | G | | | | | | | | | | |
| 0100 | D | T | ⑤ | ㉑ | , | E | | | | | | | | | | |
| 0101 | E | U | ⑥ | ㉒ | ( | $\bar{D}$ | | | | | | | | | | |
| 0110 | F | V | ⑦ | ㉓ | ) | | | | | | | | | | | |
| 0111 | G | W | ⑧ | ㉔ | → | | G | F | | | | H | | | | |
| 1000 | H | X | ⑨ | ㉕ | = | | | | | | | | | | | |
| 1001 | I | Y | ⑩ | ㉖ | ↑ | G | | | | | | | | | | |
| 1010 | J | Z | ⑪ | ㉗ | ÷ | E | | | | | | | | | | |
| 1011 | K | Δ | ⑫ | ㉘ | × | $\bar{C}$ | | | | | | | | | | |
| 1100 | L | LOWER LIMIT | ⑬ | ㉙ | − | END | | | | | | | | | | |
| 1101 | M | UPPER LIMIT | ⑭ | ㉚ | + | JOB NO. | | | | | | | | | | |
| 1110 | N | ⊖ | ⑮ | e | E10 | FETCH | | | | | | | | | | |
| 1111 | O | NO ANS-WER | ⑯ | 77 | LIBRARY | RETAIN | | | | | | | | | | |

KEYBOARD LAMP CODE GROUP A

DISPLAY CODE GROUP B

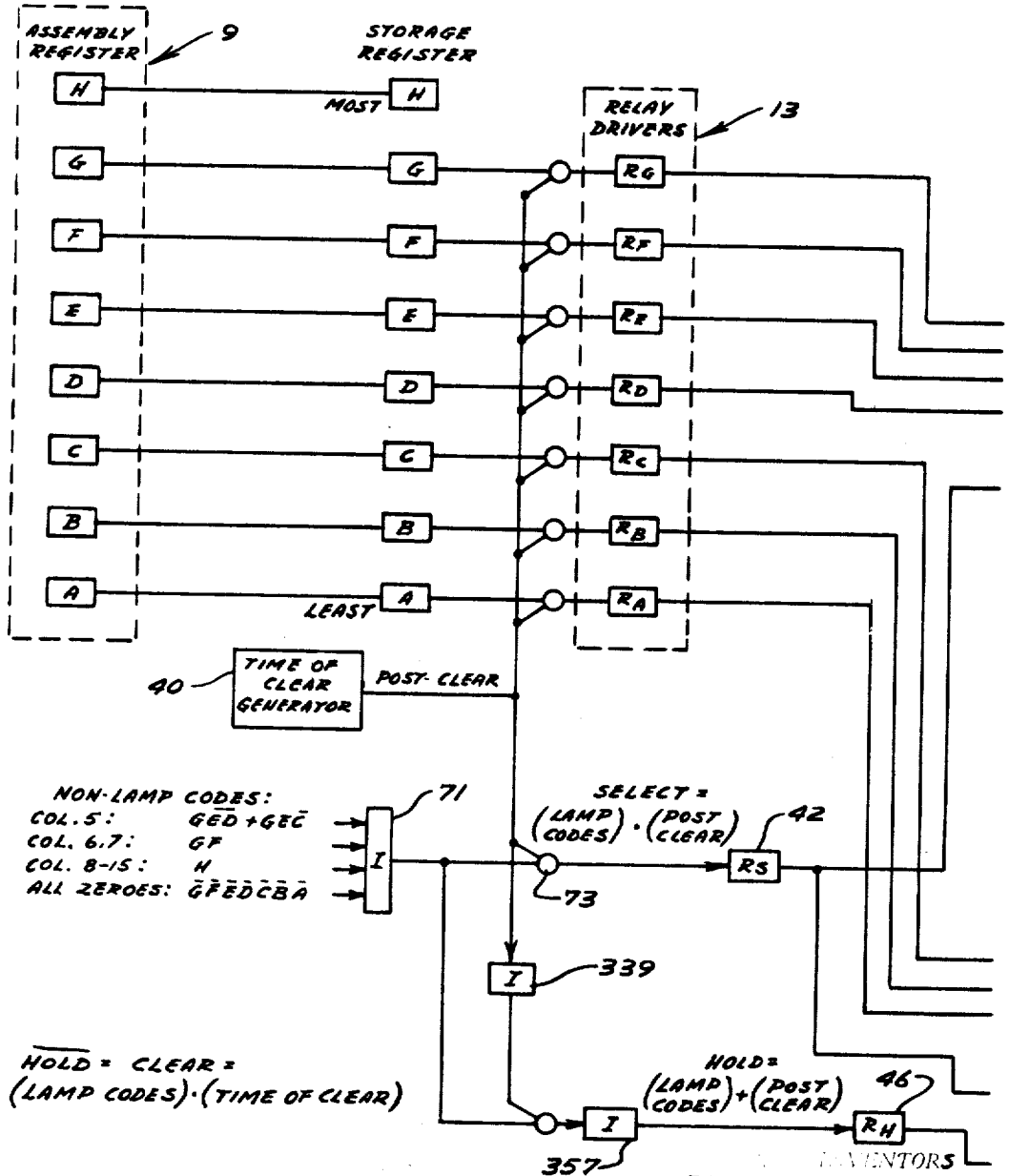

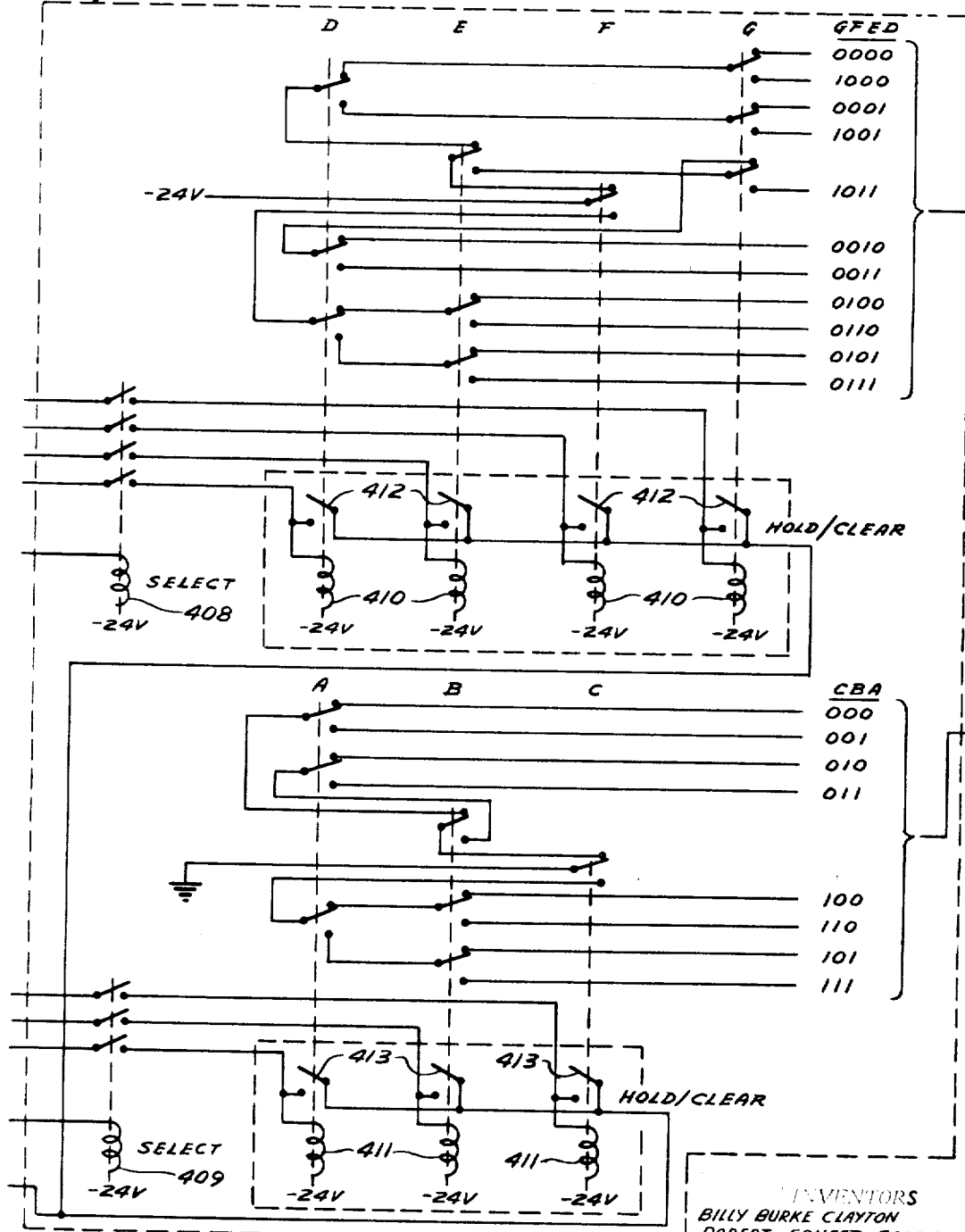

FIG. 12C
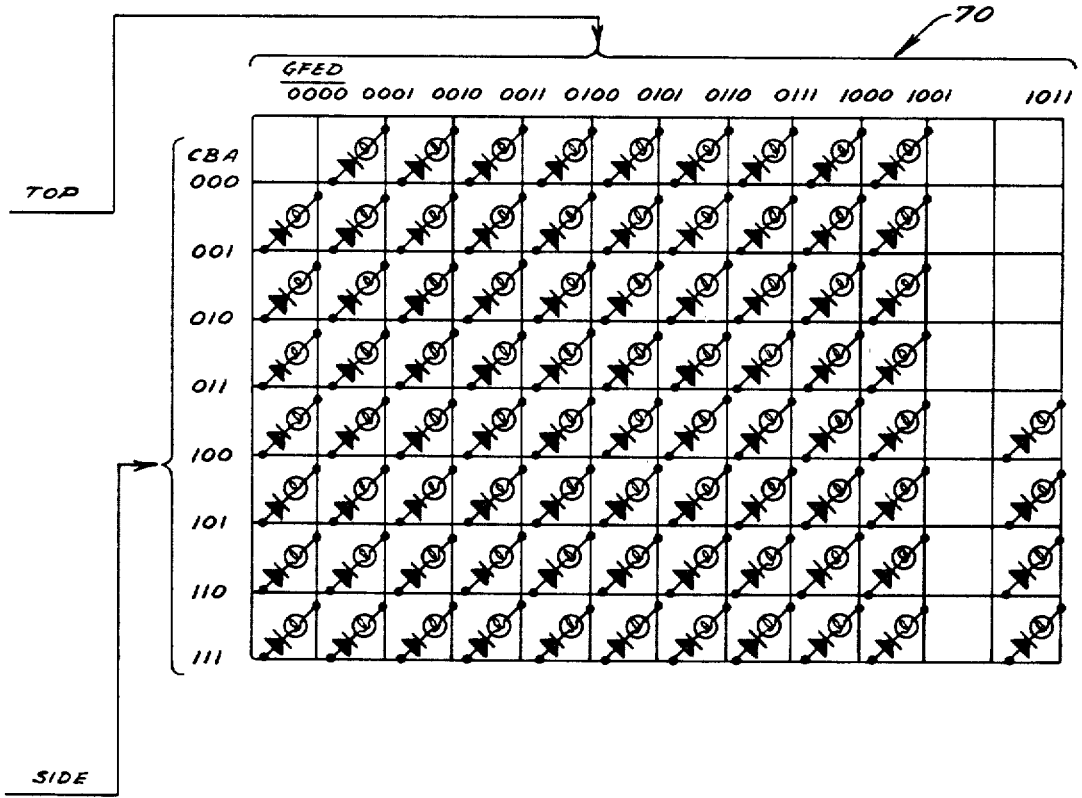
FIG. 34
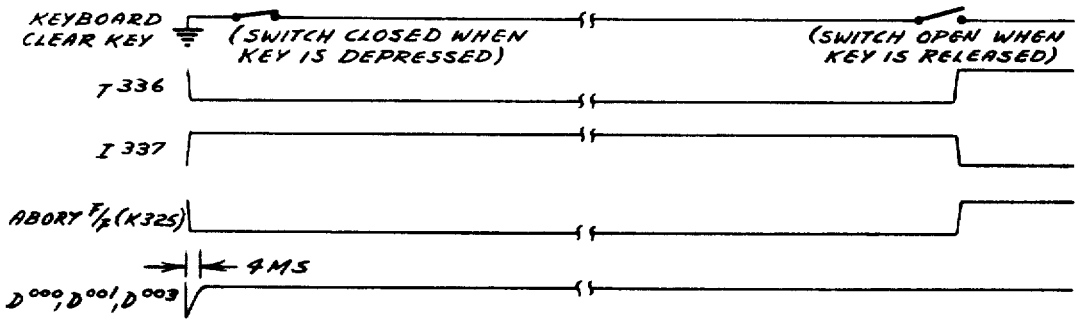
ALL ZERO'S ARE LOADED INTO THE $I_0$ REGISTER. FROM THIS POINT ON TRANSMISSION IS THE SAME AS TRANSMIT TIMING CHART.
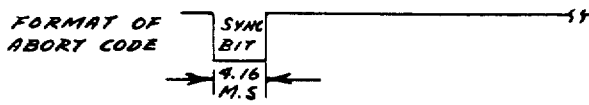
BILLY BURKE CLAYTON
ROBERT ERNEST FAGEN
WILBUR WOOD MARSHMAN
HORACE MELTON WOLBRECHT
Thomas G. Devine
ATTORNEY

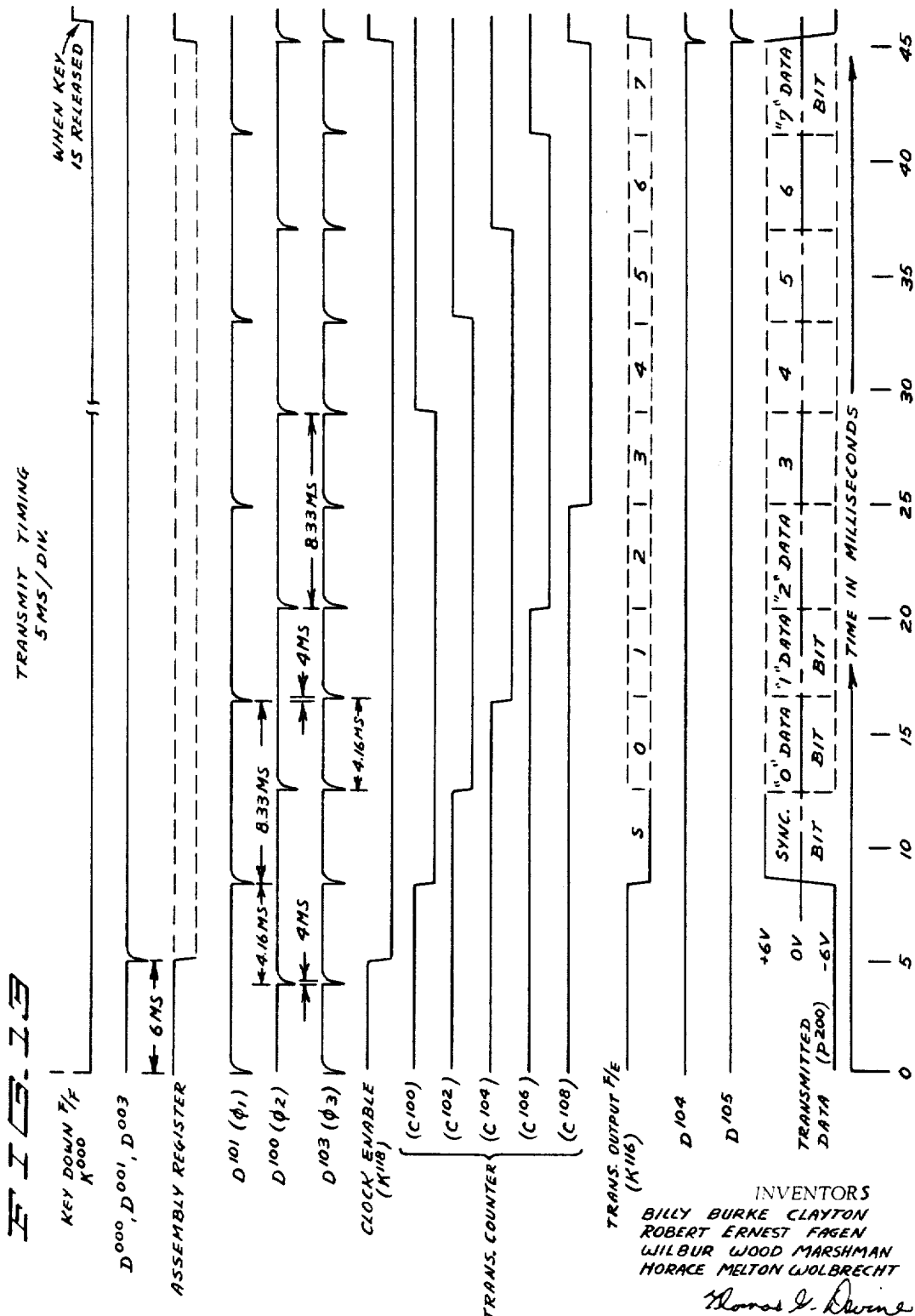

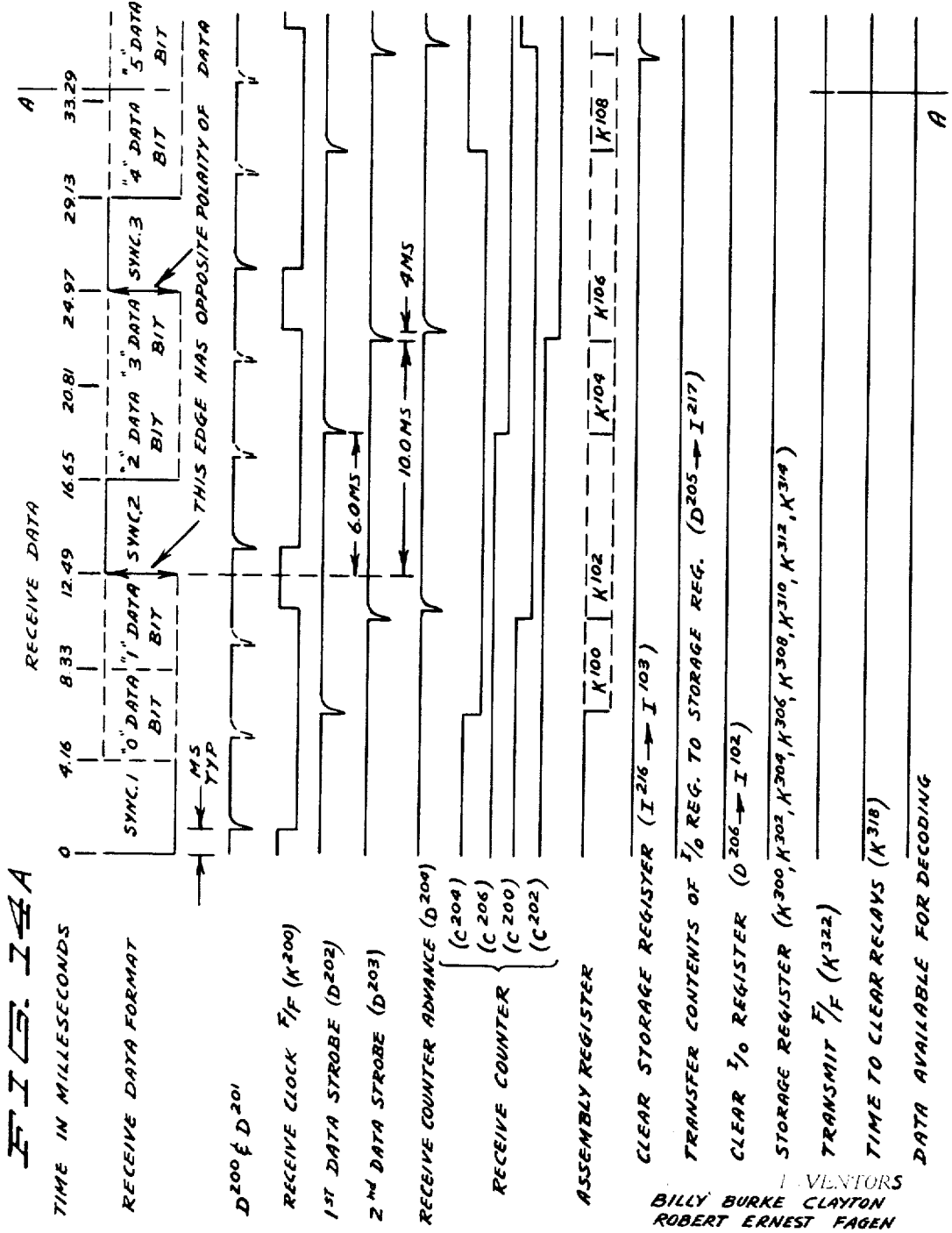

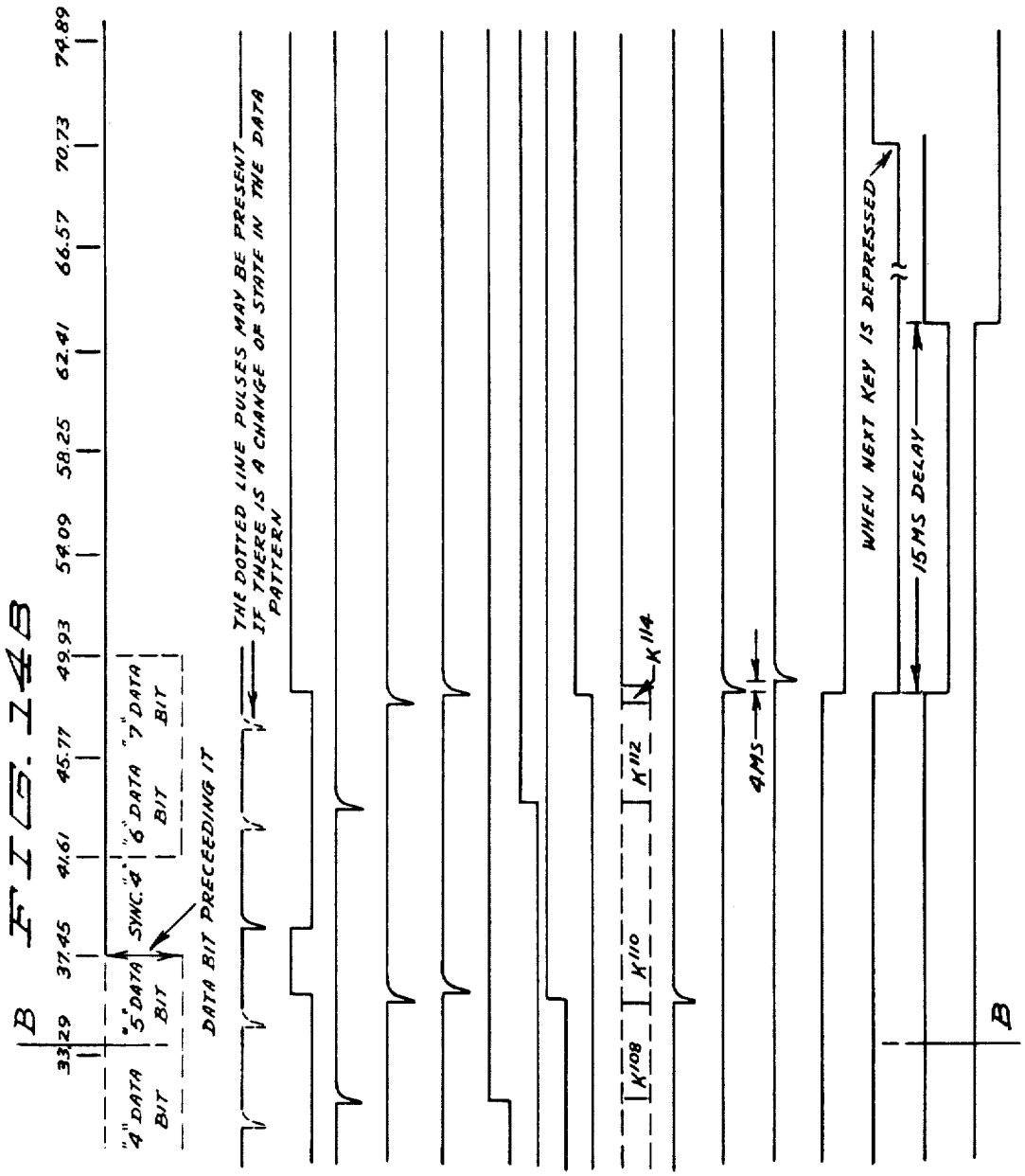

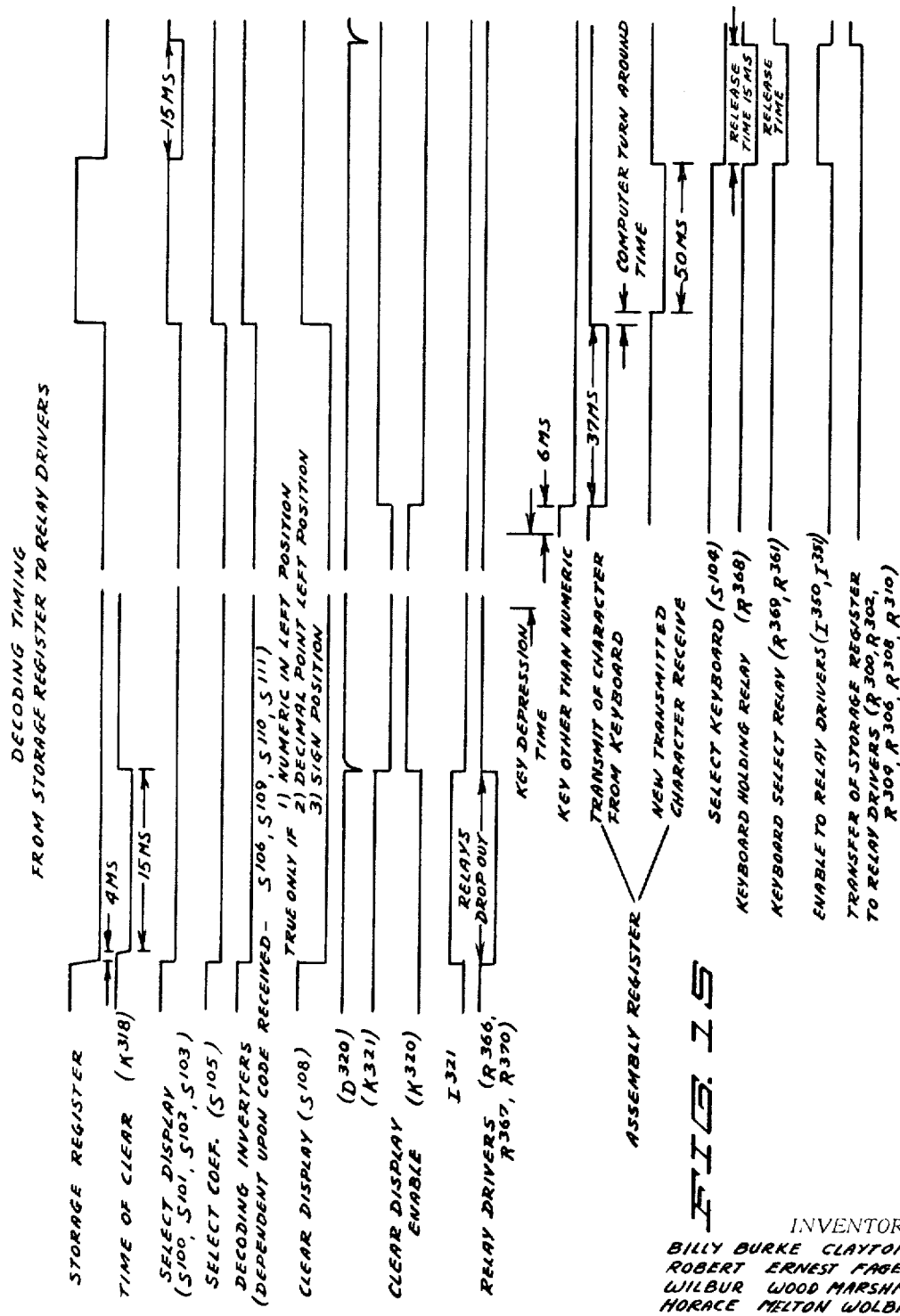

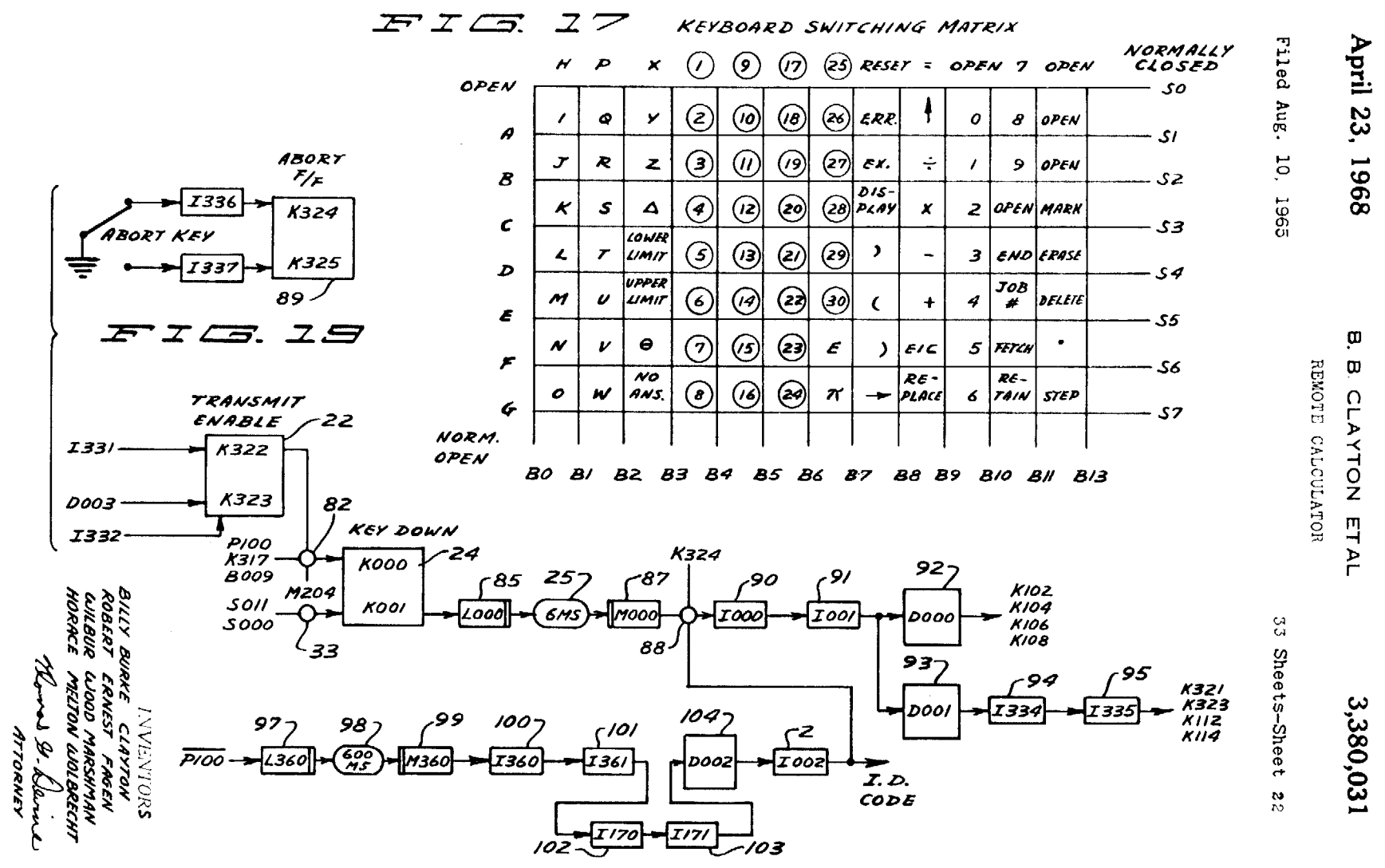

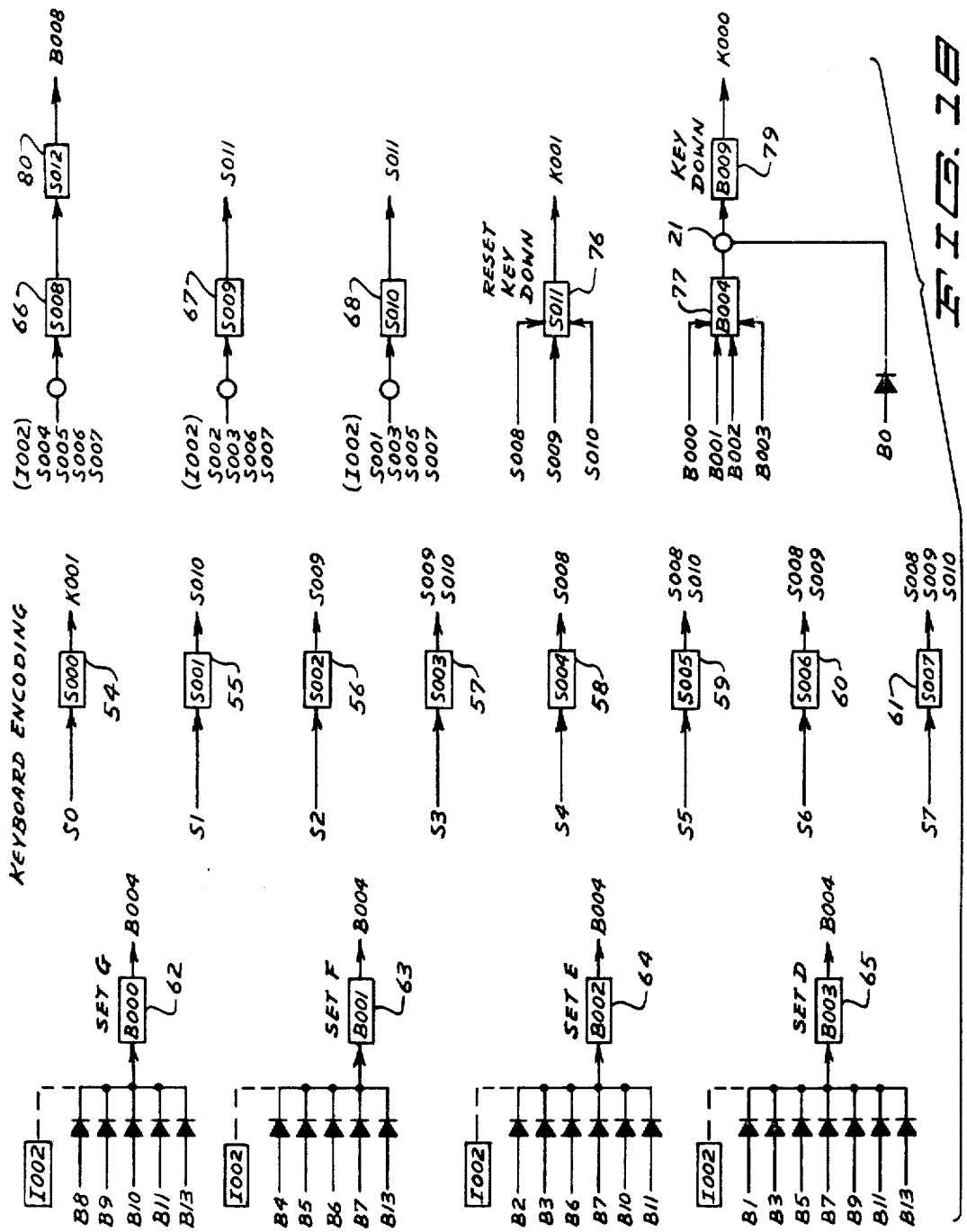

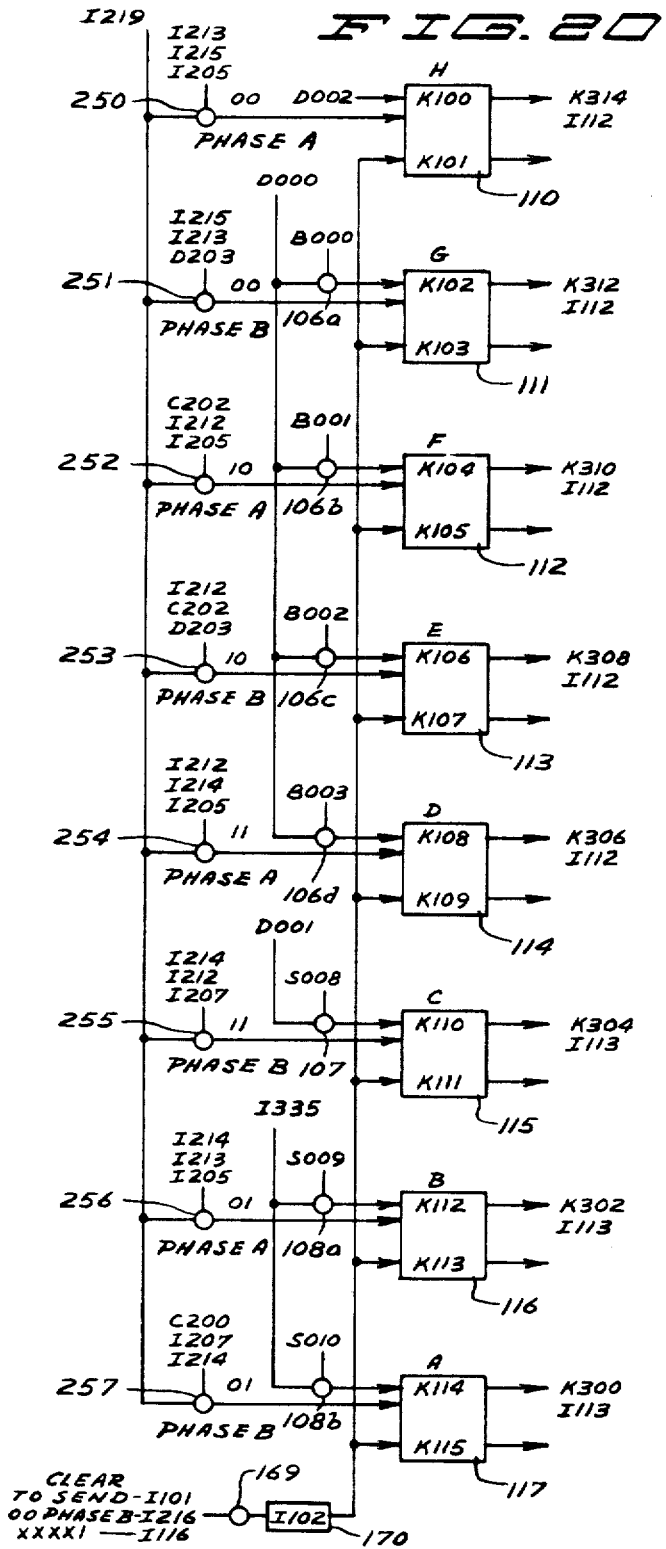

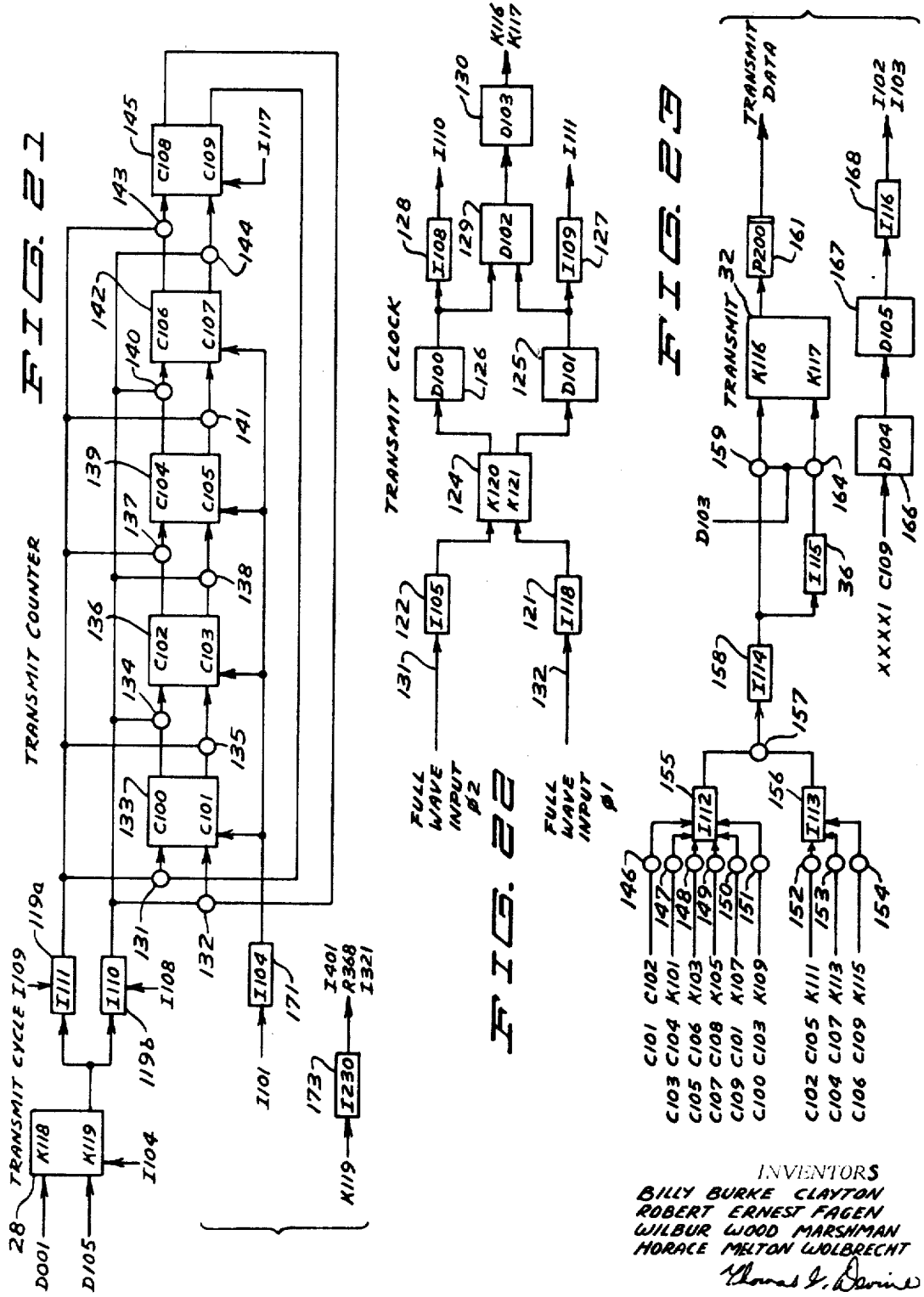

INVENTORS
BILLY BURKE CLAYTON
ROBERT ERNEST FAGEN
WILBUR WOOD MARSHMAN
HORACE MELTON WOLBRECHT

Thomas G. Devine
ATTORNEY

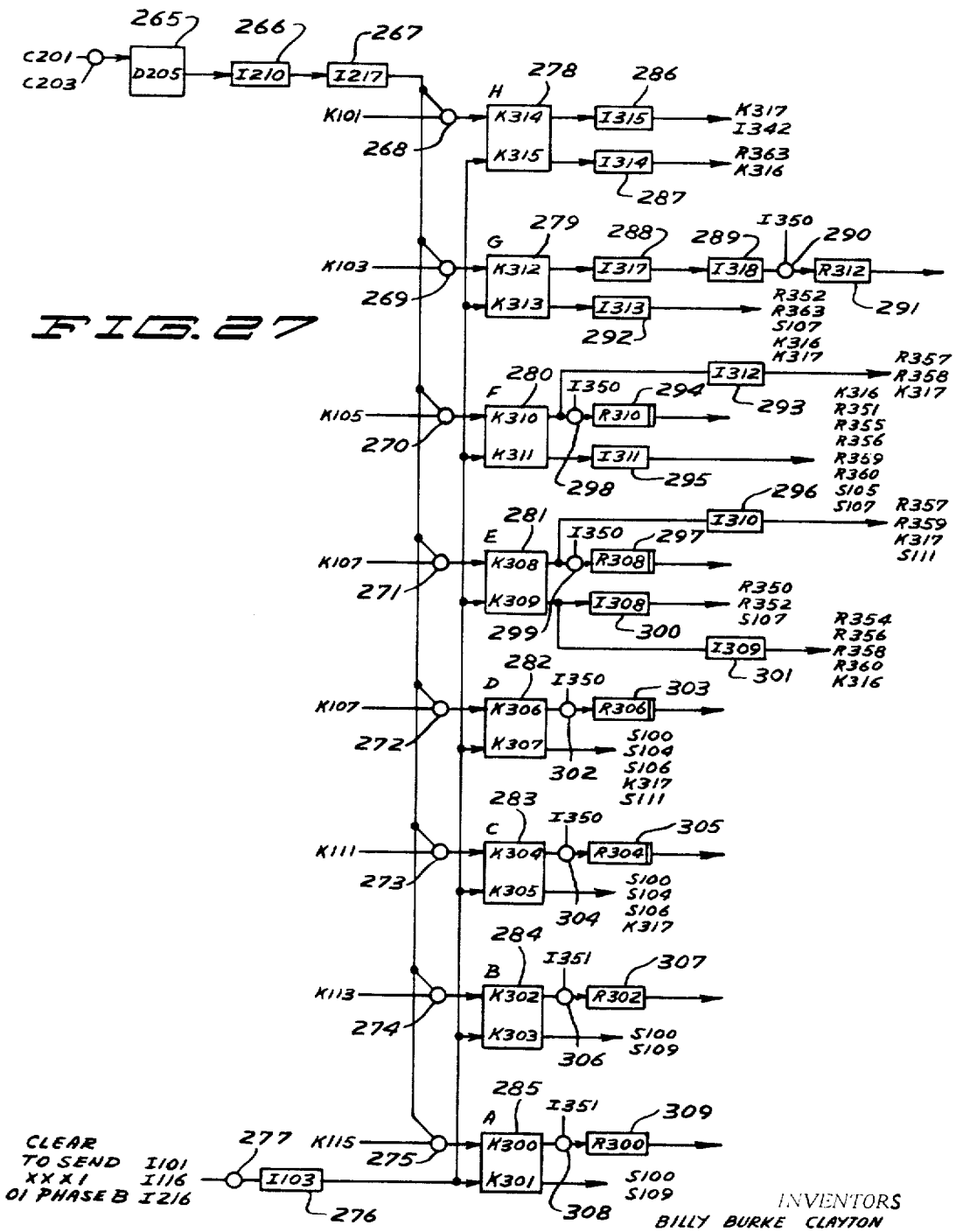

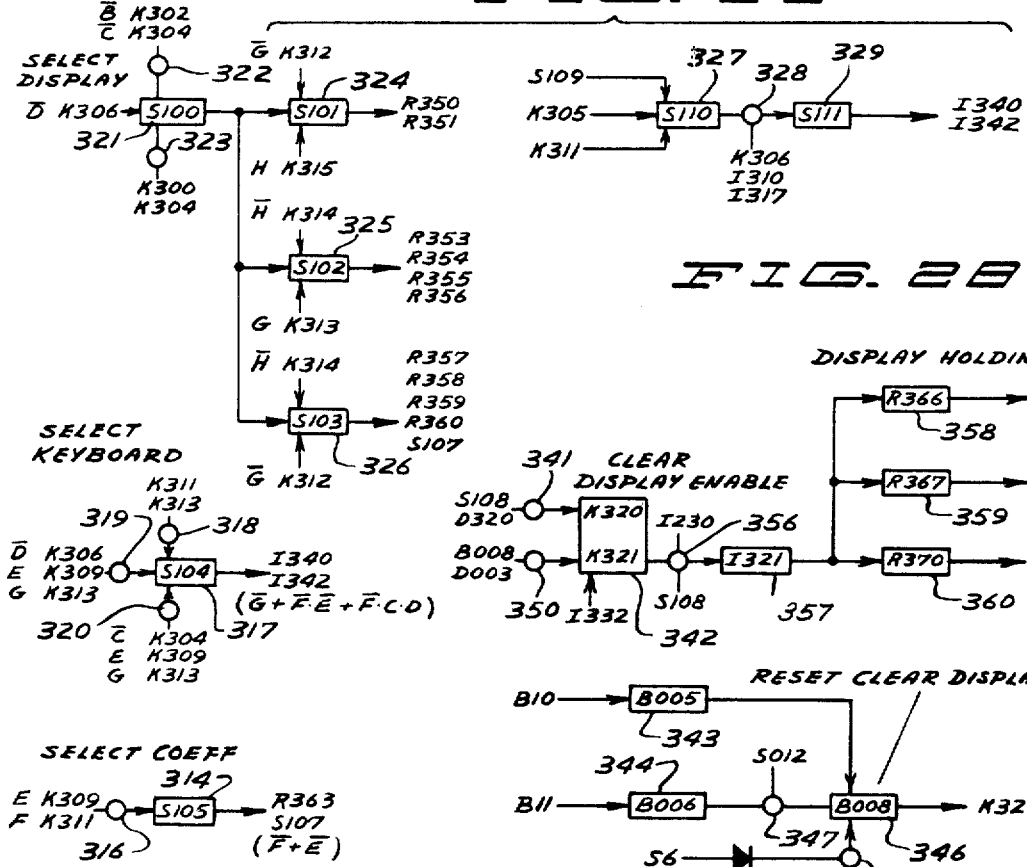
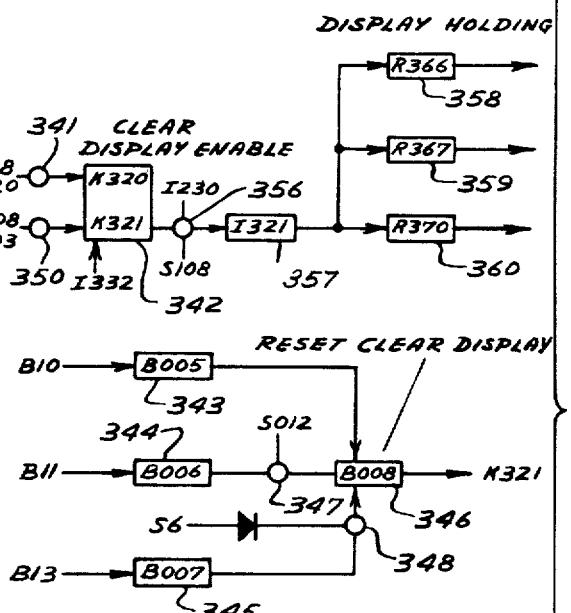
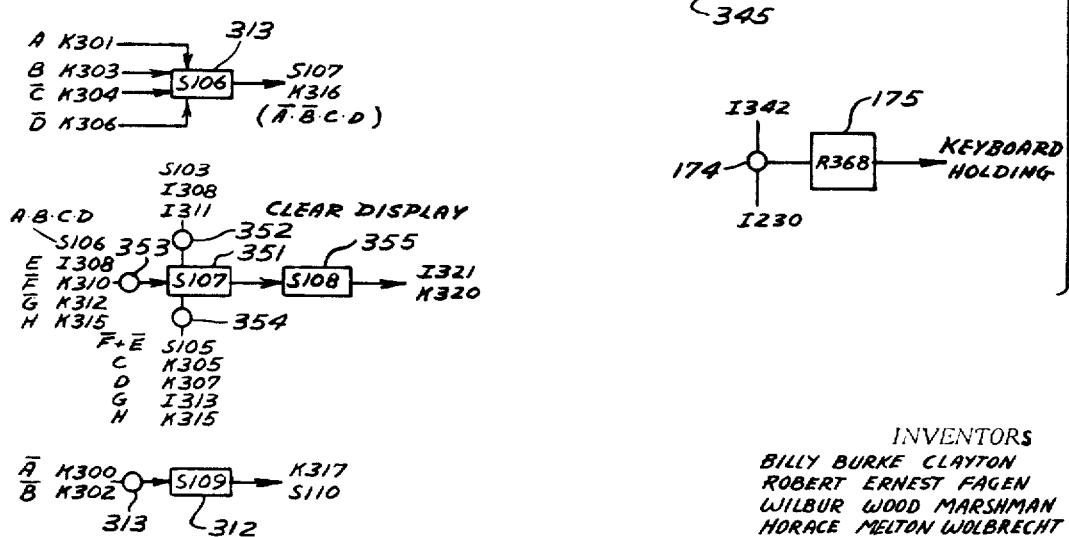

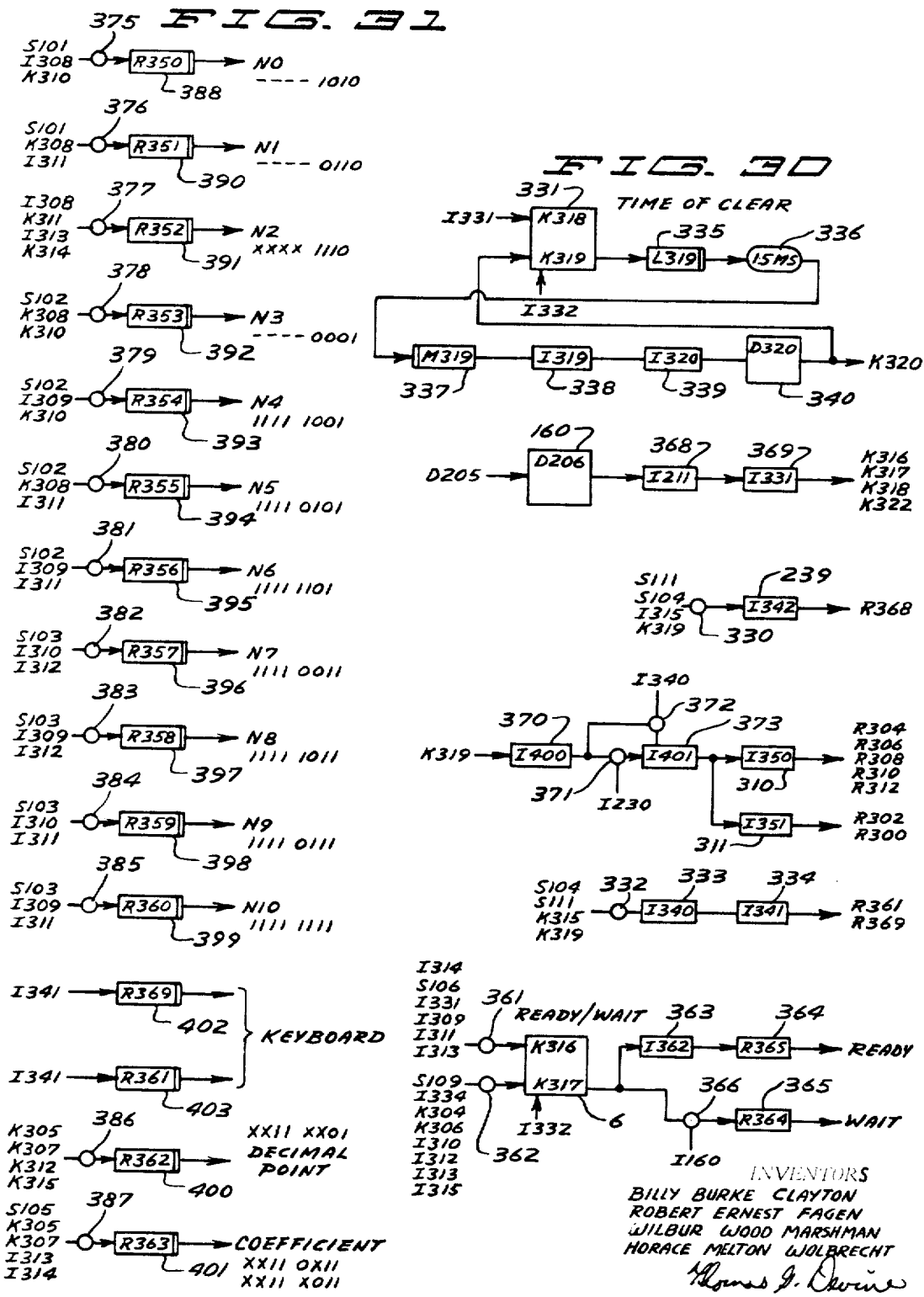

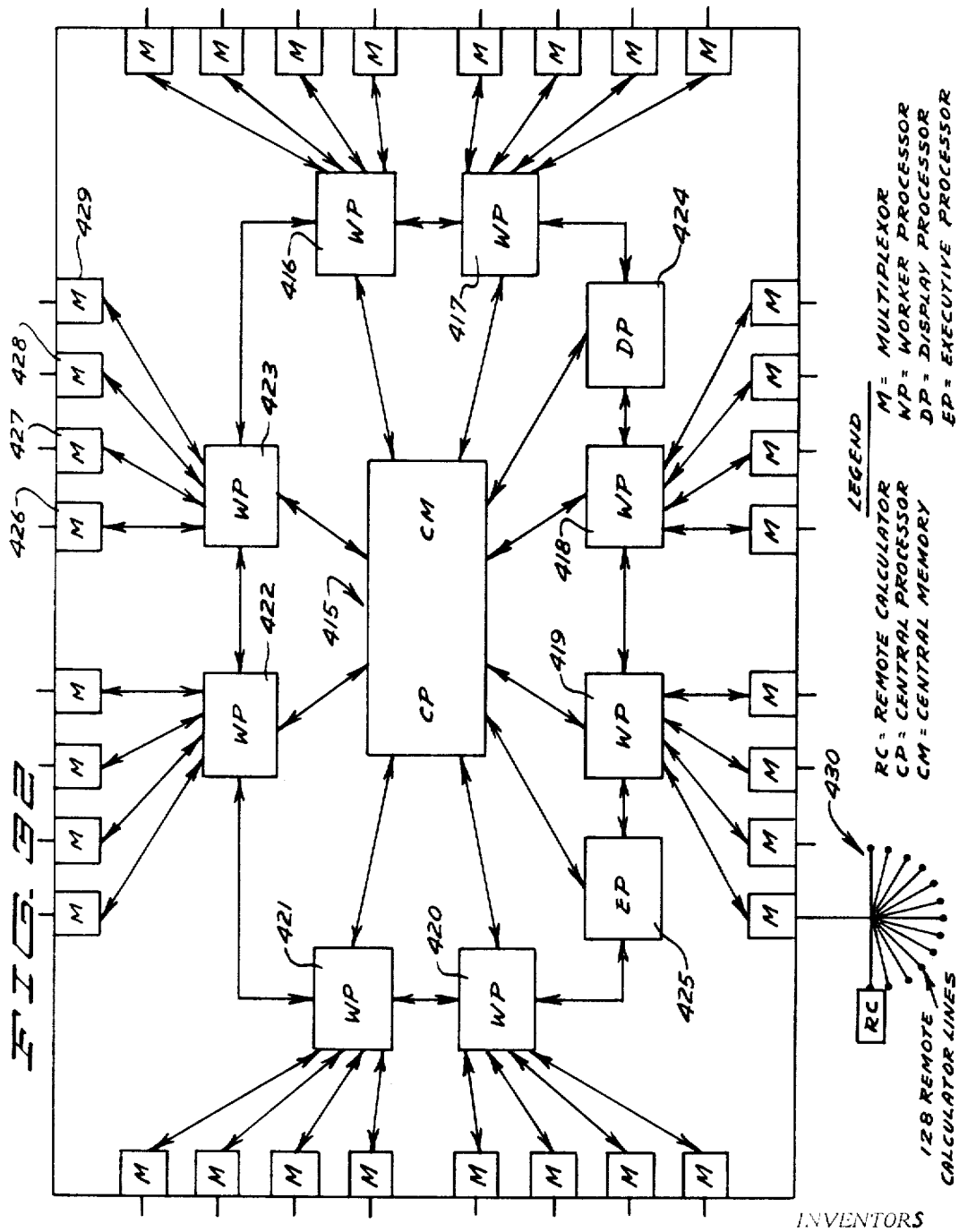

April 23, 1968 B. B. CLAYTON ET AL 3,380,031
REMOTE CALCULATOR
Filed Aug. 10, 1965 33 Sheets-Sheet 32

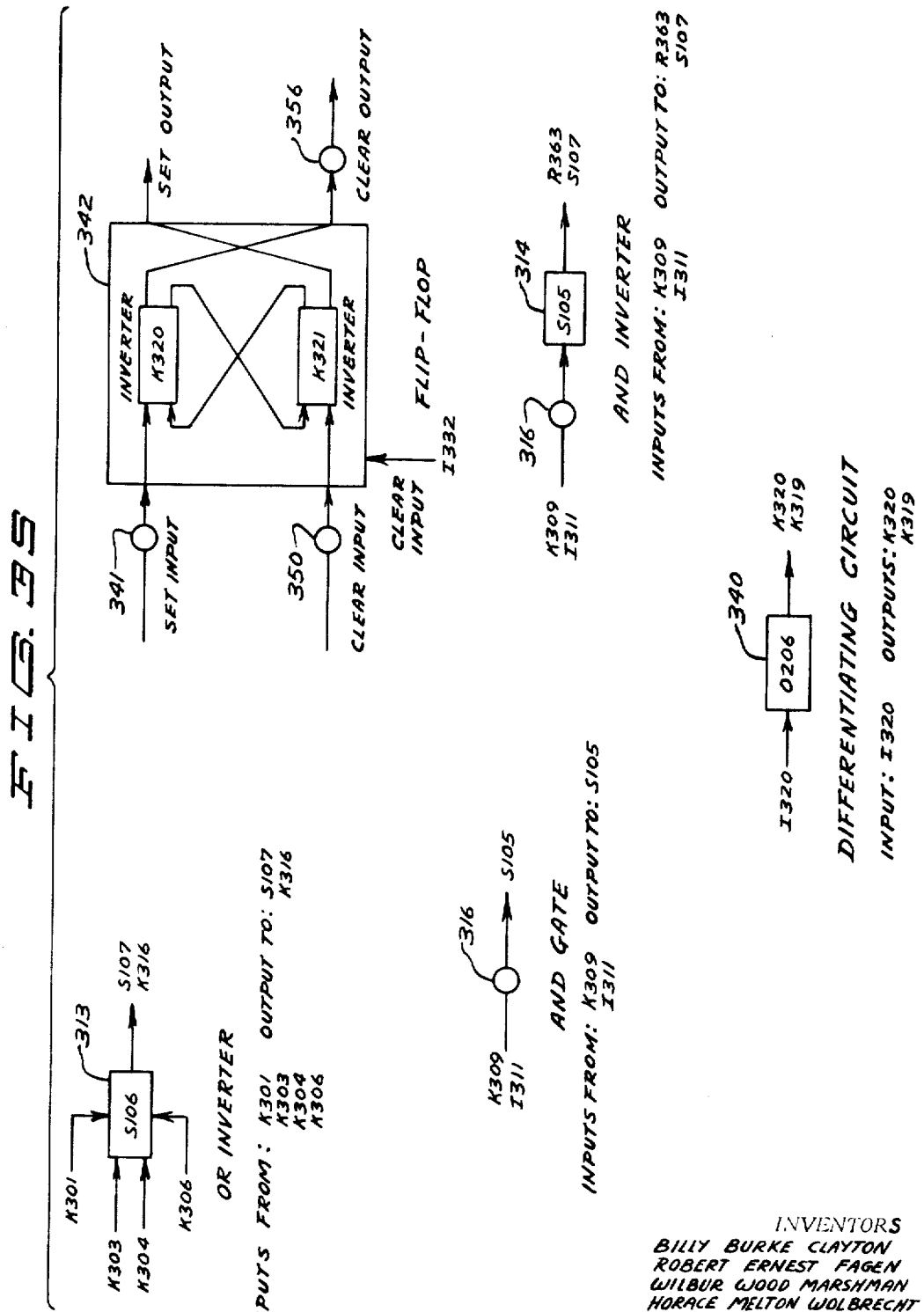

United States Patent Office 3,380,031
Patented Apr. 23, 1968

3,380,031
REMOTE CALCULATOR
Billy Burke Clayton and Robert Ernest Fagen, Los Angeles, Wilbur Wood Marshman, Gardena, and Horace Milton Wolbrecht, Long Beach, Calif., assignors to Control Data Corporation, Minneapolis, Minn., a corporation of Minnesota
Filed Aug. 10, 1965, Ser. No. 478,543
4 Claims. (Cl. 340—172.5)

ABSTRACT OF THE DISCLOSURE

A data processing system where many input/output devices communicate with a central processor is disclosed. Each remote input/output device has a manual keyboard, a first display for lighting the particular key depressed to indicate the reception of the key actuation by the central processor, and a second display for indicating the result of a computation by the central processor. The keyboard includes alpha-numeric keys and functional keys such as keys calling for the execution of arithmetic operations. A preferred embodiment of a remote input/output device and its interaction with the central processor are explained.

---

This invention relates to remote input/output devices which cooperate with a digital computer data processing system so as to appear to the user to be autonomous calculating devices, although they are actually communication devices between the operator and the data processing system.

Data storage systems are now employed wherein a plurality of remote input/output devices communicate with a central computer and interrogate or request stored information such as the status of an inventory and the like. The storage device transmits the requested information to the input/output device and the device displays the requested information via a typewriter or other read-out device.

The use of a remote manual keyboard to initiate coded input signals to the data processing equipment is broadly known in the prior art. The prior art keyboard and display units allowed man to communicate from a remote position with a computer or other data processors. The operator could command the data processing machine to perform calculations on data inserted into the machine by the keyboard and to display the results on the remote keyboard unit.

These prior systems however were clumsy and awkward to use. The scientist or engineer who was not an experienced programmer had to either rely on the services of a programmer or forego using a computer to solve his problem. If the user was an experienced programmer, he still had to spend many tedious hours translating his problem into a language the computer could accept. Additionally a user could not readily experiment with his problem while attempting to arrive at a solution to the problem since each change in the problem format required a language translation.

In the early machines, the extent that a man could communicate with the computer was limited to the ability of the operator to formulate and organize the operations that the machine could perform into a format or program. The program in early machines consisted largely of statements or steps that were organized in what is termed "machine language." "Machine language" is somewhat of a misnomer since the language of the machines is strictly numerical and in modern computers is binary, i.e., only two states may exist, a "1" or a "0." The "machine language" used by the early operators was actually a language composed of numerical or mnemonic codes corresponding to particular binary codes that were employed by the computer to effect a result. The use of a machine language required considerable time to be spent in writing and checking out the program. The fact that a problem to be solved was logically laid out in mathematical language did not mean that ingenuity and patience would not be required in translating mathematical language into machine language. Algol, Cobol, Fortran and other programming languages were introduced to allow the operator to translate his mathematical language into a somewhat universal language to enable a programmer to write a program without considering the peculiar characteristics of the machine he was to use. A keyboard coded with symbols representative of the programming language employed, although reducing the programming burden, still requires a substantial amount of time to effect the translation of mathematical language.

The advent of large scale data processing systems makes it possible to design a large, time-shared computer system with many remote input/output stations. The Remote Calculators or input/output stations are coupled to a transmitting-receiving device which transmits the required code to a Data Processor and receives the computed result back from the Data Processor. The transmitted and received signals are in a binary code format.

However, the keyboard of each Remote Calculator of the present invention is marked with symbols that are directly representative of arithmetic operations that are to be performed. The keyboard also has keys marked with symbols representative of variables, functions such as Sine, Logarithm, etc., and Data. The symbols on the keyboard correspond to the standard symbols employed in mathematics to solve a desired mathematical equation. A special format and grouping of the various keys for actuating sequences must still be followed but the grouping of the key depressions very closely parallels the notation commonly employed by scientists and engineers in solving their mathematical problems.

The control keys initiate sequences in the Data Processor that allow an operator to modify and erase steps in his program in response to results sent from the computer to the Display unit of the Remote Calculator.

Data processing systems are known wherein a plurality of remote input/output devices, in addition to interrogating, requesting and receiving stored information can record, alter or perform operations on the requested information by means of commands originating from the remotely disposed input/output device. These data processing systems require that the Central Computer contain a stored program, which responds to commands originating in the remote input/output device, and stored information which may be processed according to such commands. These systems were intended to provide a means of communication between a user and a computer wherein a user could selectively obtain information stored within the computer. In recent years, many such systems have been developed to allow a user to utilize the power of a computer to solve particular problems without requiring the user to have an intimate knowledge of programming a computer. As the modern, high speed digital computers become more complex, the programming requirements become so demanding that in the absence of input/output devices which permit direct and easy communication between the user and the computers, communication between a user and the computer would require the user to be a highly skilled programmer.

Typical of such systems which employ an input/output device as a direct and easy communication link between a user and a computer is one that utilizes typewriters and teletypes as remote input/output devices for communicating with a high speed, multiple access computer. The basic technique used is to store a plurality of known programs in external memories, which memories were addressable by the computer. A user selects certain portions of each program from the external memories by typing a predetermined subroutine into the typewriter. The typewriter communicates with the computer, and by means of the computer's stored program, selects the requested portion of the program stored in the external memories and temporarily stores the requested portion of the program in the computer memory. In addition, the requested portion of the program is transmitted to the remote input/output device. In this way, a user can selectively make a new program comprising portions of previously stored programs. When the newly compiled program is completed, the new program is used to either solve a problem or be stored in an external memory for future use. Although this approach permits easy and direct communication between a user and a computer, the user must have an intimate knowledge of programming.

It is becoming more apparent that it is necessary to provide a system whereby a user, such as an engineer or scientist, etc., can utilize the tremendous computing power available in a high speed digital computer by means of direct mathematical language communication with the Central Computer. Prior systems have attempted to utilize, in one form or another, peripheral equipment wherein a user can enter a problem in somewhat conventional terms and with some knowledge of programming. In the digital computer field, techniques to improve the user-to-computer communication are sought to permit the user to rely more on his judgment, experience and knowledge in problem solving rather than his knowledge of programming, and thus this invention provides a means for a user to utilize a computer for problem solving whereby the user can use common arithmetic operations, procedures and functions without having a special knowledge of programming.

It is therefore an object of this invention to provide a remotely disposed operator control of input/output device for a data processing system.

Another object of this invention is to provide a remote communicator as an on-line communication device which communicates with a modern high speed digital computer so that a user can directly enter a problem in conventional mathematical language and the computer will provide a solution to the problem and will return a mathematical answer to the remote communicator.

Yet another object of this invention is to provide a remote communicator which permits a user who has no knowledge of programming, to utilize the computation power of a computer to solve an analytical or mathematical problem.

Another object of this invention is to provide a system wherein a plurality of remote communicators can be simultaneously used and wherein the central computer can simultaneously receive, process and return answers to each of the remote communicators.

It is therefore an object of the present invention to provide a remote input/output device that is capable of linking an operator to a computer without imposing complex programming tasks on the operator.

It is a further object of the present invention to provide a remote input/output device that may time-share a computer with other remote calculators coupled to the computer.

It is another object of this invention to provide an input/output device that sends a coded symbol representation of a keyboard symbol to a data processor and receives an acknowledgement signal back from the data processor resulting in a display verification of the keyboard symbol.

It is an object of this invention to provide a remote display unit that can interpret a computer output signal to determine whether it is a verification of a previous input signal to the computer or is the result of a requested operation performed by the computer, and can display the output signal as a result or a verification.

It is an object of the present invention to transmit an identification signal representative of a particular remote calculator to the computer in response to a signal from the transmitting/receiving coupling unit, coupling the remote calculator to the computer, when the coupling unit is free to receive coded signals from the remote calculator.

It is an object of the present invention to provide timing signals in the remote calculator derived directly from the input data sent to the remote calculator and to provide for transmission of input data from the input register in remote calculator to the display unit in response to these timing signals.

It is an object of the present invention to provide a detection circuit and a receive counter circuit that cooperate to detect when data is not sent from the computer to the remote calculator following a signal from the coupling unit that indicates the data is to be sent to the remote calculator.

The various features of this invention will become apparent from the description of the preferred embodiment with reference to the accompanying drawing in which:

FIGURE 1 is a perspective view of the Remote Calculator Keyboard.

FIGURE 1A shows the Keyboard labeling scheme.

Figure 2A:
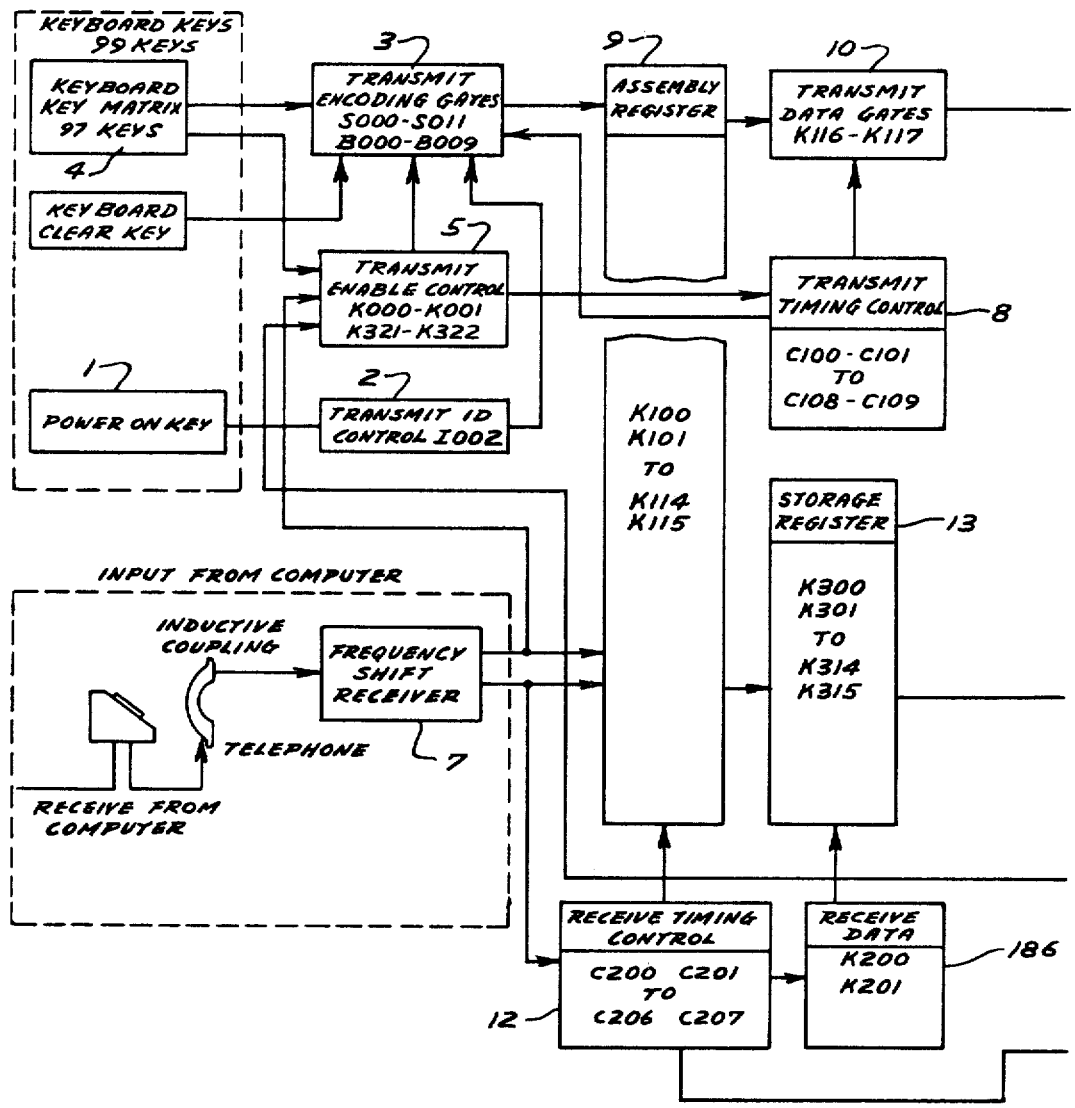

FIGURES 2A and 2B may be combined to show the overall block diagram scheme of the Remote Calculator system.

Figure 3B:
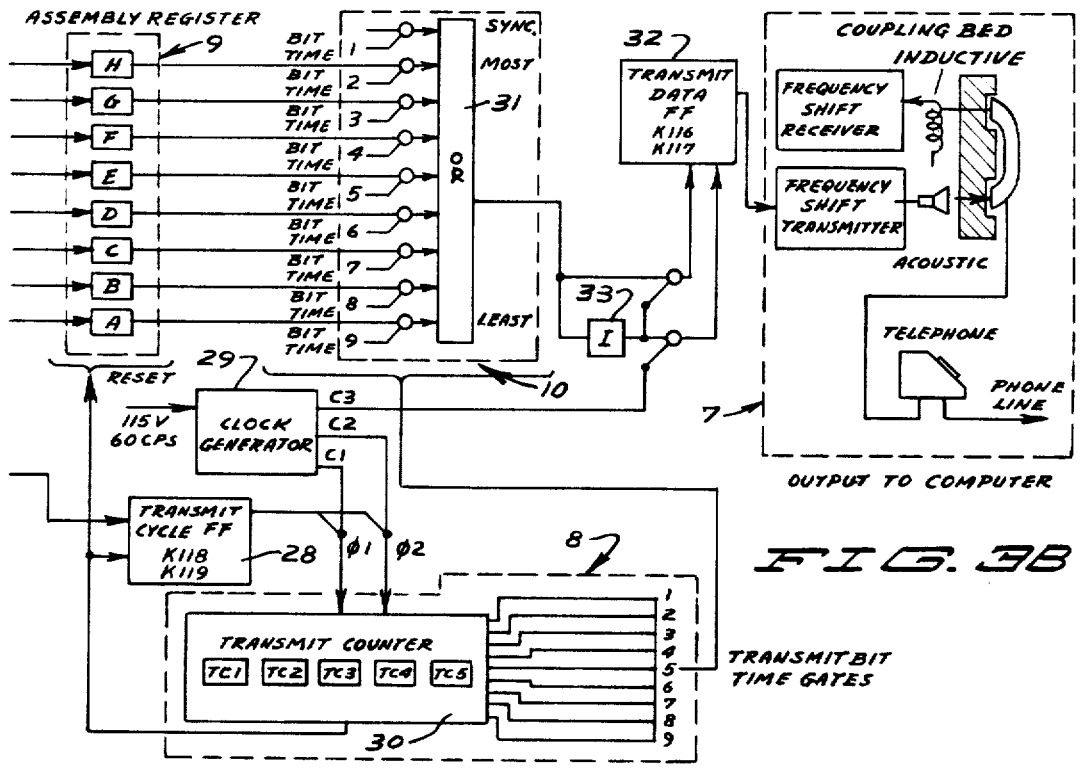

FIGURES 3A and 3B are block diagrams which may be combined to show the Transmit cycle of the Remote Calculator.

Figure 4:
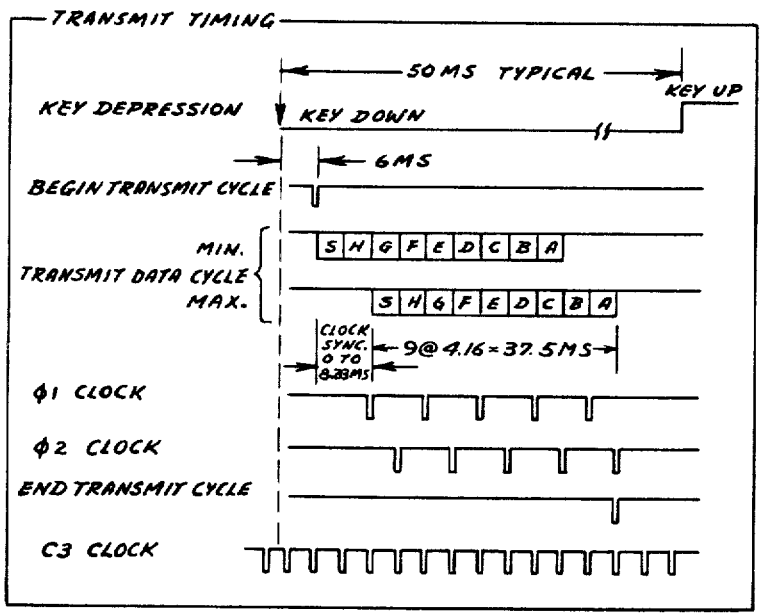

FIGURE 4 is a timing diagram representing the Transmit timing function.

Figure 5C:
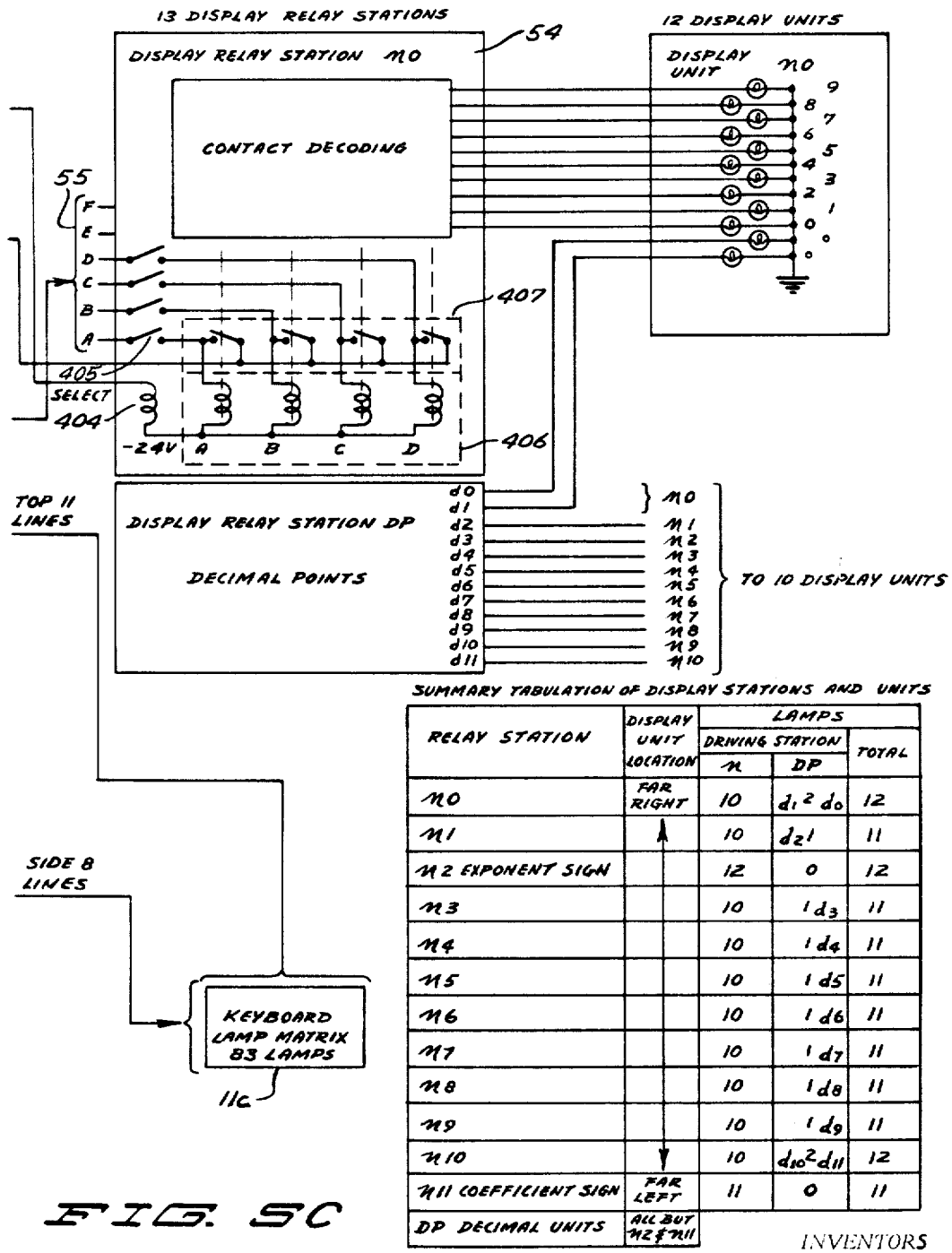

FIGURES 5A, 5B and 5C represents a block diagram of the Receive and Display cycles of the Remote Calculator.

Figure 6:
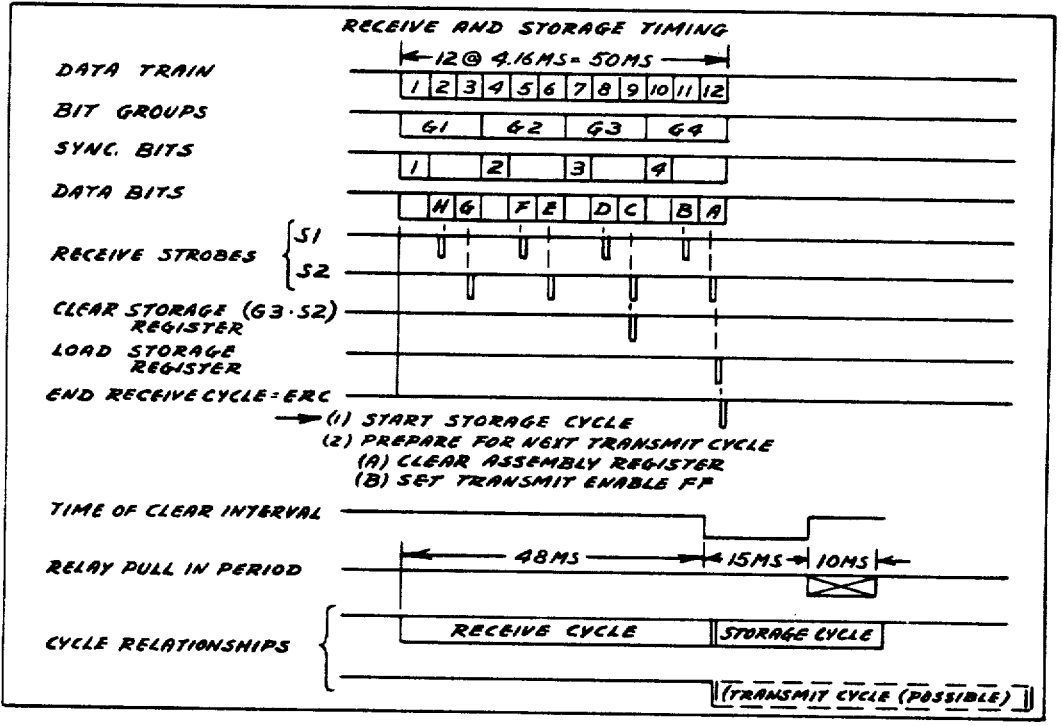

FIGURE 6 is a timing chart showing Receiver and Storage timing.

FIGURE 7 is a schematic representation of the switches and associated inverters in the Keyboard Key Matrix.

FIGURE 8 is a format chart showing the Computer Input Code Format in a matrix form.

FIGURE 9 is a format chart showing the Keyboard Key Label Matrix.

FIGURE 10 is the computer Output Code Format in matrix form.

FIGURE 11 is a format chart of the Keyboard Key Label Matrix.

FIGURES 12A, 12B and 12C are combined to form block diagrams showing the Receive and Keyboard Labeling system and associated relays in detail.

FIGURE 13 is the timing chart for the Transmit cycle.

FIGURES 14A and 14B may be combined to show the Receive timing cycle.

FIGURE 15 is a timing chart for the Decode cycle of the Remote Calculator.

Figure 16:
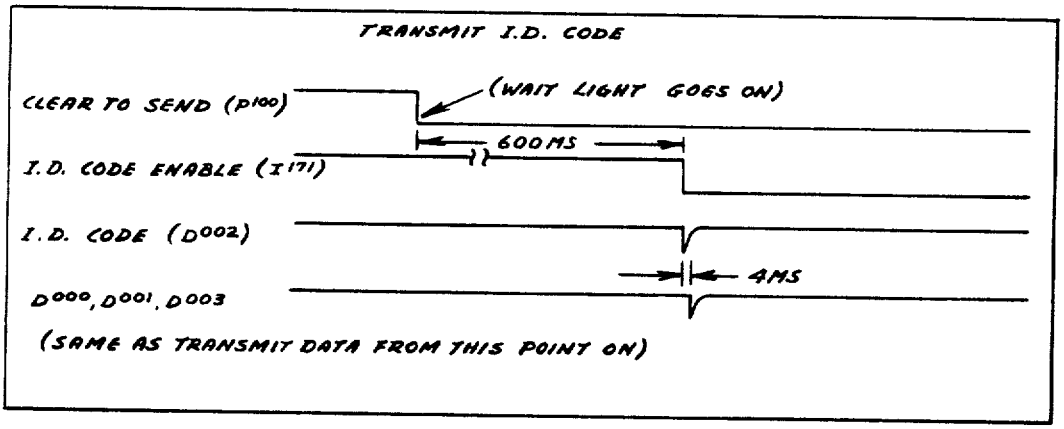

FIGURE 16 is a timing chart showing the Transmit Identification Code timing.

FIGURE 17 shows the Keyboard Switching Matrix corresponding to the Keyboard Key Matrix of FIGURE 7.

FIGURE 18 is a logic diagram representation of the Encoding inverters associated with the Keyboard Key Matrix.

FIGURE 19 is a logic diagram showing the Transmit Enable portion of the Remote Calculator and the Abort flip-flop.

FIGURE 20 is a schematic showing the Assembly Register.

FIGURE 21 shows the Transmit Counter in logic diagram representation.

FIGURE 22 is a logic diagram of the Transmit Clock Generator.

FIGURE 23 is a logic diagram showing the Transmit Data flip-flop and Decoding scheme.

Figure 24:
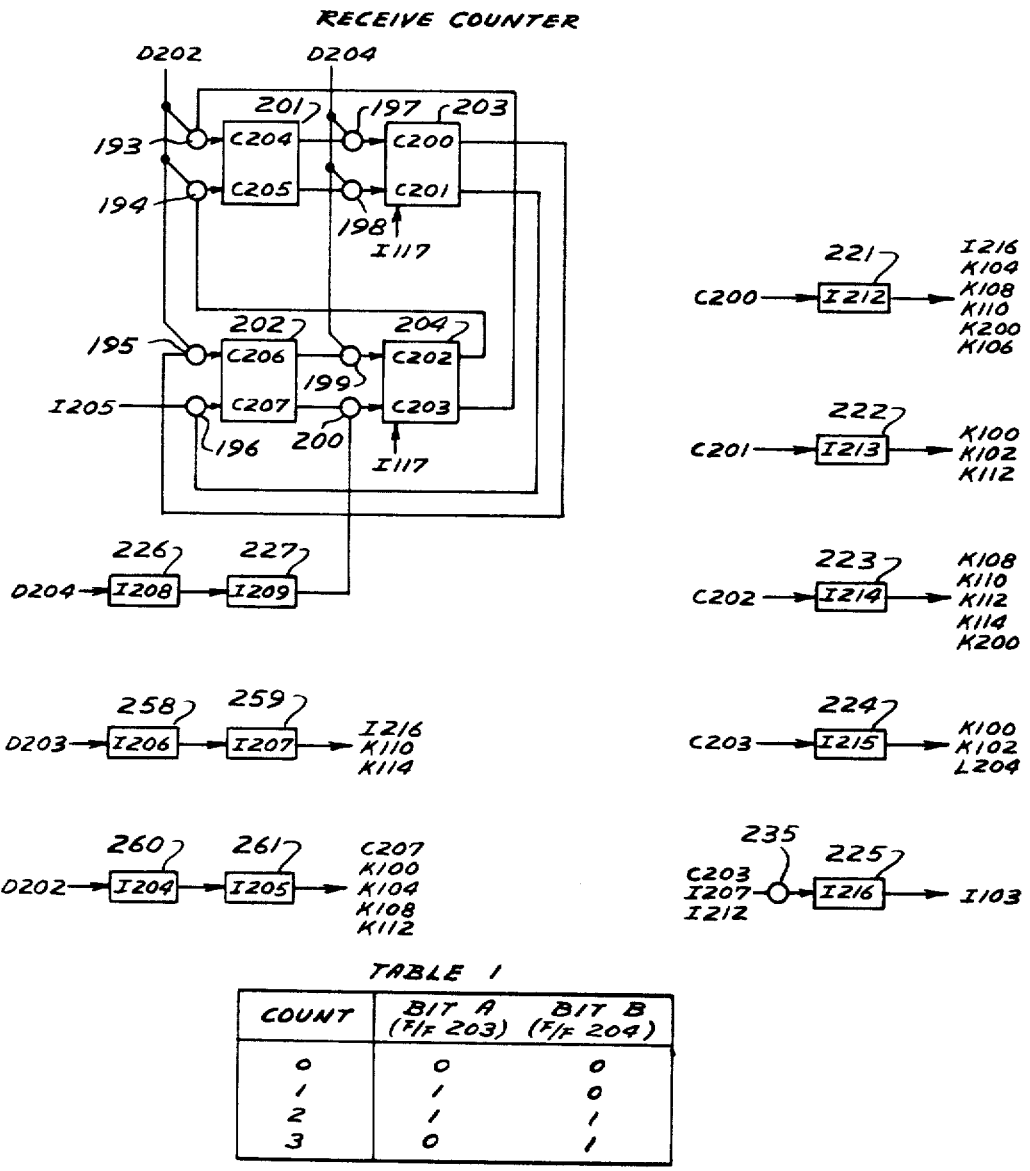

FIGURE 24 represents the Receive Counter logic diagram showing the Receive Counter and associated inverters.

Figure 25:
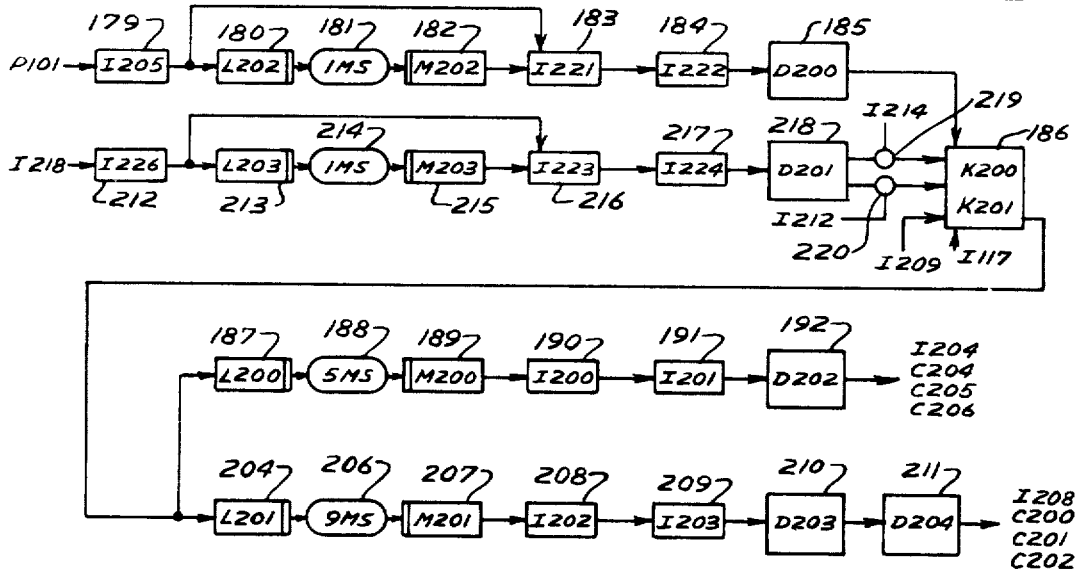

FIGURE 25 shows the Receive Clock and Strobe Generators circuits in logic diagram form.

Figure 26:
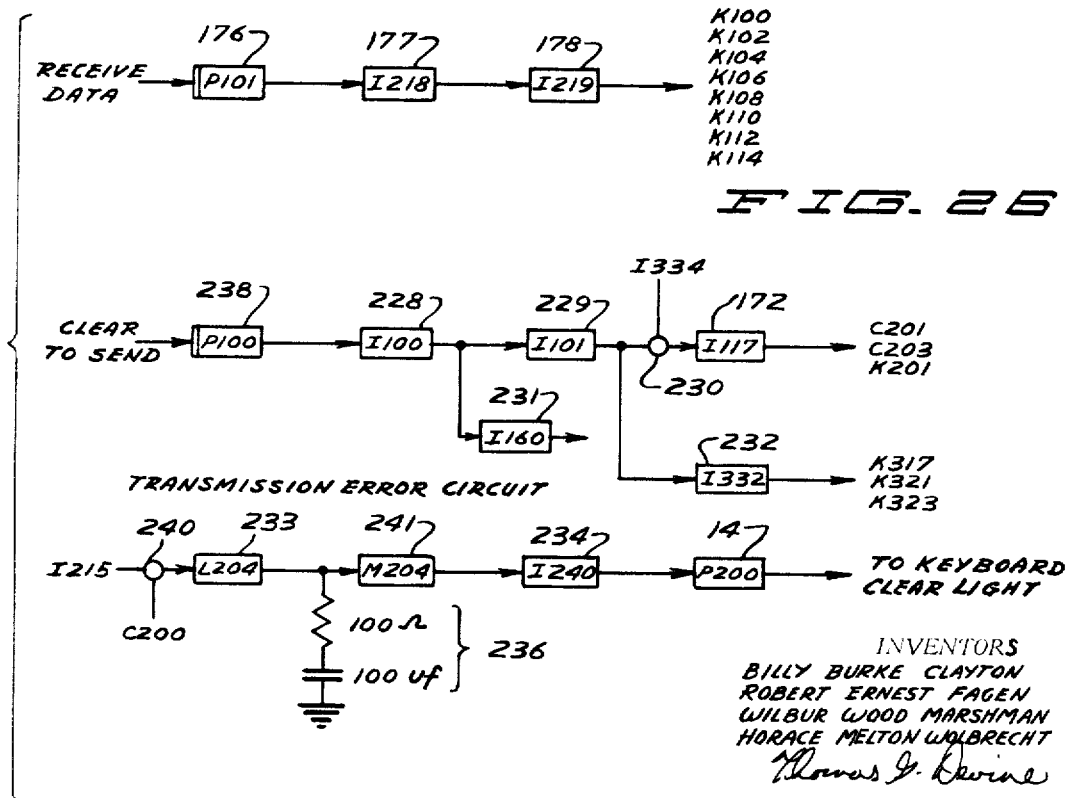

FIGURE 26 is a logical representation of the Transmission Error circuits and Clear to Send distribution circuits.

FIGURE 27 present the Storage Register in logic diagram form.

FIGURE 28 is a logic diagram of the Display and Keyboard Holding logic and the Reset Clear Display logic.

FIGURE 29 shows various translation inverters used to decode information stored in the Assembly Register of FIGURE 20.

FIGURE 30 includes logic drawings of the Time of Clear logic and of the Ready/Wait flip-flop logic.

FIGURT 31 shows a series of inverters that decode symbols from the Assembly Register of FIGURE 20 and from the inverters of FIGURE 29 and drive relays in the Display and Keyboard Lamp Matrices.

FIGURE 32 is a overall representation of a Data Processing System employing a plurality of Remote Calculators.

Figure 33:
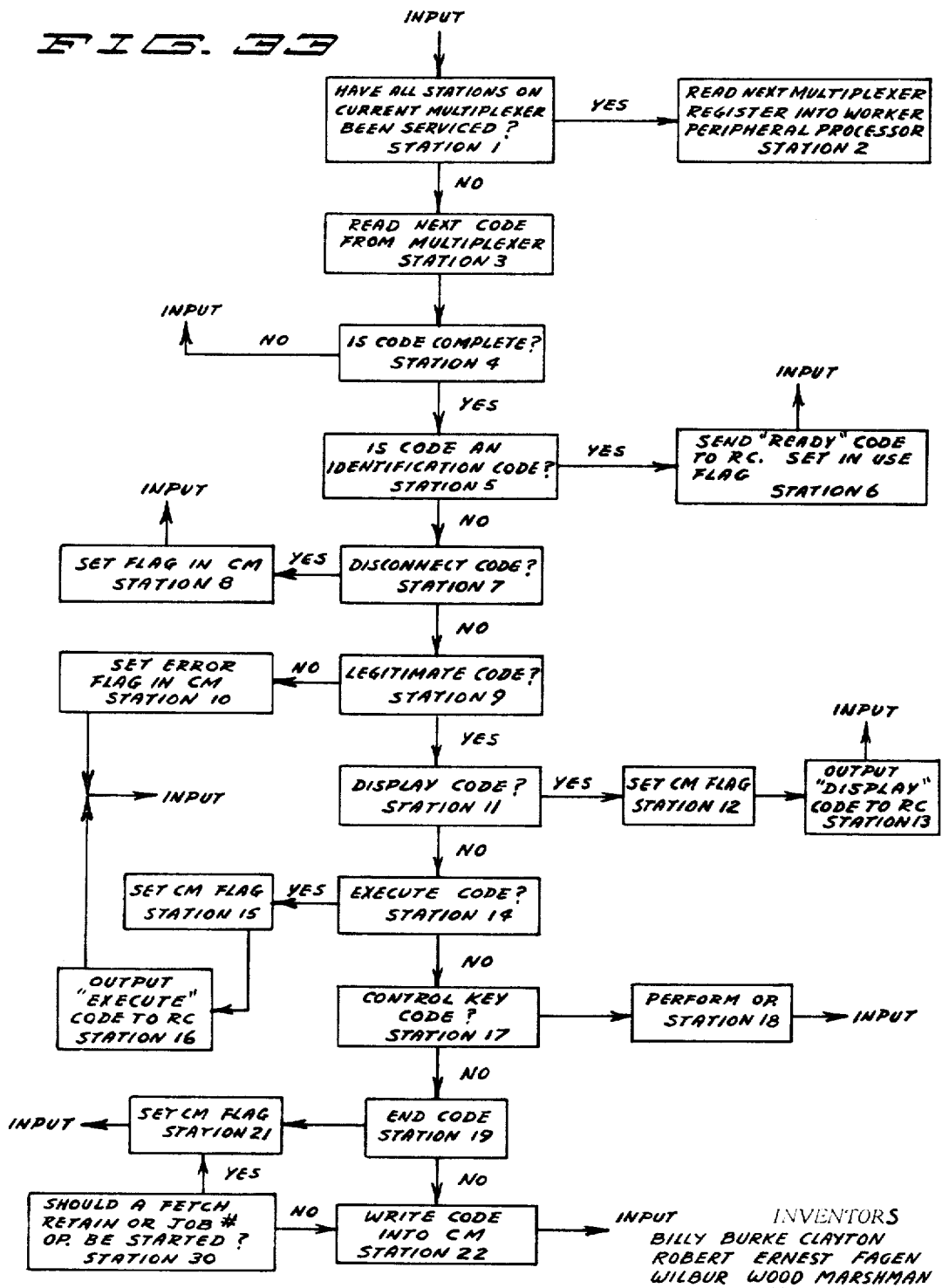

FIGURE 33 is a flow chart representing the flow of information loop between the computer and a particular Remote Calculator.

FIGURE 34 is a timing chart showing the Abort timing cycle.

FIGURE 35 is a representation and explanation of the various logic symbols in the preceding figures.

A computer calculation, initiated by the Remote Calculator makes use of three portions of the Central Memory of the computer. These may generally be referred to as three different scratch pad areas. The scratch pad areas are generally known as (A) the working space, (B) a variable storage area and (C) the retention of sequences or copying area. The working space stores the set of values or characters currently keyed in by a user of a Remote Calculator entering his problem. The working space is completely cleared by means of depressing the Reset key of FIGURE 1. When the user has entered his problem and has assigned values to the variables in the working space, the user depresses a command key (i.e. Display, Execute, etc.) which causes the computations to be made by the computer and the results of that computation will be displayed on the visual output display unit. An error line is energized if the characters or the problem entered into the working space is incomplete or meaningless or violates format rules when the user depresses the appropriate key directing the computer to solve the problem. The user of the Remote Calculator can make changes on his equation of characters or of the sequence by using the Delete, Erase, and Reset keys respectively of FIGURE 1. Generally, the working space can be considered as comprising a sequence of lines or statements separated by End characters. Statements in the working space can be erased with a character at a time, a whole line at a time, or by cleaning the entire scratch pad area or working space. The Delete key is depressed to clear a character at a time and the Erase key clears an entire statement. The entire working space is cleared by depressing the Reset key.

The user can selectively choose an appropriate character out of a sequence by the use of a Marker-Backwards and Step keys depicted in FIGURE 1. The Marker-Backwards key is used to move backward to the beginning of a statement stored in the working space commencing with the character being presently considered. Conversely, the Step key moves forward one character at a time starting at a referenced character of the statement or sequence being considered. This would permit the user to step forward through the statement stored in the working space. The user, by utilizing each of the above keys, can select any character in a sequence and delete or change the character. The entire contents or the working space can be labeled and stored in the third area of the retention of sequences area by use of the Retain key which is shown in FIGURE 1. The user must remember that the Execute key, when depressed, will direct the computer to solve the problem which appears in the entire contents of the working space. However, the user, in reviewing the contents of the working space, by use of the Display key merely refers to the statement being presently considered.

Since the working space area is used primarily to store the problem to be solved, a second area known as the storage for variables is necessary to store values assigned to variables entered into the working area. This permits a user to enter a general equation into the working area and make use of the storage of variables area since he has previously assigned values to variables stored in this area. Thus the variables area is a separate and distinct area relative to the working space area. The keys designated as A–Z, Upper Limit, Lower Limit, Delta and $\theta$ refer to 30 definitions within the variable area. When one of these variables designated by the above mentioned keys is assigned a value by the user according to the rules discussed before, that value is retained in the variable area and is not altered until the user directs that a change in value be made. The values of the variables are changed by entering a statement which assigns a new value to the variable. Thus the values assigned to the variables can not be changed by use of the Delete, Erase or Reset keys. These keys are used for making changes in the working space area only. However, the entire contents of the storage of variables area can be cleared by depressing the Job Number key shown in FIGURE 1.

The third scratch pad area is designated as the retention of sequences or copying area and is separate from both the working space area and the storage of variable area. The main function of the retention of sequences area is to copy the entire contents of the working space area to permit a user to retain an entire problem while using the working space for another problem or part thereof. As discussed before, when the user directs the computer to execute the problem, the computer communicates and operates upon the information stored only within the working space area. Thus if the user wants to use the entered equation for solving several problems or variations of the same problem, he can retain the original equation in the retention of sequences area, and in addition, can retain the values assigned to the variables of the equation because they are stored in a storage of variables area. Thus the retention of sequences area gives the user a great deal of flexibility in problem solving. The copying of the contents of the working space area is made by storing statements or sequences individually. The copying sequence is initiated by depressing the Retain button, which is shown in FIGURE 1. Thereafter, the user can assign any label or number to the sequence to be stored and use that number as the label or identification for a subsequent retrieval or fetching operation.

The circuit cards of the Remote Calculator fall into several categories:

(1) Inverters.
(2) Flip-flop.
(3) And gates.
(4) Pulse delays.
(5) Differentiating circuits.
(6) Input amplifiers.
(7) Output amplifiers.

The unique aspect of this invention is the combination of these various types of circuits in logic configurations to produce a novel input/output communication device. The particular type of circuits used are not described since a great variety of each of these circuits is well known in the prior art and use of a particular type of circuit is determined by the voltage desired, the output cable to be used, the speed of operation desired etc.

The labeling appearing in the blocks represents the various logic circuits corresponding to the following scheme:

100 numbers generally correspond to the Transmit cycle (e.g. C100)
200 numbers generally correspond to the Receive cycle (e.g. C200)
300 numbers generally correspond to the Storage or Display cycle (e.g. K300, I340)

I—General inverter card.
S—Keyboard Matrix Row translator inverter card.
B—Keyboard Matrix column translator inverter card.
L—Delay card input inverter.
M—Delay card output inverter.
P—Input amplifier.
R—Output amplifier.
D—Differentiating circuit.
K—$x$ Flip-flop inverter card where $x$ is even the inverter card supplies the clear output and where $x$ is odd the inverter card supplies the set output.
C—$x$ Flip-flop inverter card in a counter circuit. $x$ even means clear output supplied, $x$ odd means set outputs supplied.

FIGURE 34 shows the logic diagram symbols that appear in the figures of the application.

For example, inverter 313 is an Or inverter with four inputs. If any of the four inputs are a 1 inverter, 313 will output 0 to two other cards, S107 and K316. If all four inputs are 0, then inverter 313 will output a 1.

And gate 316 is shown with two inputs. If both are at a 1 level, And gate 316 will output a 1 to one card, inverter S105.

And gate 316 and inverter 314 form an And inverter that will output a 0 to two other cards, R363 and S107, only if both inputs to And gate 316 are a 1.

Flip-flop 342 is a typical flip-flop with a set input from And gate 341 and a clear input from And gate 350. Flip-flop 342 is composed of two inverters K320 and K321 cross-coupled in the usual manner. The set output comes from K321 and the clear output comes from K320.

Differentiating circuit 340 takes an input from I320 and differentiates this input and supplies the differentiating output to K320 and K319.

The block diagram of FIGURE 2 shows an overall view of the Remote Calculator and the frequency shift transceiver coupled to a Remote Calculator.

This diagram shows the three main functions; transmit, receive, and storage. The transmit function is shown at the top of the drawing and the receive and storage functions are shown at the bottom of the drawing. The receive and storage functions are related, but they are relatively independent of the transmit function.

The trasmit function includes the following sub-functions. All transmissions are initiated by depression of a key on the keyboard. If certain conditions are met, the Transmit Enable Control 5 permits the encoded key data to be loaded into the Assembly Register 9. The Transmit Timing Control 5 then automatically reads the contents of the Assembly Register 9 serially through the Transmit Data Gates 10 which modulate a Frequency Shift Transmitter 7. The output of this transmitter drives a small speaker which is coupled into the mouthpiece of a standard telephone and transmitted to the computer over a standard telephone line. The electromagnetic field surrounding the ear piece of the Acoustic Coupler is acoustically coupled into a Frequency Shift Receiver 7. The Receive Timing Control 12 sub-function detects the leading edge of a serial data train and initiates a sequence of timing signals that cause the data train to be loaded into the Assembly Register 9. After the bits are assembled, they are transferred in parallel to the Storage Register 13. The bits in the Storage Register 13 are decoded and used to turn on a lamp in either a Display Unit 19 or a light in the Keyboard Matrix 11.

The operational relationships between the transmit and receive and storage functions are as follows. The first relationhhip can be described as an Alternating, or conversational, mode. In this mode, one key causes one character to be sent to the computer, and the computer responds with one character which acknowledges the receipt of the character just transmitted. If this character was a number, the acknowledgement character is that number, but displayed in a digit Display Unit 19. If this character was not a number, the acknowledgement is accomplished by lighting a lamp directly under the corresponding key. The second relationship can be described as an Extended Response mode. In this mode, there is still only one character transmitted as a result of the key depression. However, the response from the computer may consist of several characters in sequence. This mode is used typically to display a multi-digit answer to a computation. Also, typically, the Wait code is sent at the beginning of an extended response. At the completion of an extended response, a Ready code is sent. The effect of the above is to let the operator know that he must wait before he can proceed with another key depression.

In summary, the Remote Calculator transmits and receives signals serially on a character basis over a single telephone line. For transmission, signals are coded to represent one of several keys. Upon reception, signals are decoded to turn on a particular keyboard lamp or display; there is no hardcopy. The Remote Calculator performs no calculation functions; it is only an input/output terminal.

Depression of Power On key 1 on the keyboard console of the Remote Calculator enables the Transmit Identification Control 2 to send an Enable signal to the Transmit Encoding Gates 3. Information may be keyed into the Remote Calculator through depression of a key in the Keyboard Key Matrix 4. When a key is depressed, the Keyboard Key Matrix 4 sends a coded signal to the Transmit Encoding Gates 3 and also sends an enabling input to the Transmit Enable Control 5. Other enabling inputs through the Transmit Enable Control 5 come from the Ready/Wait flip-flop 6 and the input coupling device, in this case, a Frequency Shift Transceiver 7. A Ready signal from the Ready/Wait flip-flop 6 is necessary to enable the Transmit Enable Control 5. The Ready/Wait flip-flop 6 has been previously set in the ready state by a signal from the computer (not shown). The third signal necesasry to enable the Transmit Enable Control 5 is derived from the Frequency Shift Transceiver 7 and is sent if the Transceiver is able to transmit new information from the Remote Calculator to the computer. The Transmit Enable Control 5 starts the Transmit Timing Control 8.

The Transmit Timing Control 8 allows data entered from the Keyboard Key Matrix 4 to pass through the Transmit Encoding Gates 3 into the Assembly Register 9. The Transmit Timing Control 8 allows the data in the Assembly Register 9 to be transmitted through the Transmit Data Gate 10 and out of the Frequency Shift Transceiver 7. The computer, after receiving the data initiated by the Keyboard Key Matrix 4 returns a verification signal representing this data to the receiving portion of the Frequency Shift Transceiver 7 and the incoming data is now passed into the Assembly Register 9.

The Receive Timing Control 12 is simultaneously energized by the Register 9 into the Storage Register 13. The Receive Timing Control 12 also is fed to Receive Sync Detector 14. The Keyboard Key Lamp 15 will remain lit unless no data is received during the receive data cycle, as will subsequently be described.

Select Decoding Gates 16, Data Decoding Gates 17, Storage Timing and Clearing Control 18, and Ready/ Wait Decoding Gates 19 all decode the data contained in Storage Register 13. Select Decoding Gates 16 act to select either Display Unit Matrix 19 or Keyboard Lamp Matrix 11. After the computer has returned the data received from the Keyboard Key Matrix 4 to the Remote Calculator, the returned data is selected by Select Decoding Gates 16 and placed in the Keyboard Lamp Matrix 11 if it does not represent a numeral. Each lamp in the Keyboard Lamp Matrix 11 corresponds to a key in the Keyboard Key Matrix 4. If the lamp corresponding to the depressed key is lit, the operator is thereby informed that the computer has received the correct data transmission, if the transmitted data represents a numeral, it is displayed in the display devices of the Remote Calculator.

Storage Timing and Clearing Control 18 times the data entering the two display matrices and provides for the clearing of each. If the data entered into the computer requires the computer to undergo a calculation, the computer will send a Wait signal through the Frequency Shift Transceiver 7 to the Remote Calculator. The Wait signal passes through the Assembly Register 9 into the Storage Register 13 to the Ready/Wait Decoding Gates 19. The Ready/Wait Decoding Gates 19 will set the Ready/Wait flip-flop 6 to the Wait state disenabling the Transmit Enable Control 5 so that further information may not be entered by the Keyboard Key Matrix 4.

Ready/Wait lamps 20a and 20b are provided on the console to indicate to the operator when he may initiate new data through the keyboard console.

When the Calculator is first turned on, both the Ready 20a and Wait 20b lamps are dark even though the Ready/ Wait flip-flop 6 is reset. When the telephone connection is made the Clear to Send signal is sent, inverter 231 also becomes true and the input to inverter 365 is enabled, therefore, the output is driven up to ground potential which turns the Wait lamp 20b on.

When the Storage Register 13 receives one of three codes, namely, (1) Display, (2) Execute, (3) Error, the reset term of the Ready/Wait flip-flop 6 is enabled and this flip-flop resets. This causes the Ready light 20a to go dark and the Wait lamp 20b to turn on.

A Power On Lamp 20c is also provided on the console of the Remote Calculator. When the computer has performed the operation requested by the Remote Calculator, this data will be sent to the Frequency Shift Transceiver 7, and also into the Assembly Register 9 and into the Storage Register 13. The Select Decoding Gates 16 now select the Display Unit Matrix 19 to display the result of the computer operation.

FIGURE 3 is a block diagram showing the transmit cycle of the Remote Calculator in a functional relationship. This shows the transmit sub-functions, and the overall transmit timing. The description will be in three sections. First, the process resulting from the depression of a key in the Keyboard Matrix 11. Second, the process resulting from depression of the Power-On key 78. Third, the process resulting from the depression of the Keyboard Clear key 34.

The process resulting from depression of a key in the Keyboard Matrix 11 is given below. There are 97 keys in this matrix. The Encoding Gates 3 are entered with a 7-bit code, A through G, for the Keyboard Key Matrix 11. When any key is depressed a signal sets the Key Down flip-flop 24. The set gate 23 is qualified by the Transmit Enable flip-flop 22 and the Ready/Wait flip-flop 6. Once a transmission has been enabled, the Transmit Enable flip-flop 22 is cleared and this prevents the transmission of any additional character until a response has been received from the computer. This response, when complete, will result in an End Receive Cycle pulse which will set the Transmit Enable flip-flop 22. In the Extended Response mode of operation, the Ready/Wait flip-flop 6 will be cleared by a Wait code at the beginning of the response sequence. This will prevent the transmission of any additional characters until the computer completes its Extended Response by sending a Ready code and thereby setting the Ready/Wait flip-flop 6. Once the Key Down flip-flop 22 is set, a 6 millisecond delay is initiated by Key Bounce Delay 25 to allow for key bounce. At the end of this period, the encode lines A through G are known to be stabilized and a Begin Transmit Cycle pulse is generated if the Frequency Transceiver 7 is clear to receive new data from the Remote Calculator. If the signal is present from Key Bounce Delay 25 and also from the Frequency Shift Transceiver 7, and gate 26 is made and the Begin Transmit Cycle Generator 27 will initiate the transmit cycle. The Begin Transmit Cycle pulse does three things. First, it clears the Transmit Enable flip-flop 6 to disable the setting of the Key Down flip-flop 22. Second, it loads the encode lines A through G into the Assembly Register 9. Third, it sets the Transmit Cycle flip-flop 28. The Transmit Cycle flip-flop 28 initiates a 37.5 millisecond serial transmission sequence as shown in the Transmit Timing FIGURE 13. The cycle consists of a transmission of 9 bits. At the end of the 9th bit period, the transmit counter generates an End Transmit Cycle pulse which clears the Transmit Cycle flip-flop 28 and clears the Assembly Register 9. The basic bit duration is 4.16 milliseconds, which corresponds to a bit rate of 240 bits per second. The basic frequency reference for the clock is the 60 cycles per second, 115 volt, power line. From this power line two pulse trains are derived, labeled C1 and C2. Each pulse train has a pulse spacing of 8.33 milliseconds and the two trains are offset by 4.16 milliseconds. The Clock Generator 29 has, as its output, C1, C2 and C3. C3 is the combination of C1 and C2, hence it is a pulse train with a pulse spacing of 4.16 milliseconds. When the Transmit Cycle flip-flop 28 is set by pulse generator 27, it enables C1 and C2 to step the Transmit Counter 30. For any particular transmit cycle only 5 pulses are required to completely step the counter. The Transmit Counter 30 enables the data in the Assembly Register 9 to be transmitted in a serial manner to the Transmit Data Gates 10. The Transmit Counter 30 also sends a Reset signal to the Assembly Register 9 at the end of the Transmit Cycle. Data from the Transmit Data Gates 10 passes through Or inverter 31 to the Transmit Data flip-flop 32 and an inverter 33. A 1 output from Or inverter 31 will set Transmit Data flip-flop 32, a 0 output from Or gate 31 will be inverted by inverter 33 and will clear the Transmit Data flip-flop 32. A series of output signals will be fed to the Frequency Shift Transceiver 7 in phase with the Clock Generator 29. Release of the key in the Keyboard Key Matrix 4 will allow the All Keys Up Gate 33 to clear the Key Down flip-flop 24 in preparation for the next keyboard key entry.

At this time the Transmit Cycle flip-flop 28 is cleared and this disables the clocks. The symbols $\phi 1$ and $\phi 2$ are used to represent the enabled clocks derived from C1 and C2. At the beginning of a transmission the Transmit Data flip-flop 28 is always in the cleared state. This causes the Frequency Shift Transmitter 7 to transmit a tone of 1,070 cycles per second. This frequency is termed the Mark frequency. The first bit in a transmission is always a logical one. This always sets the Transmit Data flip-flop 28 and always causes the Frequency Shift Transmitter 7 to shift its frequency to a second value of 1,270 cycles per second. This frequency is termed the Space frequency. This Mark-to-Space transition is detected at the computer end of the telephone line to signify the beginning of a character transmission. The 8 bits following the Sync bit may be either 0 or 1 depending upon the code to be represented. For all keys in the Keyboard Matrix, the H bit is always 0. When a key is released, an All Keys Up Gate 33 clears the Key Down flip-flop 24.

The process resulting from the depression of the Power-On key 78 is given below. First assume that a call has been placed to the computer and that the operator has heard the 2,025 cycles per second signal (tone) coming from the 103–A Dataset at the computer, indicating that the 103–A Dataset is ready to communicate. The operator then places the handset in the Coupling Bed. When the Power-On key is depressed, the Frequency Shift Transceiver 7 circuit will be activated and the output of the earpiece of the handset will be coupled acoustically. The presence of this signal is detected by the Frequency Shift Transceiver 7 and results in a true condition for the Transmit Enable line as shown in the upper right-hand corner of the drawing. There is a 1.5 second delay between the time that the signal is detected in the Frequency Shift Receiver 7 and the time that the Transmit Enable line goes true. At this time the 1,070 cycles per second signal output of the Frequency Shift Transceiver 7 signal is enabled to a small speaker. As indicated in the lower left-hand corner of the drawing, there is another status line from the Frequency Shift Transceiver 7 labeled Clear-to-Send. This signal has remained false throughout the 1.5 second interval and remains false for an additional 250 milliseconds after the Transmit Enable line goes true. During this time a Master Clear signal clears all circuits in the Remote Calculator. When Clear-to-Send signal goes true, the Master Clear line goes false and after an 0.6 second delay an Identification pulse is generated. The 0.6 second delay is required to insure that the other Clear-to-Send line from the 103–A Dataset to the Multiplexer at the computer end is true before the Identification pulse is generated in the Remote Calculator. The Identification pulse initiates a Transmit Cycle by causing a Begin Transmit Cycle pulse to be generated. Although no key in the Keyboard Matrix has been depressed, a particular 7-bit code is enabled into the A through G encoding gates. This code is wired into the Remote Calculator and permits 128 separate Calculators to be uniquely identified. The H bits is set to a "1" and distinguishes Identification Codes from the other codes. After the computer receives an Identification Code it sends back a Ready Code which sets the Ready/Wait flip-flop 6, and in effect "unlocks the Keyboard."

The process resulting from the depression of the Keyboard Clear key is given below. The Keyboard Clear key is used for two separate purposes. The first use of this key is related to the receive function more than it is related to the transmit function. If the receive function does not receive a complete character or for some other reason does not cause the Receive Counter 12 to step through a complete cycle, hardware in the Remote Calculator itself will turn on a lamp under the Keyboard Clear key. This lamp indicates that the Receive Counter is out of synchronization and is a request to the operator to depress the Keyboard Clear key. When the key is depressed, the Receive Counter is cleared and an "All Zeroes" code is transmitted to the computer. In normal operation, the Receive counter will not go out of synchronization so the first use of the Keyboard Clear key is primarily one of maintenance. The second use of the Keyboard Clear key is for the purpose of terminating a long computation. When the computer begins any computation, it locks out the keyboard by sending a Wait code. The Keyboard Clear key permits the operator to bypass this lockout function and transmit an "All Zeroes" code. This code is interpreted by the computer to mean that computation should be terminated regardless of the stage it has reached in its computation program. The program response is to terminate calculation, clear the program "working space," and send to the Remote Calculator two codes: No Answer and Ready. Depression of the Keyboard Clear key 34 will set Keyboard Clear flip-flop 35. The Keyboard Clear flip-flop 35 will initate the Beginning Transmit Cycle pulse generator 27 and the cycle will continue as previously described. The Keyboard Clear flip-flop 35 will also reset the Receive Counter to enable the Remote Calculator to receive incoming data from the computer. When the Keyboard Clear key 34 is released, the Keyboard Clear flip-flop 35 is cleared.

FIGURE 5 shows the receive and storage cycles of the Remote Calculator in a block diagram representation. Description of this figure will be in four sections. First, the receive process. Second, the storage process for a Ready or Wait Code. Third, the storage process for a Keyboard Lamp Code. Fourth, the storage process for a Display Code. The receive process is given below. Information received from the computer through the Frequency Shift Transceiver 7 is fed to the Assembly Register 9 and then transferred into the Storage Register 13 by timing signals received from the Receive Counter 36 on a serial 8 bit character basis. Character bits are labeled A through H. To assure reliable detection, data is resynchronized by use of one sync bit before each group of two data bits. Hence the data train consists of a total of twelve bits. The sequence of bits in this data train is shown in the timing diagram. Before receipt of a character train, the receive line is in the "zero" state. When a "zero-to-one" transition occurs, this triggers the Receive Strobe Generator 38. The purpose of the Receive Strobe Generator 38 is to generate two Receive Strobe pulses, S1 and S2. The Receive Strobe pulses will occur 1½ and 2½ bit time, respectively, after the "zero-to-one" transition. The first pair of Receive Strobe pulses will load the H and G bits into the Assembly Register 9. The fourth bit in the data train is the second sync bit, and it will always be opposite in polarity to the preceding data bit. This insures that a transition will always occur at the time boundary between the third and fourth bits. This transition causes the Receive Strobe Generator 38 to issue a second pair of Receive Strobe pulses, loading Data bits F and E. The process is repeated similarly two more times to complete the loading of the Assembly Register 9. The Receive Bit Group Counter 36 is stepped through four states corresponding to the four groups of bits in the data train. During the third state, the Storage Register 13 is cleared. Immediately after S2 occurs during the fourth state, a single-sided parallel transfer from the Assembly Register 9 to the Storage Register 13 is accomplished with the "Load S" pulse. Hence, the Storage Register 13 is loaded approximately 11½ bit times, or 48 milliseconds, after the "zero-to-one" transition at the beginning of the data train. This period is labeled the "Receive Cycle" on the timing diagram. At this time an End Receive Cycle pulse is generated. This pulse does two things. First, it starts the Storage Cycle. Second, it initiates action necessary to enable the Transmit Function. This is accomplished by clearing the Assembly Register 9 and setting the Transmit Enable flip-flop 22. Now the keyboard is unlocked, and the operator may depress a key and initiate a transmission through the Assembly Register 9. This new Transmit Cycle can proceed concurrently with the Storage Cycle for the character just received, as shown on the timing diagram. In the event that a character is not received properly, the Receive Bit Group Counter 36 may not be stepped completely around four states. It would then be "out-of-sync." If this should happen, a Sync Detector Circuit 14 will turn on the lamp under the Keyboard Clear key 34. The operator would respond by depressing the Keyboard Clear key 34 as previously described.

Input data initiating the Receive Counter 36 is passed through Noise Filter 37 to the Receive Strobe Generator 38. The function of Receive Strobe Generator 38 is to detect a change of state on the input to Noise Filter 37. When a change of state occurs on the input to Noise Filter 37, the Receive Strobe Generator generates two strobe pulses, which act to enable the Receive Counter 36 to begin its receive count cycle. Input data is strobed into the Assembly Register 9 in response to pulses received from the Receive Strobe Generator 38 and the Receive Counter 36. The Receive Counter 36 transmits a clear signal to Assembly Register 9 prior to a load signal thus insuring that the Assembly Register 9 is cleared out before receiving new data. During the receive cycle the Receive Counter 36 will transmit a load signal to the Storage Register 13. A signal is also sent to the Time of Clear Generator 40.

The Time of Clear Generator provides a 15 millisecond output pulse. It is during this 15 millisecond interval that information is transferred from the Storage Register 13 to the Display Unit Matrix 19 or the Keyboard Lamp Matrix 11. If the Select Decoding Network 16 determines that the data in the Storage Register 13 is to be displayed in the Keyboard Lamp Matrix 11, one input to And gate 41 will be made. The other input to And gate 41 is received from the Time of Clear Generator 40. When the two inputs are present on And gate 41, Matrix Select Relay Driver 42 will select the select relay in the Keyboard Lamp Matrix 11. The Data Line Relay Drivers 45 will transfer information from the Storage Register 13 into the Keyboard Lamp Matrix 11 to the Data Decoding Relays of the Keyboard Lamp Matrix 11. And gate 43 is conditioned by Select Decoding Gate 16 and the Time of Clear pulse from the Time of Clear Generator 40. When these two inputs are present. And gate 43 is made and inverter 44 will output a 0. A 0 output on inverter 44 will cause the Matrix Hold Relay Driver 46 to release the hold signal on the data decoding relays in the Keyboard Lamp Matrix 11. After the 15 millisecond Time of Clear pulse is over, inverter 44 outputs a 1 and Hold Relay Driver 46 outputs a 0 holding signal that causes the Data Decoding Relays to lock in on the lines which are selected by the Data Line Relay Drivers 45.

The Data Decoding Relays contained in Relay Group 11a represent bits G, F, E and D and are decoded to supply the columns in the Keyboard Lamp Matrix 11c. The relays in the Data Decoding Relay Group 11b represent bits A, B and C and are used to supply the rows in the Keyboard Lamp Matrix 11c. If data is to be displayed in the Display Matrix 19, it is first decoded in the Display Relay Station Select Decoding Network 16b. This network selects one of the Station Select Relay Drivers 47. The selected Station Select Relay Driver will select the proper Display Relay Station 54. The Display Hold Relay Driver 53 is fed by inverter 52 and Time of Clear Interval Logic 50. Display Hold Relay Driver 53 releases the holding condition of the Display Relay Station during the Time of Clear pulse so that new data may be fed into the input lines 55 of the selected Display Relay Station 54. Display Hold Relay Driver 53 releases the holding condition on the Display Relay Station 54 when the first condition logic indicates that non-numeric data does not cause an entry into the Display Matrix 19. The second condition logic insures that the Display Hold Relay Driver 53 will release the holding condition on the Display Relay stations when stations N10, N11 or select D11 have been selected. This insures that the holding signal will be released at the end of the Receive Cycle.

The storage process for a Ready or Wait code is given below. There is no explicit Wait code, as such. Rather, the wait condition is specified to be the logical "OR" of three codes: Error, Execute, or Display. The Error key lamp on the keyboard may be changed to a key, with no lamp, titled Marker Forward. The corresponding code would still be used as Wait command to the Calculator, with the actual Error indications being shown in the Display units. The End Receive Cycle pulse strobes the Ready and Wait dwecoding gates 16, and if one of them is true, it sets or clears the Ready/Wait flip-flop 6 accordingly. One of the two lamps, Ready 20a or Wait 20b will be on at all times. The exception is during the first phase of establishing a connection. Both lamps are off because the Ready/Wait flip-flop 8 is cleared at this time, and Not Clear-to-Send is disabling the line to the Wait lamp 20b. The normal Power-On sequence has been described. The related sequence of on/off conditions for the Ready/Wait lamps 20 is as follows. The Power-On switch is depressed, the call is placed, and the hand set is placed in the Coupling Bed. The Frequency Shift Receiver detects the 2025 cycles per second tone from the Computer-End 103-A Dataset and after 1.75 seconds, the Clear-to-Send line goes true. This enables the Wait Lamp 20b and tells the operator the Calculator has established communication with the Data Set at the computer end. After another 0.6 second, an Identification Code is transmitted automatically to the Computer. When the Computer is ready to proceed (normally immediately), it will respond to the Identification Code with a Ready code, which causes the Wait lamp 20b to go off, and the Ready lamp 20a to go on, signifying to the operator that the keyboard has been "unlocked." During the normal course of operation, the computer will send an Execute or Display code, respectively, in response to the depression of these two keys. These codes cause the Wait lamp 20b to go on, signifying to the operator that he must wait until the computer completes the necessary processing, at which time the computer will send a Ready code.

A summary of the storage process for a Keyboard lamp code is given below. The process occurs in two phases. The first phase requires 15 milliseconds and is termed "Time-of-Clear." If the Keyboard Lamp Matrix Select Decoding gate 16a is true, then during this phase, the Matrix Hold Relay Driver 46 is turned off, and the seven Keyboard Data Decoding relays 410 and 411 are all de-energized, and the Keyboard Lamps are all turned off ("cleared"). The second phase, termed "Post-Clear," requires 15 milliseconds or less, according to the pull-in time of the Select and Data Decoding relays. As soon as the Time-of-Clear phase is completed, the Post-Clear phase begins. The two Matrix Select relays 408 and 409 are energized, as are the seven Data Decoding relays 410 and 411 after the path from the Data Line Relay Drivers 45 is broken when the Storage Register 13 changes state. The contacts of the Data Decoding Relays 410 and 411 complete a path through one row and one column of the Keyboard Lamp Matrix 11 and the lamp at this intersection is turned on. Only one lamp in the matrix is on at one time.

A summary of the storage process for the Display code is given below. The process occurs in two phases. The first phase requires 15 milliseconds and is termed "Time-of-Clear." If certain conditions are met, then during this phase, the Display Hold Relay Driver 53 is turned off, and the fitfy-two Display Data Decoding relays, four for each of thirteen Display Relay stations, are all de-energized and the Display Lamps 19 are all turned off ("cleared"). Note that the Displays are all cleared as a group; clearing only one selected Display is not possible. In contrast to the Keyboard Lamp Matrix 11, the Displays are not cleared each time a new code is to be stored. This is to be expected, since normally several digits must be displayed simultaneously in the Display units. As long as the operator is entering successive digits for a particular number, the program will answer back in the alternating conversation mode, addressing successive digits to successive Display units from left to right. The calculator will save all of this information as it is accumulated. However, when the operator finishes entering a number, he will push some "non-numeric" key on the keyboard. This event is remembered by the logic and is the first condition for clearing the Displays. The second condition for clearing the Displays is met when the operator starts to enter a new number (sequence of digits). The program will address the first digit of this number to the far left Display, and at this time the "Time-of-Clear" phase of the Storage Cycle is active, clearing out the previous number. The second phase of the storage process, termed "Post-Clear," requires 15 milliseconds or less, according to the pull-in time of the Station Select and Display Data Decoding relays. As soon as the Time-of-Clear phase is completed, the Post-Clear phase begins. The first phase interval occurs for each code entry, even though no actual clearing is done. One out of thirteen Station Select relays is energized, and the four Display Data Decoding relays, e.g. 406, associated with this station are energized in accordance with the state of the corresponding bits in the Storage Register 13. The Display Hold Relay Drive 53 is on, and becomes the source of holding current for the Display Data Decoding Relays 406 after the path from the Data Line Relay Drivers is broken. This path will be broken the next time the Storage Register 13 changes one of ten to twelve lamps, depending on the particular station. There are twelve Display units, each with a corresponding Display Relay station. In addition, there is a thirteenth Display Relay station for the decimal points. The output lines from the Decimal Points Relay Station are distributed to ten Display units as shown in the tabulation on the block diagram.

FIGURE 7 shows the Keyboard Key Matrix 4 and associated inverters in greater detail. The columns are designated B0 through B13. The switch connections to these columns shows that these terms are normally open when a key is not depressed. The rows are designated S0 through S7.

Keyboard Key Encoding may be described by reference to the Computer Input Code format FIGURE 8 and the Keyboard Key Label Matrix FIGURE 11. The Computer Input Code format FIGURE 8 shows all 256 combinations for the eight-bit code, A through H. The codes are divided into two groups based on the most significant bit, H. When $H=$"1," the 128 codes are used for calculator identification. Each calculator will be wired to a particular code, which is sent automatically when the Power-On switch 78 is depressed. When $H=$"0," the 97 of the possible 128 codes are used to represent each of 97 keys on the keyboard. The correspondence between the codes and the labels on the keys is shown on both the Computer Input Code Matrix and the Keyboard Key Label Matrix. The latter matrix is drawn to show a direct graphical relationship to the keys in the Keyboard Key Matrix 4. The Keyboard Key Matrix 4 shows the 97 single-pole double-throw switches operated by push-buttons termed "keys." The keys are interconnected in rows and columns as shown to drive seven inverters through Keyboard Key Encoding Gates 3. Inspection shows that the outputs of these inverters are encoded true or false in accordance with the indicated codes.

The Computer Output Code Matrix shows all 256 combinations for the eight-bit code, A through H. The codes are divided into two main groups. One group is used to drive the Display Units 9 and the other group is used to drive the Keyboard Lamps 11. Eighty-seven of the Keyboard Lamps 11 are directly under the transparent push-button keys which have the titles shown in the Keyboard Lamp Label Matrix. The 88th lamp is under a cover labeled "No Answer," but there is no corresponding key. The Keyboard Lamp Label Matrix is drawn to show a direct graphical relationship to the lamps in the Keyboard Lamp Matrix 11.

The Keyboard Lamp Matrix 11 has 88 24-volt lamps energized by the contact paths of the seven Keyboard Lamp Decoding Relays 11a, A through G. When power is first applied, all the relays are de-energized, so the "All-Zeroes" position of the Matrix is intersected and no matrix lamp can be on. However, once the Keyboard Lamp Matrix 11 has been addressed, one lamp will be on at all times.

The "All-Zeroes" code may be allowed as a member of the Keyboard Lamp code group. If this is done, it will permit the program to select the Keyboard Lamp Matrix 11 and place it in a state with no lamps on.

The inputs on inverters 54 through 61 are normally grounded, thereby causing these inverters to output a 1. Inverters 62 through 68 of FIGURE 18 are connected to the column indicators B0 through B13 through input diodes. The input diodes act to decode combinations of the B terms. If any of the inputs to the diodes are grounded, the respective inverter will output a 1. If all of the inputs to the diodes are open, the respective inverter will then output a 0. Inverter 62 translates to represent bit G. Inverter 63 translates bit F; Inverter 64, bit E; Inverter 65, bit D; Inverter 66, bit C; Inverter 67, bit B; and Inverter 68, bit A, the least significant bit.

FIGURE 8 represents the computer input code format. A portion of the section in which the H bit is 0 represents the Keyboard Key Code Group A. The portion of the input code matrix which represents the Identification Code Group is section B wherein the H bit is always equal to 1.

FIGURE 9 shows the Keyboard Key Label Matrix corresponding to the Computer Input Code Matrix of FIGURE 8. The Computer Output Code Format is shown in FIGURE 10. The Keyboard Lamp Code Group is shown as section A and the Display Code Group is shown as section B. The Keyboard Lamp Label Matrix FIGURE 11 corresponds to the Computer Output Code Format of FIGURE 10. FIGURE 12 shows the Keyboard Lamp Decoding Relays 69 in greater detail. The bits G, F, E and D serve to feed the columns of Keyboard Lamp Matrix 70. When one of these bits is present, the negative 24 volt signal will be placed on the corresponding column. The bits A, B, and C are connected to the rows of the Keyboard Lamp Matrix 70 and when a ground is connected to one of these rows and a corresponding negative 24 volts is connected to a column, the selected lamp will light. Inverter 71 serves to prevent Selection Relay Drivers 42 from selecting a particular lamp when certain codes are present on the input to the inverter. These codes correspond to the Display Code Group of FIGURE 11. When any of these non-lamp codes are present, the And gate 73 to the Relay Drivers 42 is broken and the Keyboard Lamp Relays are not selected. This insures that keyboard lamps will be responsive only to a Keyboard Lamp Code Group as represented in section A of FIGURE 11.

FIGURE 18 shows in detail, the Keyboard Output Logic section of the Remote Calculator. This section contains the Keyboard Encoding Gates. Inverter 76 has inputs from inverters 66, 67, and 68. Inverter 76 will thus output a 1 only if all S positions of the Keyboard Switching Matrix are opened except S0. Inverter 77 has inputs from inverters 62, 63, 64, and 65. Inverter 77 will thus output a 1 only if any B position of the Keyboard Switching Matrix 4 is closed except B0. And gate 21 is connected to inverter 79 and to the B0 column of the Keyboard Switching Matrix 4. Thus inverter 79 will output a 1 if any B position of the Keyboard Switching Matrix 4 is selected.

The Keydown flip-flop 24 in FIGURE 19 controls the initiation of the Transmit cycle. To set Keydown flip-flop 24 all the inputs to And gate 82 on the set side of flip-flop 24 must be 1's. One input to this And gate is derived from the set output of the Transmit Enable flip-flop 22. Flip-flop 22 will be set by a Clear-to-Send signal from the Frequency Shift Transceiver 7. Another input to And gate 82 is derived from the Clear-to-Send signal from the Frequency Shift Transceiver 7. The clear side of Ready/Wait flip-flop 6 supplies another input to And gate 82. Inverter 24 in FIGURE 26 normally supplies a 1 to And gate 82 and will supply a 0 only if a transmission has not been received from the computer in a predetermined length of time, as will subsequently be described. Thus if the Transmit Enable flip-flop 22 is set and the Ready/Wait flip-flop 6 is in the ready condition and a Clear-to-Send signal is received from the Frequency Shift Transceiver 7, the Keydown flip-flop will set if any key in the Keyboard Switching Matrix 4 is closed, since the fifth input to And gate 82 is derived from inverter 79. When the Keydown flip-flop 24 is set, the 1 input to inverter 85 is inverted. The inverted output of inverter 85 is delayed by Delay Circuit 25 for 6 milliseconds. This delay time is provided to prevent contact bounce from interfering with the logic circuits. The 0 output from Delay Circuit 25 is inverted by inverter 87 and supplied to And gate 88. The And gate 88 has a normal 1 input from the set side of the Abort flip-flop 89. The operation of this flip-flop will be described subsequently.

The other input to And gate 88 comes from the Identification Encoder 2. The output of Identification Code Encoder 2 will be a 1 except for a short period after the Clear-to-Send signal has switched from the Clear-to-Send state to the Clear-to-Send state. If And gate 88 is made, inverter 90 will be in a 1 state. Breaking of And gate 88 by having any of the inputs dropped to a 0 will cause inverter 90 to go from a 1 to a 0 state. When inverter 90 goes from a 1 to a 0 state, Differentiating Circuit 92 will produce an output going from a 0 to a 1 state. Differentiating Circuit 93 likewise will produce an output going from a 0 to a 1 state. The output of Differentiating Circuit 93 is inverted by Inverter 94 and supplied to Inverter 95. Inverter 95 is fed back to the clear side of the Transmit Enable flip-flop 22 to supply a lock-out of the Keyboard after the On key has been pressed in the Keyboard Key Matrix 8. Transmit Enable flip-flop 22 will not set until the transmission cycle for the previously depressed key has been completed. And gate 88 may also be broken by the line coming from the Identification Encoder 2, thus providing outputs on Differentiating Circuit 92 and Inverter 95. If the Clear-to-Send signal from the Frequency Shift Transceiver 7 is in the Clear-to-Send state, and subsequently changes to the Clear-to-Send state inverter 97 will output a 1. Delay Circuit 98 provides a 600 millisecond delay for this 1 signal to allow the circuits in the Remote Calculator and the computer and transmission lines to stabilize. The 1 signal on the input of inverter 97 is passed through the chain of inverters 99 through 103 and appears at the output of inverter 103 as a 0 signal. Since the output of inverter 103 has gone from a 1 to a 0 Differentiating Circuit, 104 produces an output which is passed by Identification Encoder 2 to And gate 88. Identification Encoder 2 inverts the input signal and causes a 0 going pulse of short duration to be applied to And gate 88. The And gate 88 is thereby broken momentarily and outputs appear at Differentiating Circuit 92 and inverter 95. This input serves to initiate an Identification Code transmission to the computer even though no keyboard key has been depressed. This transmission of Identification Code is necessary when several Remote Calculators are to be used with the computer and one of them is to receive data from the computer.

The input to And gate 88 which is derived from inverter 87 will be a 0 if the Keydown flip-flop 24 is cleared. The Keydown flip-flop 24 will be cleared only if the input And gate 33 is made. And gate 33 will be made only if inverters 76 and 54 have 1 outputs. A 1 output from both of these inverters indicate that all S terms in the Keyboard Switching Matrix 4 are closed, i.e. no key in the Keyboard Switching Matrix 4 is depressed. Thus release of the depressed key will cause outputs at Differentiating Circuit 92 and inverter 95. The input to And gate 88 derived from the Abort flip-flop 89 is employed when a key in the Keyboard Switching Matrix 4 has been depressed, but the proper verification signal has not been displayed in the Keyboard Lamp Matrix 11 or Display Matrix 19. When the operator is informed that the incorrect data has been returned by the computer, he presses the Abort flip-flop key. Differentiating Circuit 92 and inverter 95 thus produce an Abort Code signal. This Abort Code along with the transmission of all 0 data bits to the computer indicates that the previous transmission from the Remote Calculator to the computer was in error and results in the computer sending a Ready code and a Reset.

Differentiating Circuit 104 feeds the set input of flip-flop 110 in FIGURE 20. Flip-flop 110 represents the H bit which is activated when Differentiating Circuit 104 produces an output. The H bit is present with each Identification Code and is preceded by a synchronizing pulse, the H bit is equal to 0 at other times. Inverter 62 translates a G bit position pulse and is applied to And gate 106a along with a signal from Differentiating Circuit 92 so as to set flip-flop 111 representing the G bit in the data train. Flip-flops 112, 113 and 114 all have And gates on their respective set inputs. And gate 106b conditions flip-flop 112, And gate 106c conditions flip-flop 113, and And gate 106d conditions flip-flop 114. The inputs to And gates 106a–106d are derived from inverters 62 to 65 respectively, and Differentiating Circuit 92. Flip-flops 111–114 represent data bits G through D respectively. Flip-flops 115–117 represent data bits C–A. The set side of flip-flop 115 is fed by And gate 107. The set side of flip-flop 116 is fed by And gate 108a and the set side of flip-flop 117 is fed by And gate 108b. Differentiating Circuit 93 is fed to the other input of And gate 107, and inverter 95 conditions And gates 108a and 108b. Data is thereby transferred into the respective flip-flops of the Assembly Register 9 in response to the breaking of And gate 88. Differentiating Circuit 93 also applies its output to the set side of Time to Transmit flip-flop 28. When this flip-flop sets, the inputs to inverters 119a and 119b are both 0. This allows the input from inverter 127 to control when the inverter 119a is to output a 1 or a 0. Likewise, inverter 128 will control the output of inverter 119b. When inverter 127 becomes a 0, inverter 119a will output a 1 and when inverter 128 becomes a 0, inverter 119b will output a 1 thus providing alternate clocking pulses to the Transmit Counter. The Transmit Clock is derived from the 60 cycle AC line. Two step down transformers drop the 115 v. A.C. to 6 v. A.C. The secondary winding of one transformer is fed into a 45 degree lag circuit while the other is a 45 degree lead circuit. Hence, the two 6 va. A.C. voltages have a 90 degree phase shift. The 6 va. A.C. sine waves are then full wave rectified and squared up by inverters 121, 122 and flip-flop 124. In order to obtain a two phase clock, a 2 microsecond pulse is generated on each rise time of the square wave. The frequency of this clock is every half cycle of the 60 cycle A.C. sine, or every 8.33 milliseconds. Since the two clocks have a 90 degree phase shift, one phase is displaced from the other by 4.16 milliseconds. The two clocks are then combined to form the Transmit Clock. The timing for the Transmit Clock sequence is shown in FIGURE 13.

Once the two phase clock is enabled and Time to Transmit flip-flop is set, the Transmit Counter begins its nine count cycle. The Counter begins on an odd clock from inverter 119a and sets flip-flop 133. Four milliseconds later an even clock sets flip-flop 136. The Counter continues to increase in count each time an even or odd clock time arrives. (This is *not* a binary counter. The first flip-flop sets, the next, the next, etc.) Once all five flip-flops of the Transmit Counter are set, the last flip-flop 145 sets on an odd clock phase and the next even clock resets flip-flop 133. The Counter flip-flops are now reset in order.

The Counter states, along with the Assembly Register 9, are encoded by inverters 155 and 156, and the result gated into the Transmit flip-flop 32 by the Transmit Clock every 4.16 milliseconds. A detailed explanation of the Transmit cycle may be reference to FIGURE 22.

When flip-flop 133 of the Transmit Counter is set, the output of the Transmit flip-flop 32 drops to a 0. When the Counter steps to its next count, the first data bit (which is the contents of flip-flop 110 or the H bit) is transmitted. On the Counter's third count, the second data bit (contents of flip-flop 111 or the G bit) is transmitted to the data set. The output of the Transmit flip-flop is coupled to output Amplifier 161, which in turn transmits an Acoustic Coupler. This procedure is continued until the eight bit contents of the Assembly Register 9 have been transmitted.

Four milliseconds after the last data bit has been transmited, flip-flop 145 of the Transmit Counter resets with an Even clock. When flip-flop 145 resets, Differentiating Circuit 166 is triggered (4 microsecond pulse) whose trailing edge triggers Differentiating Circuit 167. Differentiating Circuit 167 resets the Assembly Register 9, Storage Register 13, and also resets the Transmit Cycle flip-flop 28. Once the Transmit Cycle flip-flop 20 is reset, the two phase clock is disabled from the Counter and the Transmit Cycle is completed. Since everything is in its initial condition (zero state), the Remote Calculator is now ready to receive a data character.

Input 131 comes from a phase 2, 60 cycle AC, input and input 132 comes from a phase 1, 60 cycle AC, input. The phase 2 signal is passed through inverter 122 to the set side of flip-flop 124. The set side of flip-flop 124 feeds Differentiating Circuit 126 which is connected to inverter 128. Thus periodic output pulses are produced on the output of inverter 128 causing this inverter to go from a 1 level to a 0 level. Similarly, inverter 127 will produce a signal which periodically goes from a 1 level to the 0 level but which is displaced in time from the output produced by the inverter 128. The outputs of Differentiating Circuits 126 and 125 are also applied to Differentiating Circuit 129 which transmit the combined pulse train to Differentiating Circuit 130. Differentiating Circuit 130 produces a pulse train which has twice the number of pulses per second that is produced by inverter 127 or 128. Flip-flops 133, 136, 139, 142 and 145 will be cleared by the Clear-to-Send signal from the Frequency Shift Transceiver 7. The first 1 pulse which appears at the output of inverter 119*a* will thus cause And gate 131 to be made and flip-flop 133 will, therefore, set. Shortly after inverter 119*a* outputs a 1 inverter, 119*b* will output a 1. If flip-flop 133 is set, And gate 134 will be made and flip-flop 136 will set. The next 1 pulse from inverter 119*a* will set flip-flop 139 through And gate 137. The next 1 output from inverter 119*b* will cause And gate 140 to be made, thus setting flip-flop 142. The next pair of pulses from inverters 119*a* and 119*b* will cause the last stage, flip-flop 145 to be set and flip-flop 133 to be cleared.

Inverter 155 is connected to And gates 146 through 151 of FIGURE 23. These And gates are connected to various stages of the Transmit Counter and to various flip-flops in the Assembly Register 9. Inverter 156 has inputs from And gates 152–154 which are also connected to various stages in the Transmit Counter and to flip-flops in the Assembly Register 9. When the Transmit Counter has been cleared, none of the And gates 146–154 are made and inverters 155 and 156 will output a 1. When the Transmit Counter has a count of 1, the flip-flop 133 is set and flip-flop 139 is cleared, thus And gate 146 will be made and inverter 155 will drop to a 0 level. When the Transmit Counter reaches a count of 2, And gate 147 will have 1 input from the set side of flip-flop 139 and the clear side of flip-flop 142. Since Differentiating Circuit 104 always is applied to the set side of flip-flop 110, this input is present on each transmit cycle. And gate 148, however, will be made when the Transmit Counter reaches a count of 2 only if the set side of flip-flop 111 is a 1. The set side of flip-flop will be a 1 only if inverter 62 translated a G bit from the Keyboard Switching Matrix 4. As the count in the Transmit Counter proceeds to a count of 9, each flip-flop in the Assembly Register 9 is sequentially sampled. At the count of 9, And gate 154 will be made if an A bit is translated by inverter 68 and applied to the set input of flip-flop 117. The Transmit Counter has thus produced a series of sequential pulses representing the bits of data stored in Assembly Register 9. The first 0 output from inverter 155 caused by breaking of And gate 146 causes And gate 157 to be broken and inverter 158 will, therefore, output a 1. The 1 output from inverter 158 is applied to And gate 159 along with the clock signal from Differentiating Circuit 130. When And gate 159 is made, flip-flop 32 sets and a 1 output signal is supplied to Output Amplifier 161 which inverts this signal to produce a negative signal representing a 1 on the Transmit Data line.

Whether or not And gates 147–154 are made or broken depends on whether data is contained in bits A–H. If data is present in the associated flip-flop in the Assembly Register 9, inverter 155 will output a 0. If the appropriate data flip-flop contains a 0 data bit, the respective And gate will not be made and inverter 155 will output a 1 which will be inverted to a 0 by inverter 158. The output of inverter 158 is inverted again by inverter 163 and applied to And gate 164. With the arrival of the next clock pulse from Differentiating Circuit 130, flip-flop 32 will clear and a 0 input will be applied to the Output Amplifier 161. Output Amplifier 161 will invert this 0 output to positive voltage signal representing a 0 and will apply this signal to the Transmit Data Line. Thus we see that if two consecutive bits in the Assembly Register 9 are the same, i.e., they are either both 0's or both 1's, the output from amplifier 161 will not change as the counter continues to count. However, if two consecutive bits in the Assembly Register 9 are different, i.e., that is one is a 0 and one is a 1, then flip-flop 160 will change its state in the transmitted data signal from amplifier 161 and will reverse its state. As the count in the Transmit Counter reaches the final count, Differentiating Circuit 166 produces an output at the beginning of the last count. This output is passed through Differentiating Circuit 167 to inverter 168. Inverter 168 breaks And gate 169 of the input of inverter 170 in FIGURE 20. Inverter 170 produces a 1 output which acts to clear the flip-flops in the Assembly Register 9. The output pulse from Differentiating Circuit 167 is also used to clear the Time to Transmit flip-flop 28. The first four flip-flop stages of the Transmit Counter 8 are cleared by inverter 171 of FIGURE 21. The last stage of the Transmit Counter flip-flop 145 is cleared by inverter 172 of FIGURE 26.

Inverters 171 and 172 will both transmit a 1 signal when the Clear-to-Send signal is received from the Frequency Shift Transceiver 7. The output of inverter 171 is also applied to the time to Transmit flip-flop 28 to insure that this flip-flop will be in the clear condition of a Clear-to-Send signal as received. The set output of the Time to Transmit flip-flop 28 is applied to inverter 173 and this inverter feeds And gate 174. A 1 signal on the output of inverter 173 signifies that the Transmit Counter 8 has started and the Remote Calculator is in a transmit cycle. The other input is to And gate 174 from inverter 239 of FIGURE 31. This inverter applies the holding voltage to the keyboard relays to display the incoming data. The translation for inverter 239 will be described later. If both inputs to And gate 174 are present, the Output Amplifier 175 will invert and apply a 0 signal on the Keyboard Holding Line.

The computer, after receiving the translated data from the Remote Calculator, "turns around" the data and sends it back to the Remote Calculator so that it may be displayed in the Keyboard Display Matrix 11 or Display Units 19, thereby verifying the transmitted signal. The computer, after receiving an Execute or Display signal from the Remote Calculator, sends back a Wait signal to the Remote Calculator which places the Ready/Wait flip-flop 6 in the Wait state thereby breaking And gate 82 and preventing further transmission through the Keyboard Matrix 4.

When the Frequency Shift Transceiver 7 has received data from the computer, it sends a 0 signal to input inverter 176 and this inverter outputs a 1 to inverter 179 in FIGURE 25. The 0 output of inverter 179 is applied to inverters 180 and 183. The 1 output from inverter 180 is delayed by a 1 millisecond Delay Circuit 181 for noise rejection. The 1 output from Delay Circuit 181 is inverted by inverter 182. Since both inputs to inverter 183 are 0's, inverter 183 will output a 1. The output of inverter 184 now drops from a 1 to a 0 and Differentiating Circuit 185 puts out a signal that goes from 0 level to a 1 level. The output of Differentiating Circuit 185 will cause the Receive Data flip-flop 186 to be set. The output side of flip-flop 186 connected to inverter 187 is a 0 and is inverted by inverter 187 which outputs a 1. The 1 output from inverter 187 is now delayed for 5 milliseconds. This delay is used to provide a strobe pulse which coincides with the signal interval of the first bit received from the Frequency Shift Transceiver 7. This strobe pulse is shown as Receive Strobe S1 on FIGURE 6. The 1 output from Delay Circuit 188 is inverted by inverter 189 and passed through inverters 190 and 191. The output of inverter 191 drops from a 1 to a 0 and Differentiating Circuit 192 will produce a signal which goes from a 0 to a 1. The 0 output from Receive Data flip-flop 186 is also applied to inverter 204 and through a 9 millisecond Delay Circuit 206. This pulse is then passed to inverters 207, 208 and 209 to Differentiating Circuit 210 which produces a 0 to 1 going signal which is again differentiated by Differentiating Circuit 211 to produce a 0 to 1 going output pulse. This pulse is represented in FIGURE 6 as Receive Strobe S2 and coincides with the interval of the second pulse received from the Frequency Shift Transceiver 7.

The Receive Counter flip-flops 201 to 204 in FIGURE 24 have been cleared by a previous Clear-to-Send signal from the Frequency Shift Tranceiver 7. Arrival of the first pulse from Differentiating Circuit 192 at input And gate 193 will cause flip-flop 201 to set. Coincidence of the first pulse from Differentiating Circuit 211 at And gate 197 will now cause the second rank flip-flop 203 to set. The next pulse from 192 will cause flip-flop 202 to set through And gate 195. The pulse from Differentiating Circuit 211 will cause flip-flop 204 to set through And gate 199. The next pair of Strobe Pulses will clear flip-flops 201 and 203. The following pair of Strobe Pulses will clear flip-flops 202 and 204, thereby completing the count of the counter. Table I shows the count of the counter wherein flip-flop 203 represents bit A and flip-flop 204 represents bit B. Setting of flip-flops 201 and 202 is called phase A and setting of flip-flops 203 and 304 is called phase B in FIGURE 20. When the Frequency Shift Tranceiver 7 transmits a 0 data pulse to the Remote Calculator input, the data line from Transceiver 7 goes to a 1 state. Inverter 176 outputs a 9 and this signal is inverted by inverters 177 and 178 to produce a 1 output on inverter 177 and a 0 output on inverter 178. The 1 output of inverter 177 is inverted by inverter 212 and a 0 is applied to inverters 213 and 216. The signal from inverter 213 is delayed by a Noise Filtering Delay Circuit 214 and passed along inverters 215, 216 and 217 to Differentiating Circuit 218.

The 0 to 1 going output of Differentiating Circuit 218, caused by a signal going from a 1 to a 0 level on the Differentiating Circuit 218, is fed to And gates 219 and 220 on the clear input of Receive Data flip-flop 186. Thus Differentiating Circuit 218 will place the Receive Data flip-flop 186 in the clear state providing that either And gate 219 or 220 is made. And gate 219 derives an input from inverter 223 of FIGURE 24 and this inverter is connected to the clear side of flip-flop 204 and outputs a 1 when flip-flop 204 clears. Flip-flop 204 is cleared on the Receive count of 2 and 3. Inverter 221 feeds And gate 220 and this inverter has its input connected to the clear side of flip-flop 203. Inverter 221 will output a 1 when the Receive Counter 12 has a count of 0 or 1. The receive Data Signal format is represented in FIGURE 6. Before each pair of data bits, a pulse is sent on the input data line. The first Sync pulse is always a 1 to 0 going signal on the input data line and produces a 0 to 1 going output on inverter 176. A 0 to 1 going output on this inverter indicates that a Receive Data signal has been sent and this signal is transmitted by circuits 179 through 184 to Differentiating Circuit 185. Thus the first 1 to 0 going Sync pulse will cause Differentiating Circuit 185 to output a 0 to 1 going signal which will trigger Receive Data flip-flop 186 to its set state. The first pair of Receive Strobes S1 and S2 will be sent out in response to the setting of Receive Data flip-flop 186. The first pulse S1 corresponds to the H data bit and the second pulse S2 corresponds to the G data bit. These two Strobe Pulses are applied to the double rank Receive Counter of FIGURE 24 and are used to step the counter from its initial count of 0 to an initial count of 1, flip-flop 203 is in a set state and flip-flop 204 remains in its cleared state.

Inverter 221 now has a 0 input and therefore outputs a 1 to And gate 220 thus enabling this And gate. The second Sync pulse that is to be received, arrives after the G data bit has been transmitted to the Remote Calculator. The polarity of the second Sync pulse is always opposite to the polarity of the G bit. Thus if the G bit were a 1, the second Sync pulse would be 1 to 0 going signal and would arrive at the receive data flip-flop 186 through Differentiating Circuit 185. However, if the G bit in the data train was a 0, then the second Sync pulse would be a 0 to 1 going signal and would arrive at And gate 220 through Differentiating Circuit 218, and would act to trigger receive data flip-flop 186 through this And gate. Therefore, we see that regardless of the polarity transition of the Sync pulse, the Receive Data flip-flop 186 will be triggered to a set state and two more Receive Strobe pulses will be sent to the Receive Counter 12 to permit the Receive Counter 12 to count to its next count. The third Sync pulse functions in an identical manner to the second Sync pulse. The forth Sync pulse also functions in an identical manner to the second Sync pulse, however, the Receive Strobes S1 and S2 initiated by the fourth Sync pulse act to set the Receive Counter 12 back to its 0 state. When the Receive Counter 12 is in its 0 state, both And gates 219 and 220 will be broken and therefore any further transition of the input data line which acts to set the Receive Data flip-flop 186 must arrive through Differentiating Circuit 185. After the A data bit has been received, the input data line may go from a 0 level to a 1 level if the A bit were a 0. However, since the Receive Counter 12 has been set to a count of 0 and And gates 219 and 220 are broken, this transition will not act to set Receive Data flip-flop 186, and therefore no further Receive Strobes will be initiated.

The Receive Counter flip-flops 203 and 204 are triggered to a clear condition by a Clear-to-Send signal which is applied to these flip-flops by inverter 172. The And gate 230 which is connected to the input of inverter 172 derives another signal from inverter 94 of FIGURE 19. Inverter 94 will output a 1 to 0 going signal when And gate 88 is broken by Identification Code Generator 2 or setting of Abort flip flop 89. Identification Code Generator 2 is initiated by the Clear-to-Send signal. A Clear-to-Send signal will be sent from the Frequency Shift Transceiver 7 when the Transceiver has not made a data connection with the Acoustic Coupler at the computer site. When the phone connection is completed, the Frequency Shift Transceiver 7 will send a Clear-to-Send signal to the input of inverter 238. A Clear-to-Send signal is represented by a 0 on the input of this inverter and this signal is inverted by inverters 238, 228 and 229 and applied as a 1 signal to the And gate 230. Following the transmission of the Identification Code from the Identification Code Generator 2, the output inverter 94 will remain at a 1 level and both inputs to And gate 230 will then be a 1. The output of inverter 172 will then drop to a 0 and the Receive Counter will be free to count in response to the Receive Strobe Pulses S1 and S2.

A Keyboard Clear flip-flop 35 is also provided to trigger the Receive Counter flip-flops 203 and 204 to their clear state. Keyboard Clear flip-flop 35 is connected to the Keyboard Clear Key 34 in a way, such that depression of the key will trigger the Keyboard Clear flip-flop 35 to its set state, and this set state is applied to the set sides of flip-flops 203 and 204. Release of the Keyboard Clear Key 34 will trigger the Keyboard Clear flip-flop 35 back to its clear state. Following the transmission of the Clear-to-Send signal to the Remote Calculator, the Receive Counter 12 is placed in its 0 count state and data is ready to be entered into the Remote Calculator in a normal receive cycle. However, if the Frequency Shift Transceiver 7 has received an erroneous data bit, the Keyboard Clear Light will light. And gate 240 is connected to the clear side of flip-flop 203 and to inverter 224 of FIGURE 24. Both inputs to And gate 240 will be at a 1 level when the Receive Counter is in its 0 count state and this 1 input will be inverted by inverter 233 and applied to Delay Circuit 236. Delay Circuit 236 prevents the build up of the 0 output from inverter 233 for a period of 50 milliseconds. If the output of inverter 233 remains at a 0 level for 50 milliseconds or longer, inverter 241 will output a 1 and this signal will be inverted by inverters 234 and 14 and applied as a 1 signal to the Keyboard Clear Light line. A 0 signal on the Keyboard Clear Light line will turn on the Keyboard Clear Light 15 indicating to the operator that the count of the Receive Counter 12 has not returned to its initial state during the 50 millisecond Receive Count Cycle. This will indicate to the operator that there was an error in the transmission of data from the computer to the calculator and that the Receive Cycle did not terminate properly. Assuming, however, that data was received on the input data line, this data would be passed by inverter 178 to And gates 250 to 257 on the inputs of the input Assembly Register flip-flops in Assembly Register 9 of FIGURE 20.

The other inputs to And gates 250 through 257 are derived from inverters 221 through 224 and inverters 259 and 261. Inputs are also placed on these And gates from Differentiating Circuit 210 and from Receive Counter flip-flops 203 and 204. And gates 250 through 257 are sequentially initiated by the Receive Counter; for example, And gate 250 has inputs from inverters 222, 224, and 261. Inverters 222 and 224 will output a 1 when the Receive Counter is in its 0 count state. Inverter 261 is fed from inverter 260 and will output a 0 to 1 going signal when Differentiating Circuit 192 outputs a 0 to 1 going signal representative of Strobe Signal S1. A 0 signal level on the input to inverter 176 will be passed through inverters 177 and 178 to And gate 250. Therefore, if the Receive Data format has a 1 level at H bit time, And gate 250 will be made and the H bit flip-flop 110 will be triggered to its set state. And gate 251 on the clear input of the G bit flip-flop is conditioned by inverters 178, 222, and 224, and Differentiating Circuit 210. Differentiating Circuit 210 represents the S2 Receive Strobe signal and therefore And gate 251 will transfer the G bit data signal into the G bit flip-flop 111 four milliseconds after the H bit data has been transferred into the H bit flip-flop 110.

After both Receive Strobes S1 and S2 have been sent to the Receive Counter 12, the Counter will count to its 1 state. And gate 252 is conditioned by inverters 221 and 261 and the clear side of flip-flop 204. If inverter 178 indicates that an F bit is present in the receive data train, then the F flip-flop 112 will be triggered to a set state on the receive count of 1 in synchronization with the S1 Receive Strobe Pulse. Similarly, And gate 253 is triggered by the S2 Receive Strobe Pulses and acts to trigger the E bit flip-flop 113 to its set state if inverter 178 is outputting a 1. Inverter 114 representing bit D is conditioned by And gate 254 and will clear to its set state only on a receive count of 2 and the receipt of an S1 Strobe Signal Pulse. Flip-flop 115 representing bit C is controlled by And gate 255 and can set only on a receive count of 2 and a Strobe Pulse S2. Flip-flops 116 and 117 representing data bits A and B are likewise controlled by Strobe Pulses S1 and S2 respectively and may set only when the Receive Counter 12 has reached a count of 3. Therefore, we see that received data is sequentially transferred into the Assembly Register 9 in sequence with the counts of the Receive Counter 12 which responds to the input data line from the Frequency Shift Transceiver 7.

Assembly Register 9 may be cleared if inverter 170 outputs a 1. The input to inverter 170 is connected to And gate 169 which has inputs from inverter 168 of FIGURE 23 which represents the last count of the transmit cycle, and therefore will normally be a 1 output. Inverter 229 is applied to And gate 169 and represents a Clear-to-Send signal from the Frequency Shift Transceiver 7. During the receive cycle time, this input is a 1 and And gate 169 may be broken only by inverter 225. Inverter 225 has And gate 235 on its input which has inputs from the set side of flip-flop 204 and from inverters 259 and 221. And gate 258 will be made when the Receive Counter 12 has reached a count of 3 and the second Receive Strobe Pulse S2 is sent to And gate 258 through inverter 259. The output of inverter 225 is fed to And gate 227 which in turn feeds inverter 276 which triggers Storage Register flip-flops 278 to 285 of FIGURE 27 to their clear states when And gate 277 is broken by a 0 output from inverter 225. Inverter 225 will output a 0 to break And gate 277 prior to the transmission of data from the Assembly Register 9 into the Storage Register 13 to insure that the Storage Register 13 is triggered to a clear state. The triggering of the Storage Register 13 to a clear state occurs when the Receive Counter 12 reaches a count of 3 and Strobe Signal S2 is received on input And gate 258 of inverter 225.

The set inputs of flip-flops 110 through 117 in the Assembly Register 9 are connected to And gates 268 through 275 respectively. The other input to And gates 268 to 275 is received from inverter 267 which passes the signal derived from Differentiating Circuit 265 through inverter 266. The inputs to Differentiating Circuit 265 are derived from the set sides of Receive Counter flip-flops 203 and 204 through And gate 374. Counter flip-flops 203 and 204 will have their set sides dropped from a 1 to a 0 level when the count in the Receive Counter 12 has returned to its initial state. And gates 268 through 275 will be made and the data in Assembly Register 9 will be transferred into the Storage Register 13 at the count of 3. The various inverters found in the outputs of the Storage Register flip-flops 278 to 285 are used to deploy the information in the Storage Register 13 to various locations. For example, inverter 286 is used to feed the set output of flip-flop 278 to the Ready/Wait flip-flop 6. Inverters are employed on the outputs of these flip-flops to provide the necessary drive to the various circuits which are connected to these inverters.

The output of flip-flops 278 through 285 are useful in providing inputs to various translating inverters in the display logic section of the Remote Calculator. For example, inverter 312 in FIGURE 28 has And gate 313 on its input. And gate 313 is supplied by the clear side of flip-flop 285 which represents bit A and by the clear side of flip-flop 284 which represents bit B. Inverter 312 will, therefore, produce a 1 output only if an A or B data bit has been transmitted and will then result in the clearing of flip-flop 6. Inverter 313 has Or inputs from the set side of flip-flop 285, the set side of flip-flop 284, the clear side of flip-flop 283 and the clear side of flip-flop 282. Inverter 313 will output a 1 unless all four inputs are at a 0 level. This inverter, therefore, will output a 1 when the data transmitted to the Remote Calculator is represented by $A \cdot B \cdot C \cdot D$ in standard Boolean algebra notation (for example, $A \cdot B$ represents A and B signal, A or B represents A Or not B). And gate 316 has inputs from the set side of flip-flop 281 representing bit E and from the set side of flip-flop 280 representing bit F. Inverter 314 will, therefore, output a 1 when the receive data is F or $\overline{E}$. Inverter 317 has 3 And gate inputs connected to it, so that each And gate input functions as an Or input to inverter 317. Therefore, all of the And gates must be at a 0 condition in order for inverter 317 to output a 1. And gate 318 has inputs from the set side of flip-flop 280 representing bit F and the set side of flip-flop 279 representing bit G. And gate 319 has an input from the clear side of 282 representing $\overline{D}$. Another input to And gate 319 is applied from the set side of flip-flop 281 representing bit E. A third input to And gate 319 is applied from the set side of flip-flop 279 representing bit B. And gate 320 has 3 inputs, one from the clear side of flip-flop 283 representing bit $\overline{G}$, one from the set side of flip-flop 281 representing bit E and one from flip-flop 279 representing bit G. The output translation of inverter 317 is, therefore, $\overline{G}+\overline{F}\cdot\overline{E}+\overline{F}\cdot C\cdot D$ when inverter 317 outputs a 1.

Inverter 321 has two And gate inputs from And gates 322 and 323 and an Or input from the clear side of flip-flop 282 representing $\overline{D}$. And gate 322 has an input from the clear side of flip-flop 284 representing bit $\overline{B}$ and from the clear side of flip-flop 283 representing $\overline{C}$. And gate 323 has one input from the clear side of flip-flop 285 representing $\overline{A}$ and another input from the clear side of flip-flop 283 representing $\overline{C}$. Inverter 321 will output a 0 only if all three of the inputs to the inverter are at a 1 level. If either And gate 322 or And gate 323 or the clear side of flip-flop 282 has a 1 output or inverter circuit 321 will output a 0. The output of Or inverter 321 is fed to inverters 324, 325 and 326. Inverter 324 has another Or input from the clear side of flip-flop 279 representing $\overline{G}$. A third input to inverter 324 is supplied by the set side of flip-flop 278 representing bit H. The output of inverter 324 will therefore be a 1 when all three inputs are at a 0 level. The output of inverter 321 will be a 0 when the receive data is $\overline{D}+\overline{A}\cdot\overline{C}+\overline{C}\cdot\overline{B}$. The output of inverter 324 will then be a 1 when inverter 321 is a 0 and $\overline{G}\cdot H$ are represented by data bits. Inverter 325 has a clear input from flip-flop 278 representing $\overline{H}$ and a set input from flip-flop 279 representing G and an 1 output from this inverter represents $\overline{H}\cdot G$. Inverter 326 has an input from the clear side of flip-flop 278 representing $\overline{H}$ and from the clear side of flip-flop 279 representing $\overline{G}$. Inverter 327 has three Or inputs, one comes from inverter 312 which represents $A+B$, another input comes from the set side of flip-flop 283 which represents bit C, and the third input comes from the set side of flip-flop 280 representing bit F. Inverter 327 will output a 1 only if all three inputs are 0. The translation of inverter 327 is $\overline{A}\cdot\overline{B}\cdot\overline{C}\cdot\overline{F}$. The output of inverter 327 is fed to And gate 328 which has other inputs derived from the clear side of flip-flop 282 representing $\overline{D}$ and from inverter 296 representing $\overline{E}$, and also from inverter 288 representing $\overline{G}$. And gate 328 can be made only if all bits A to G are in their false or not true state. Inverter 329 will output a 1 when any bit A to G is represented by a 1 or a true state. Inverter 329 feeds And gate 330 on the input to inverter 239 of FIGURE 30. Other inputs to this inverter are supplied by inverters 317 and 286, and the set side of the Time of Clear flip-flop 331. The Time of Clear flip-flop 331 supplies a timing pulse which will be described subsequently. The output of inverter 239 is supplied to And gate 174 which has another input from inverter 173 of FIGURE 21 which indicates that the time to Transmit Counter flip-flop 118 has been triggered to its set state and therefore the Transmit Counter 8 has begun its cycle. And gate 174 supplies a 1 to inverter circuit 175 which in turn supplies a 0 or ground level to the Keyboard Holding Line. The function of the 0 level signal on the keyboard line is to supply a sealing-in or locking-in voltage for selected relays in the Keyboard Lamp Matrix 11. The input to And gate 330 in FIGURE 30 from inverter 286 of FIGURE 27 and inverter 239 will output a 1 only when a $\overline{H}$ bit is present, this insures that Keyboard Holding inverter 175 will output a 0 only for the Keyboard Lamp Code Group of the Computer Output Code Format of FIGURE 10.

The area enclosed by the heavy black line in FIGURE 11 represents the Keyboard Lamp Code Group, and only data represented by this group will act to cause the Keyboard Holding Relay 175 to supply a holding level signal to the Keyboard Lamp Matrix relays. When the storage register is set, inverter 369 sets the Time of Clear flip-flop 331.

Setting of flip-flop 331 by inverter 369 makes And gate 330 and inverter 239 will output a 0 to And gate 174 supplying the Keyboard Holding inverter 175 in FIGURE 28. Inverter 333 of FIGURE 30 has an And gate 332 which is supplied by the same inputs that supplies And gate 330 on inverter 239, except that set side of flip-flop 278 is applied to And gate 332 and the clear output derived from Inverter 286 is applied to And gate 306. If the Time of Clear flip-flop 331 is initially in its clear state, the input to inverter 335 will be a 1 and this signal will be inverted by inverters 337, 338, and 339 to supply a 1 to the input of Differentiating Circuit 340. When the clock signal triggers the Time of Clear flip-flop 331 to its set state, the input to inverter 335 will be a 0. The 1 output from this inverter will be delayed for 15 milliseconds supplying a 15 millisecond-wide Time of Clear Signal. This 1 output will be inverted by inverter 337 and passed through inverters 338 and 339 to the input of Differentiating Circuit 340. The output signal level changes on inverter 339 from a 1 to a 0 level, and Differentiating Circuit 340 then outputs a 0 to 1 going signal which is applied to And gate 341 of FIGURE 28. If the code in the Storage Register 13 represents one of three display positions, namely the sign position, the most left decimal point position, or the most left numeric position, Display Enable flip-flop 342 is triggered to its set state.

Inverter 343 of FIGURE 28 has an input from the B10 column in the Keyboard Switching Matrix 4; when the B10 switch is open, inverter 343 will output a 0. Inverter 344 has an input from the B11 column of the Keyboard Switching Matrix 4. When any key in the B10 column of the Keyboard Switching Matrix 4 has been depressed, the B10 line will drop to a 0 level and inverter 343 will output a 1 signal to inverter 346. When any key in the B11 column has been depressed, inverter 344 will output a 1 to And gate 347 which has its other input connected to inverter 80. And gate 347 will then output a 1 only if a key in the S4 through S7 rows of the Keyboard Switching Matrix 4 has not been depressed. Depression of any key in the B13 column of the Keyvoard Switching Matrix 4 will result in a 1 output from inverter 345 to And gate 348. A diode connects the S6 row of the Keyboard Switching Matrix 4 to And gate 348 and this And gate will be made only if the switch corresponding to column B13 and row S6 is depressed. If any of the inputs to inverter 346 are at a 0 level, inverter 346 will output a 1. A 1 output on inverter 346 represents that none of the numeric keys in the B10 or B11 column of the Keyboard Switching Matrix 4 have been depressed, nor has the decimal point key in the B13 column and the S6 row been depressed. If any key in the Keyboard Switching Matrix 4 other than these aforesaid keys has been depressed, inverter 346 will output a 1. Inverter 351 of FIGURE 29 has And gates 352, 353 and 354 connected to its inputs in an Or fashion and the output of inverter 351 is applied to inverter 355. The input to And gate 352 is supplied by inverter 326, inverter 300 of FIGURE 27 and inverter 295. The translation for this input is $G\cdot H\cdot E\cdot F$. And gate 353 is supplied by inverters 313, 300, the clear side of flip-flop 280, the clear side of flip-flop 279, and the set side of flip-flop 278.

The required condition for making And gate 353 is $\overline{A}\cdot\overline{B}\cdot C\cdot D\cdot E\cdot F\cdot\overline{G}\cdot H$. And gate 354 has its inputs supplied by inverters 314 and 242, the set side of flip-flop 283, the set side of flip-flop 282, and the set side of flip-flop 278. And gate 354 will be made when either of the following two conditions is present, that is when either $C\cdot D\cdot\overline{F}\cdot G\cdot H$ is present or if $C\cdot D\cdot\overline{E}\cdot G\cdot H$ is present. If any of the And gates 352 through 354 are made, inverter 351 will output a 0 which will be inverted by 355 to a 1 signal. The binary translations for inverter 355 are 11XX1111 and 00111001 and XX110X11 and XX11X011. Examination of the first binary codes indicates that it can be found in the Computer Output Format of FIGURE 10 to represent a decimal point in the 11th or most significant place of the displayed signal. The second binary translation represents the 1111 column of the Computer Output Format and therefore indicates the first position or most significant digit position of the displayed data and also includes the Ready and the Disconnect signals. The last two binary representations act to represent coefficients and certain other signs which appear in the first position of the display.

The Clear Display Enable flip-flop 342 of FIGURE 28 is initially in its clear state. When flip-flop 342 is in its clear state, a 1 input will be applied from the clear side of flip-flop 342 to And gate 356. Since the Remote Calculator is not transmitting, the Time to Transmit flip-flop 118 is cleared and will cause inverter 173 to apply another 1 input to And gate 356 in FIGURE 28. If the Storage Register 13 contains one of the three display clearing conditions, inverter 355 outputs a 1 making And gate 356. The output of inverter 357 then goes to a 0 causing the outputs of Relay Drivers 358, 359 and 360 to go to −24 volts dropping out the Display Relays. Fifteen milliseconds after the Time to Clear flip-flop 331 has been triggered to its clear state, Differentiating Circuit 340 will output a 0 to 1 going signal to And gate 341 in FIGURE 28, thus causing flip-flop 342 to be triggered to its set state breaking And gate 356. Breaking of And gate 356 causes inverter 357 to apply a 1 output to inverters 358 through 360 thus causing these inverters to apply a 0 signal to the Display Holding Line thereby activating the sealing-in circuit for relays in the Display Matrix 19. The Display Holding Line will remain active until the Clear Display Enable flip-flop 342 is cleared again.

Depression of any key in the Keyboard Switching Matrix 4 other than a numeric key or the decimal point key represented by column B13 and row S6 will cause inverter 346 of FIGURE 28 to apply a 1 input to And gate 350. Coincidence of this 1 input with an input from inverter 96 will cause And gate 350 to be made and will trigger flip-flop 342 to its clear state. Ready/Wait flip-flop 6 has an And gate on its set input which has 6 inputs. These inputs are inverter 287, inverter 313, inverter 369, inverter 301, inverter 295 and inverter 292. The signal derived from inverter 369 in FIGURE 30 comes from Differentiating Circuit 265 and is used to represent Receive Strobe S2. The signal from Differentiating Circuit 265 is pased through inverters 160 and 368 to the input of inverter 369 and is used as a timing pulse on And gate 361 in FIGURE 30. The other input to And gate 361 translates a binary code of 00111111. This signal indicates that the computer is ready. Making of And gate 361 triggers the Ready/Wait flip-flop 6 to its set state supplying a 0 signal to inverter 363 which is reinverted by inverter 364 and applied as a 0 on the ready line thereby lighting the ready light indicating to the operator that the computer is ready to receive data.

A Clear-to-Send signal from inverter 232 in FIGURE 26 will trigger the Ready/Wait flip-flop 6 to its clear state upon initial turn on and a 1 input from And gate 362 will also trigger flip-flop 6 to its clear state. Both of these conditions will cause the Wait light 206 to light indicating to the operator that the computer is not ready to accept data. And gate 362 has 8 inputs which are inverter 312, inverter 369, the clear side of flip-flop 283, the clear side of flip-flop 282, inverter 296, inverter 293, inverter 292, and inverter 286. And gate 362 will be made when a pulse appears on inverter 269 and the input data is represented by column 0100 and rows 0001 through 0011. Triggering Ready/Wait flip-flop 6 to its clear state results in applying a 1 input to And gate 266. And gate 366 is also supplied by inverter 231 of FIGURE 6 and this And gate will be made when the Clear-to-Send signal is received by the Remote Calculator. Making of And gate 366 will cause inverter 365 to output a 0 on the Wait light 206 thereby lighting the light indicating to the operator that the computer is not ready. The Time of Clear flip-flop is used to initiate the select line in the Display and Keyboard Lamp Matrices. The clear side of Time of Clear flip-flop 331 is applied to inverter 366. Transfer of data from the Assembly Register 9 into the Storage Register 13 is accomplished in response to an output from Differentiating Circuit 160 of FIGURE 30. The output of Differentiating Circuit 160 supplies inverter 369 which in turn is used to trigger the Time of Clear flip-flop 331 to its set state. It is the triggering of the Time of Clear flip-flop 331 to its set state which results in an output from Differentiating Circuit 340. Setting of flip-flop 331 of FIGURE 30 results in a 1 output from inverter 370 which is passed to And gate 371 as is the output from inverter 333. The 1 output of inverter 366 is also passed to And gate 372 as is the output from inverter 373 in FIGURE 21. If either And gate is made, inverter 373 will output a 0 which may be inverted by inverter 310 and 311. The outputs of inverters 310 and 311 are applied to And gates 290, 298, 299, 302, 304, 306 and 308. The function of these And gates is to initiate transfer of data from the Storage Register 13 into the Keyboard Lamp Matrix or Display Select lines. And gates 372 and 371 will both be made only during the Time of Clear pulse from flip-flop 331 if the Keyboard Lamp Matrix Section 4 of the Computer Output Code Format and the Time to Transmit flip-flop 118 has been triggered to its clear state. We see therefore that the set side of flip-flops 278 through 285 in the Storage Register 13 is used to supply the select lines of the Keyboard Display Matrix 11 and Display Matrix 19.

The Display Matrix 19 is grouped into 13 Display Relay Stations, each of which have inputs for bits A through H. Relay Station N0 represents the far right or least significant place in the Display Unit 19 and Relay Station N11 represents the far left or coefficient position for the Display Unit. Relay Station N10 represents the most significant bit station in the Display Unit. The 13th Relay Display Station is used to represent the decimal points. Inverters 388 through 401 of FIGURE 31 are used to select the Display Relay Station desired. Various inputs are applied to And gates 375 through 387 to produce the desired translation for the selected inverters 388–401. For example, And gate 375 will be made when data is present in the Storage Register 13 corresponding to column 0101, and this will result in inverter 388 applying a 0 signal to the end 0 line. The various translations for inverters 388–401 are shown alongside the respective inverter. The dashed lines for bits A through D represent the translation available from either inverter 324, 325 or 326. These translations described previously are used to place the selected data in rows 0000 through row 1010. The translation for inverter 391 is XXXX1110, and this provides that column 0111 is selected all the way from row 0000 through row 1010. The translation for inverter 400 is XX11XX01, and this translation corresponds to columns 1000 through 1011 and rows 1100 through 1111. This is the decimal point section of the Computer Output Code Format. Inverter 401 represents a coefficient and the translation for this inverter is XX110X11 or XX11X011. The output of inverter 401 corresponds to the area included in column 1100 between rows 1100 through 1111 and the area included in column 1110 between rows 1100 through 1111. When the Display Relay Station has been selected, indicating the location of the Display Unit, data will be passed from the Storage Register 13 onto the select lines of the Display Relay Station.

The operation of the Display Relay Station may be explained by reference to inverter 388 of FIGURE 31 which is used to select the N0 Display Relay Station. When inverter 388 outputs a 0 to the Select Relay 404 in FIGURE 5c, this relay will close the contacts of switch 405 and connect the Data Line Relay Drivers with data from the clear side of flip-flops 278 through 285 in the Storage Register 13 to the Select Relays 406. If data is present on any of the Data Line Relay Drivers 45, the appropriate relay in relay group 406 will cause its selected switch in switch group 407 to close. Meanwhile, inverter 175 will supply a 0 signal to the keyboard holding line which will cause any of the relays in the relay group 406 to "lock in" since the necessary drive for the relay is now supplied through the closed switch in the switch group 407. Each Display Relay Station represents a separate position in the display unit, and each display unit will display a number or a figure in that position which is represented by the data bits A through H. Once a coded binary output is obtained at each Display Relay Station, it is a simple matter to connect this binary output to a display unit to represent the desired symbol.

The output of inverter 334 is applied to inverters 402 and 403 which act as the Keyboard Select Relay Drivers 42 of FIGURE 31. Since only one Keyboard Lamp Matrix 4 is provided for the Keyboard, it is necessary only to drive two Select Relays. The two relays are shown in FIGURE 12B as relays 408 and 409, relay 408 controlling the columns for the Keyboard Lamp Matrix 11 and relay 409 controlling the rows for the Keyboard Lamp Matrix 11. Relay group 410 and its associated switch contacts 412 represent the data select relays for the columns in the Keyboard Lamp Matrix 11, while relay group 411 and its associated switches 413 represent the data select line for the rows of the Keyboard Lamp Matrix 11. Figure 126 shows a representative decoding scheme for the Keyboard Lamp Matrix 11. The relays associated with the columns of the Keyboard Lamp Matrix 11 are connected to −24 volts which is passed on to the columns in the Keyboard Lamp Matrix 11 which are connected to a lamp which is in series with the diode. The ground side of the circuit is connected through the rows of the Keyboard Lamp Matrix 11 to the anode of the diode. Therefore, we see that both the row ground level signal and the column −24 volt signal must be present to light a particular light. The switches in FIGURE 12 now are shown in a position where the column represented is 0000 and the row represented is 000. Examination of the Keyboard Lamp Matrix 11 in FIGURE 12c shows that no corresponding lamp or diode is connected in this position. The relay decoding network of FIGURE 12B is now in its normal or undecoded position.

A similar decoding system may be used for each of the Display Relay Stations. The particular Display Relay Station Decoding Group which is used may be adapted from any of a number of prior art decoding systems. The particular Decoding System used in the preferred embodiment of this invention involves an elaborate system and will not be described in detail since it is similar to the system described in FIGURE 12B and since it is very complex and any of a number of well known prior art systems may be employed to decode the contacts of these Display Relay Stations. Once the contacts of the Display Relay Stations are decoded, it is a simple matter to employ any of a number of conventional Display Units 19 to display the desired output. The particular Display Relay Station Decoding System used in the preferred embodiment decodes only bits A through D as shown in FIGURE 5c. It is only necessary to decode these four bits since in this system it is desired only to display decimal figures from 0 through 9. Bits E through H are useful in selecting the particular Display Relay Station which is to display the desired numeral. The system uses 12 Display Units and 13 Display Relay Stations. The N2 Relay Station represents an exponent sign and the N11 Display Relay Station represents a coefficient sign. A decimal point Relay Station is also provided. The decimal point Relay Station has its outputs wired into Display Units N0 and N1 and N3 through N10 and therefore does not require its own Display Unit. While the select lines for Display Relay Station N0 through N10 require only bits A, B, C, and D, the N11 or coefficient sign position and the decimal point select lines require bits E and F also since these two select lines are used to select a limited area of the Computer Output Format. In other words, the use of bits E and F is not necessary in the Display Relay Stations when it is desired only to display numerals 0–9. However, it becomes necessary to decode bits E and F when it is desired to locate a particular Display Section of the Computer Output Code Format since the data in this case is not used to represent a numeral but is used to represent a limited portion of the Computer Output Code Format. Each of the 13 Display Relay Systems is provided with a group of decoding relays.

The Remote Calculator has now been described in detail while the Data Processing System connected to the Remote Calculator has only been described in general terms. The Data Processing System is represented in FIGURE 32 and consists of a Central Processor 415 containing a Central Memory Section and a group of Peripheral Processors surrounding the Central Processor and connected to it. FIGURE 32 shows 8 Peripheral Processors which are called Worker Processors, and they serve responses for the entire Remote Calculator system. Another Peripheral Processor 424 is employed to handle multiple responses to the Calculators, for example, to display results or to effect a disc transfer. Another Peripheral Process 425 is used to handle executive operations. Four Multiplexers are connected to each Worker Peripheral Processor, for example 426–429, and each of these Multiplexers connects through phone lines 430 to 128 Remote Calculators. A total of 4,096 Remote Calculators may, therefore, be connected through phone lines to the Data Processing System.

A Remote Calculator is placed initially into communication with a Multiplexer by sending an Identification Code from the Remote Calculator. One method of generating the initial identification may be by dialing a telephone. This code is recognized by the program in the particular Peripheral Processor that is servicing the Multiplexer, and the subscriber receives a Ready code as an acknowledgment that he may now proceed with computations. The Worker Processor which has received the Identification Code places a "in-use" bit in the initial "tag" word of a section in Central Memory which is reserved for the Remote Calculator that is being serviced. The "in-use" bit serves as a "flag" to the Central Processor 415 and to the Peripheral Processor to indicate that this particular memory block is being used by the Remote Calculator. The initial memory block which is assigned to a particular Remote Calculator consists of 6 words and the initial "tag" word is the first word of the block. A maximum number of 40 keyboard key depressions may be stored in this Central Memory block area. If the operator depresses more than 40 keys without resetting, he is given another larger block to fill. If he fills this block, then the Remote Calculator will be assigned an additional block.

As previously described, a key depression in the Remote Calculator results in data being sent to the Data Processing System, in this case a Worker Peripheral Processor, and a resulting Acknowledgment Code being set by the Data Processing System back to the Remote Calculator. The key depression is also stored in the Control Memory block of the Central Processor 415. The last two key depressions for each of the Remote Calculators are retained within the Work Peripheral Processor. If an Execute or a Display key is depressed, the Worker Peripheral Processor sends an acknowledgment back to the Remote Calculator that consists of a Wait signal which signals the Ready/Wait flip-flop 6 to its wait state and sets a flag in the Central Memory Section. The Central Processor 415 responds to the command given by the Remote Calculator and performs computations.

During the computation time the Central Processor 415 scans the "flags" which have been set by the Worker Peripheral Processor as described above. The "flags" indicate to the Central Processor 415 the necessary action which is to be taken to produce the desired operation as requested by each Remote Calculator. The Central Processor 415 continues to scan the flags which have been set by the Worker Peripheral Processor even when no computation is taking place. Computations in the Central Processor 415 are handled generally on a first in, first out basis whenever possible; however, if a particular computation exceeds a set time limit, the computation is interrupted, shorter computations are completed during the interrupt time and the longer computation is completed after the shorter computations have been made. When the Central Processor 415 has completed a computation, the answer is assembled within the Central Memory and a "flag" is set for the Display Peripheral Processor, requesting that the Display Peripheral Processor send the assembled Answer Code string to the appropriate Remote Calculator.

The Display Peripheral Processor continuously scans the "flag" area in the Central Memory to determine if any codes remain to be sent out to the Calculator. The Display Codes are sent out one at a time to each calculator in turn, until all codes have been set, including a Ready signal for each Remote Calculator. The Display Peripheral Processor is also employed to initiate necessary disc transfers which are requested by the Worker Peripheral Processors or the Central Processors 415.

A disc transfer is necessary when the storage area in the Central Memory Section is exhausted and retained strings are placed on a disc. A mass disc transfer may be requested by either the Central Processor 415 or any of the Worker Processors. Sometimes it will be the Central Processor 415 which will request disc transfers; for example, when it is searching for additional space for a calculator, due to a request by a Worker Peripheral Processor for that calculator. A disc transfer may also be necessary when the Central Processor 415 is assembling an answer and part of the necessary information is contained on the disc. The Worker Peripheral Processor may find it necessary to request a disc transfer when performing a Marker-Backwards or Reset operation. Whenever disc transfers are requested, "flags" are set in the Central Memory requesting that appropriate action be taken by the Display Peripheral Processor. If a particular Calculator has been initiated and information has been transmitted from the Remote Calculator to the Central Processor 415, but a complete operation has not been consummated, the information which has been entered will be placed on a disc and will be recalled when the user begins to hit the keys on the Remote Calculator again. Both disc operations necessary in this case will be discovered and requested by the Worker Peripheral Processors, however, each of the disc transfers are initiated by the Display Peripheral Processors. Errors are detected in the Central Processor 415 and are assembled just as an answer would be in most cases. However, in four exceptional cases, the illigitimate input code, the step error, the Marker-Forward error and Fetch or Retain requests without labels, the Worker Peripheral Processors will detect the error and indicate it in the calculator readout. A record of errors is not kept in the system and the operator must correct his own errors through the use of an error code list. When the Central Processor 415 finds a Display or Execute request in the "flag" section of the Central Memory, the proper segment of the Central Memory block assigned to the particular Remote Calculator being used is employed to carry out the Display or Execute request.

It should be remembered that a particular Remote Calculator is uniquely defined by means of the Remote Calculator station, the Multiplexer, and the Worker Peripheral Processor that is being used. Once a subscriber dials a particular line, his input and outputs are through only one channel until he disconnects. The input string from the particular Remote Calculator being employed is checked for format errors, lack of variable definition, etc., and functions from the library set are evaluated along with the common arithmetic operations. When a Disconnect code is sent from a Calculator, the receiving Worker Peripheral Processor recognizes a code and sets the appropriate flag in the Central Memory Section. The Central Processor 415 will "scan" the flag which has been set and will clear all the 'in-use" bits at the beginning of blocks throughout the Central Memory and all the discs that were occupied by input codes from that particular Calculator. All variable definitions and other retained strings associated with this Remote Calculator are also destroyed. The depression of a key on a Remote Calculator will cause transmission of a unique code to the Multiplexer which is serving it at the time. The Worker Peripheral Processor continuously scan and read the Multiplexers for which they are responsible. Each Multiplexer has a hundred and twenty eight code registers with provisions for indicating that a particular Remote Calculator has transmitted a complete code. When a complete code is transmitted by a Remote Calculator station, the Worker Peripheral Processor sends an acknowledgment to the Remote Calculator and sends the input information to the Central Memory section of the Central Processor 415.

Control keys do not generally result in information which is stored in the Central Memory section, but rather are used to initiate action on information previously placed in the Central Memory section. The function and the operation of the various keys in the Remote Calculator will now be described. The keys provided for the Remote Calculator fall into five major categories: (1) numbers, (2) arithmetic operations, (3) variables, (4) functions (or operations), (5) and controls. Physically, the keys are of two switch types. Numbers are represented by very fast acting fingers tip keys, and all others are respresented by somewhat slower acting switches which light after depression. Number keys do not light, but cause digits to appear in the readout area as an acknowledgment from the computer.

NUMBERS (DATA ENTRY)

The number set consists of the following keys:

0 1 2 3 4 5 6 7 8 9

Numbers are entered in the normal manner. The number 1235 is entered by depressing keys 1 2 3 5 in that order. You may enter numbers directly or you may use scientific notation and the $E_{10}$ (exponent to the power of 10 key).

ARITHMETIC OPERATIONS

The set of arithmetic operations consists of the following keys:

$+-\times\div$—with obvious definition $\sqrt{}$—meaning square root ( ) being left and right parentheses for grouping of expressions (as in algebra)

↑—to indicate that the following value is to appear as an exponent $E_{10}$—for floating point, meaning that the next value is an exponent of the base 10

$\pi$ and $\epsilon$—representing the two constants 3.14159 . . . and 2.71829

Operations of this set cause the switch key to light immediately after depression. Order of operations is interpreted according to ordinary conventions of FORTRAN (which correspond to standard algebra usage). Suppose you want to add the following numbers:

36.5
21.6
17×10²

You must depress the following keys:

Erase 3 6 · 5+2 1 · 6+1 7 $E_{10}$+2 Display

Erase clears all previously entered values. Display causes the display of the result of the requested computation.

VARIABLES

The variable keys consist of the following:

A B C D E F G H S T U V W X Y Z

All of these keys have similar significance, and any can be assigned a value or used as "dummy" variables for operations such as integration, or as arguments of elementary functions such as Sin, Cos, etc.

ALGEBRAIC COMPUTATION

Values may be saved by assigning them to variable names.

8→Z Execute or A=2 Execute

A right arrow means "replaces." An equal sign means "is replaced by." The Execute key is used to cause action. This action is the assigning of value of 8 to the variable Z and a value 2 to the variable A. Execute causes visual display of the value assigned to the variable name. Reset is used to clear out previous statements kept in a working storage area. The End key separates statements as you enter them into the working storage area. Example:

Reset A=1 End B=2 Execute

You can string a sequence of several statements together and Execute them in order.

FUNCTIONS OR OPERATIONS

This set consists of three major categories:

I. *Elementary functions of a single variable*

| | |
|---|---|
| Sin | Sine. |
| Cos | Cosine. |
| Tan | Tangent. |
| ArcSin | Arcsine. |
| ArcCos | Arc cosine. |
| ArcTan | Arc tangent. |
| $Log_{10}$ | Common logarithm (base 10). |
| Ln | Natural logarithm (base $e$). |
| Exp | Exponential ($e$ to a power). |
| Sinh | Hyperbolic sine. |
| Cosh | Hyperbolic cosine. |
| Tanh | Hyperbolic tangent. |

II. *Assigned constants, limits, and separators*

| | |
|---|---|
| Delta | Meaning an increment, as for numerical integration of differentiation. |
| Lower Limit and Upper Limit | Pertaining to points on the real axis, as in limits of integration, or to indicate a range for the argument of a function. |
| Comma | Used as a separator key when entering sequences of values, as in multiple arguments of an operation (such as Mean or Determinant). |

III. *Operations*

| | |
|---|---|
| Integral | Numerical integral of a specified real function of a single real variable. |
| Real Zero | A real zero (if any exists) of a specified real function of a single real variable over the range determined by the values assigned to Lower Limit and Upper Limit. |
| Determinant | The value of the determinant of the specified sequence of number. Entries are read in one single sequence by reading the rows from left to right starting with the top row. The number of entries must be a perfect square. |
| Mean | The mean (or average) of the sequence of values entered (i.e., the sum of the values, divided by the number of entries). |
| Variance | The variance (or average squared deviation from the mean) of the sequence of values (i.e., the sum of the squares of the deviations of the entries from the mean, divided by the number of entries). |
| Standard Deviation | The square root of the variance. |
| Absolute | The absolute value of the specified function (i.e., a positive value, independent of the actual algebraic sign of the functional value). |
| Factorial | The factorial of the specified integer. |

All these keys are acknowledged by interior lights after depression (by the computer). These keys are numbered, with written insets adjacent to describe the function. The meaning of this set of keys can be changed by keyboard operation.

CONTROLS

The set of control keys are for the operator's use and communication with machine. Basically, they can best be thought of in four categories:

*Initiation of use*

| | |
|---|---|
| Power on | Turns calculator power on or off. Light is lit when power is on, off otherwise. Button also serves to reset display when power is turned off and then on again. |

*Mode of use and identification*

| | |
|---|---|
| Job Number | When depressed, followed by an identifying number, labels all succeeding work with the number assigned (for user or account identification). Also clears all storage areas and sets function keys to the standard 24 meanings. |
| Block Mode | When depressed, indicates that keys will be entered sequentially with no action or acknowledgement by the computer, until an execution is indicated by the operator by another depression of Block Mode. |
| Overlays | Used to change the meaning of one of the 24 function keys. |

*Erasure, retention, recall, examination, separation*

| | |
|---|---|
| Delete | Deletes the last character entered, and lights the previous character. |
| Erase | Deletes all previous characters back to the last End key. |
| Reset 9 | Deletes all previous characters entered; in effect starting a clean "working" slate. Does not clear variables or retained sequences. |
| Master Clear | Clears all keyboard registers (does not affect storage areas). |

| | |
|---|---|
| End | Serves as a separator between equations or statements. Also serves to initiate Retain and Fetch operations. |
| Marker | When depressed, causes control to revert to previous End, or to the beginning of the "working" space if no End characters are present. Succeeding characters entered are then "written over" those in position to which control has moved. Also, through use of Step key, characters can be displayed in sequence starting at Marker position. |
| Step | Each depression of the step key causes the Marker to advance one position in the sequence, so that a sequence of characters can be examined by successive depression of the Step key. |
| Retain | Depression, followed by an identifying number, copies and labels all the previous characters entered (after the last Reset). |
| Fetch | Depression, followed by an identifying number, causes the sequence of symbols stored by the corresponding Retain statement (with the same number identification) to be entered starting with the current position of the "working space." In other words, at a particular place in entering a sequence of keys, an operator can issue a Fetch, and this has the same effect as keying-in at that place all the characters stored in the referenced location, in the sequence in which they are stored. |

*Operation, answer, display, error signal*

| | |
|---|---|
| Display | Causes the current value as computed from the last End character of the sequence in the "working space" to be displayed. Does not cause execution of statements that assign values to variables. If the current sequences do not have a value (e.g. because variables have not been assigned values) the Error key will light. |
| Execute 8 | Causes all statements, equations, and indicated computations in the "working space" to be executed, and the last value to be assigned to a variable to be displayed. |
| Error (Light) | This light comes on if a meaningless command is given due to violation of rules (e.g. through an improper Display or Execute command). The Error key must be depressed as an acknowledgment by the operator once it is lit; otherwise, keys depressed will be ignored. |

*Examples of use for general algebraic operations*

| | |
|---|---|
| Problem: | Evaluate the expression Sin $A-(1+A+A^2/2!)$ <br> To retain these statements, the following keys must be depressed: <br> Reset $A+1 \rightarrow A$ End $B=\mathrm{Sin}$ $A-(1+A+A\uparrow+2\div Factorial\ 2)$ Retain 1 End |

At this point, a copy with label 1 has been made of the desired sequence. Now to do the computations, depress the following keys:

Reset $A-0$ End Fetch 1 End Execute

This causes 0 to be assigned to A, then the two statements labeled 1 to be tacked on to the working space; the first statement adds 1 to A (so now $A=1$); the second computes the value of B for $A=1$ displays the result. Note that A remains set equal to 1.

To do the next computation, all that is necessary is: Reset Fetch 1 End Execute; this calculates and displays value for $A=2$, and all succeeding values can be calculated by merely hitting the Execute button once for each new increment (without hitting the Reset key) since working storage contains the appropriate sequence.

The following gives examples using the function and operation keys:

| | |
|---|---|
| Sine | To compute the sine of an angle in radians, (1) depress the key assigned to Sine, (2) depress the single alphabetic key or series of numeric keys to form the argument. If the argument is an algebraic expression, it must be enclosed in parentheses. |
| Problem | Calculate and display Sin 1.5 radians |
| Solution | Depress the following keys: Reset Sin 1.5 Display. |
| Arcsine | To compute an angle in radians, using the Arcsine Function, (1) depress the key assigned to Arcsine, (2) depress the single alphabetic key or series of numeric keys to form the argument. If the argument is an algebraic expression, it must be enclosed in parentheses. Argument greater than the absolute value of one [1] are errors. |
| Problem | Calculate arcsine $(1-e/\pi)$ and display value. |
| Solution | Depress Reset Arcsin $(1-e \div \pi)$. Display. |
| ArcTangent | To compute an angle in radians, using the ArcTangent Function, (1) depress the key assigned to Arc-Tan, (2) depress the single alphabetic key or series of numeric keys to form the argument. If the argument is an algebraic expression, it must be enclosed in parentheses. |
| Hyperbolic Sine | To compute an angle in radians, using the Hyperbolic Sine Function, (1) depress the key assigned to Sinh, (2) depress the single alphabetic key or series of numeric keys to form the argument. If the argument is an algrebraic depression, it must be enclosed in parentheses. |
| Natural Log (Log$_e$) | To compute the Log$_e$ of an expression, (1) depress the key assigned to Log$_e$, (2) depress the single alphabetic key or series of numeric keys to form the argument. If the argument is an algebraic expres- |

| | |
|---|---|
| Problem | Calculate $\log_e(3A+4B)$ where $A=1$ and $B=3/\pi$. |
| Solution | Reset $A=1$ Execute.<br>Reset $B=3\div\pi$ Execute.<br>Reset $\log_e(3\times A+4\times B)$ Display. |
| Exponential | To compute $e$ to a power, using the Exponential Function, (1) depress the key assigned to Expf, (2) depress the single alphabetic key or series of numeric keys to form the argument. If the argument is an algebraic expression, it must be enclosed in parentheses. |
| Problem | Calculate $e^{3(1-.1\pi)}$ |
| Solution | Reset Expf $(3\times(1-0.1\times\pi))$ Display |
| Absolute Value | To compute the absolute value of an expression, (1) depress the key assigned to Absolute value (2) depress the single alphabetic key or series of numeric keys to form the argument. If the argument is an algebraic expression, it must be enclosed parentheses. |
| Problem | Calculate $|\sin 1 - \cos 1|$ and store in B. |
| Solution | REST B=ABSOLUTE VALUE (SIN 1— COS 1) EXECUTE. |
| Factorial | To compute the factorial of an integer, (1) depress the key assigned to Factorial, (2) depress the single alphabetic key or series of numeric keys to form the argument. If the argument is an algebraic expression, it must be enclosed in parentheses. If a non-integer is entered, it is truncated and the Factorial computed on the integer part. Negative arguments are not allowed. |
| Problem | Calculate 10! and display. |
| Solution | Reset Factorial 10 Display. |
| Integral | Method: Trapezoidal Rule. To evaluate the definite integral of a function, using the Integral Function, first enter the lower limit, upper limit and delta using the appropriate keys. Then (1) depress the key assigned to Integral, (2) depress the left parenthesis key, (3) depress the keys required to form the function to be integrated, (4) depress the right parenthesis key. X is always the variable of integration, but is only a dummy variable. |
| Problem | $$\int_0^1 \frac{X \sin S}{\sqrt{1+X^2}} dx$$ in increments of .005 |
| Solution | Reset Lower Limit=0 Execute.<br>Reset Upper Limit=1 Execute.<br>Reset Delta=.005 Execute.<br>Reset Integral ($X$ Sin $X$)<br>$\div\sqrt{(1+X\uparrow 2)})$<br>Display |
| Real Zero | To find a real zero of a general function within a given range, using the Real Zero Function, (1) enter a lower limit and an upper limit using the Lower Limit Function and Upper Limit Function, (2) depress the key assigned to Real Zero, (3) depress the left parenthesis key, (4) depress the keys required to form the argument, (5) depress the right parenthesis key. The method of False Position is used to find a real zero. The function is evaluated at the end points and compared for a sign difference. If the values are of like sign, the function is evaluated at the mid-point and compared for sign difference. Next quarter points etc., until $\frac{1}{2}^8$ is reached. If no sign difference is found, the function is said to have no real zero and 1 plus the upper limit is re-returned as an answer. The only variable is X. All other alphabetical entries in the argument are considered as constants during the computation. |
| Problem | Find a real zero between the limits 1 and 3 of the quantity $X^2-X-2$. |
| Solution | Reset Lower Limit=1 Execute.<br>Reset Upper Limit=3 Execute.<br>Reset Real Zero ($X\uparrow 2-X-2$) Display will result in 2.0 being displayed. |
| Determinant | To compute the determinant of a group of elements, using the Determinant Function, (1) depress the key assigned Determinant, (2) depress the left parenthesis key, (3) depress the key or keys for the first element (to be entered row wise), (4) depress the Comma ( , ) key, (5) repeat 3 and 4 until the last element is entered, (6) depress the right parenthesis key. An error indication will result if the array entered (No. of elements) is not a square. The largest determinant the calculator will allow is 10×10, so that 100 elements is the maximum carry that can be entered. |
| Problem | Evaluate $\begin{vmatrix} 1 & -1 & 2 \\ 3 & 0 & 4 \\ -1 & 2 & 3 \end{vmatrix}$ |
| Solution | Reset Determinant (1, −1, 2, 3, 0, 4, −1, 2, 3). |
| Standard Deviation | To compute the standard deviation of a group of elements, using the Standard Deviation Function, (1) depress the key assigned to Standard Deviation, (2) depress the left parenthesis key, (3) depress the key or keys for the first elements, (4) depress the Comma ( , ) key, (5) repeat 3 and 4 until the last element is entered, (6) depress the right parenthesis key. |
| Problem | Find the Mean, Variance, and Standard Deviation of the set of numbers 1 through 5. |
| Solution | Reset (1, 2, 3, 4, 5) Retain 1 End.<br>Reset Mean Fetch 1 End Display (displays mean).<br>Reset Variance Fetch 1 End Display (displays variance). |

Reset Standard Deviation Fetch 1 End Display (displays standard deviation). The 24 keys above actually refer to subroutines that are standard. Suppose a 25th subroutine, say Inverse Log₁₀, existed in the subroutine library. The operator can substitute this routine for any of the other keys. For example, he can replace the Sin key with it by the following statement:

Reset 25 overlays Sin Execute. From then on, the former Sin key will actually be an Inverse Log key until explicitly changed back, or until Job Number is depressed.

A further example showing interaction of remote calculation and the computer follows:

We will assume that the user wishes to evaluate the expression $$S_0^4 (A \sin \theta - 3\theta^4) d\theta$$

using a .007 integration increment, where the variable A has value of 1.065. The problem would be entered into the Calculator as follows:

Reset A=1.065 End Upper Limit=4 End Lower Limit= O End Delta=.007 Execute Reset Integral $(A \times \sin \theta - 3 \times \theta \uparrow 4)$ Display Action taken will now be presented key by key. In each case, it may be taken for granted that the receiving worker peripheral transmits the response code.

[Reset]

Worker Peripheral Processor clears all in-use flags throughout Central Memory for the Calculator and the corresponding blocks are released. The user's next key depression code will occupy the first position in his initially assigned area. The Reset Code is not transmitted to Central Memory.

[A]

Code is transmitted to Central Memory

[=]

Code is transmitted to Central Memory

[1.065]

Code is transmitted to Central Memory

[End]

Code is transmitted to Central Memory

[Upper Limit][=][4][End][Lower Limit][=][0][End][Delta][=][.007]

Same action for each of these keys.

[Execute]

The Worker Peripheral Processor sets an acting flag in Central Memory. When the flag is found by the Central Processor, the numeric codes, e.g., the codes for 4, .007, etc., are converted to floating point numbers and their values inserted into the variable slots specified. Hence, four variables have been defined. The value to the last-defined variable, in this case Delta, is displayed at the Calculator by the display Peripheral Processor working from a string of codes assembled by the Central Processor after definition of variables has taken place.

[Reset]

Same action as first reset.

[Integral]

Code is transmitted to Central Memory.

[(][A][×][Sin][θ][−][3][×][θ↑][4][)]

Same.

[Display]

The Worker Peripheral Processor sets an action flag in the Central Memory and also passes along the current position of code entries, relative to the beginning of the current Central Memory block being used. When the flag is found by the Central Processor, compilation starts from left of string. When the

[Integral]

Code is discovered, control is transferred to the integration subroutine, which resides in Central Memory along with all other library functions. The integration routine continues compilation of its arguments from left to right after assigning to the first integration value, i.e., the lower limit of integration. When the

[Sin]

Code is encountered, control is given to the Sine routine, which evaluates the Sine of the angle defined by the function. Control returns to the integration routine. Compilation continues, using each operator, e.g.,

[−][(]

as a stopping point for evaluation of the operator's arguments and conversion to floating point of the arguments' values. Variable values are assessed and compiled as any other number would be. The entire expression enclosed by parentheses is evaluated, and a single value results. The integration sub-routine (after the necessary number of iterations peculiar to integral evaluation), returns its final answer to the Central Processor, which, finding nothing more in the input area to be evaluated converts the answer to usable Calculator output codes and places the output string in Central Memory with a "flag" for the Display Peripheral Processor. The Display Peripheral is responsible for outputting the string to the Calculator. FIGURE 33 represents a general flow chart of the operations the Data Processing System undergoes in response to input information from the remote Calculators. The input from the Remote Calculators enters Station 1. Station 1 determines if all stations from the current Multiplexer have been serviced. If all stations on the current Multiplexer have been serviced, control passes to Station 2. Station 2 causes the next Multiplier register to be read into the Worker Peripheral Processor. If all stations on the current Multiplexer have not been serviced, control passes to Station 3. Station 3 causes the next code from the Multiplexer to be read and passes this code to Station 4. Station 4 checks to see if the code is complete and if the code is not complete, it is returned to A on the input of Station 1. If the code is complete, control passes to Station 5. Station 5 checks to see if the code is an identification code. If the code transmitted is an Identification Code, control passes to Station 6. Station 6 sends a Ready signal code to the Remote Calculator and sets an "in-use" flag in the Central Memory. Control is returned by Station 6 to the input of Station 1. If the code send is not an Identification Code, control passes to Station 7 which checks to see if a Disconnect Code has been sent. If a Disconnect Code has been sent, control passes to Station 8 which sets a flag in the Central Memory and returns control to the input of Station 1. If the Disconnect Code has been sent, control passes to Station 9 which checks to see if the code transmitted is a legitimate code. If the code transmitted is not a legitimate code, Station 10 takes control and sets the error flag in the Central Memory section and returns control to input A of Station 1. If the code sent is a legitimate code, Station 11 assumes control and checks to see if a Display Code has been sent. If the code sent is a Display Code, control passes to Station 12 which sets a Central Memory flag and passes control to Station 13.

Station 13 outputs a Display Code to the Remote Calculator and returns control to Station 1. If the code sent is not a Display Code, control is passed to Station 14 which monitors the code to determine if it is an Execute Code or not. An Execute Code will pass control to Station 15 which again sets a Central Memory flag and then passes control to Station 16. Station 16 will output an Execute Code to the Remote Calculator and will return control to Station 1. If the code sent is not an Execute Code, control passes to Station 17 which determines whether or not the code is a Control Key Code. If the code sent is a Control Code, section 18 of the Central Processor will assume control and the Central Processor will perform the requested operation. At the completion of this operation, control will be resumed by Station 1. If the code sent is not a Control Code, control will pass to Station 19. Station 19 will pass control to Station 20 if the code sent is an End Code. Station 20 determines if a Fetch, Retain or Job operation should be started. If Station 20 determines that a Fetch, Retain or Job operation should be started, control is passed to Station 21 which sets a Central Memory flag and which returns control to Station 1. If Station 20 determines that none of these three conditions obtains, control is passed to Station 22. Control is also passed to Station 22 if the code sent is not an End code. Station 22 acts to write the code into Central Memory store and returns control back to Station 1. This flow chart shows the overall general operation of the Data processing System in response to inputs from the Remote Calculator. It should be noted that the represented Stations 1 through 22 are not necessarily representative of physical components. Some of the stations may represent physical components while other stations may represent steps in a program. An important feature of this invention is the combination of the Remote Calculator with a Data Processing System which is designed to respond in specified ways to signals from the Remote Calculator. The Remote Calculator Data Processing System includes not only the Remote Calculator Keyboard, but also the combination of the Remote Calculator with the Data Processing System to supply the operator with results of a requested operation. The stations of the general flow chart in FIGURE 21 represent the information loop between the operator and the Data Processing System. It is through the interaction of the preconditioned Data Processing System and the Remote Calculator that important features of the present Data Processing System realized.

Modifications of this invention may become apparent to those skilled in the art and the preceding description and accompanying drawings are to be interpreted as illustrating but not limiting the true scope of the invention in what is claimed, which is:

1. A data processing system comprising:
   (a) a plurality of remote communicators each provided with:
   (1) Operator controlled input signal generating means representative of a particular arithmetic operation requested by the operator,
   (2) a first output display means representative of the result of the requested arithmetic operation,
   (3) a second output display means representative of the requested arithmetic operation and
   (4) a selection means to selectively energize the first or the second display means and
   (b) a data processing complex in communication with the plurality of remote communicators that is conditioned to respond to the arithmetic operation requested by sending a verification signal to the selection means of the particular requesting remote communicator for causing the selection means to select the second output display means to display the verification; the data processing complex being further conditioned to perform the requested arithmetic operations and to send a result signal representing the result of the requested arithmetic operations to the selection means of the particular requesting remote communicator for causing the selection means to select the first output display means to display the result.

2. A remote communicator capable of requesting a data processor to perform an arithmetic operation having a receiving section comprising:
   (a) an input register coupled to an input line to receive and store data representative of a requested arithmetic operation and of the result of the requested arithmetic operation received from the data processor;
   (b) a storage register coupled to the input register;
   (c) a timing network coupled to an input line for receiving a control signal from the data processor, the timing network being coupled to the input register and to the storage register to control transfer of data from the input register to the storage register;
   (d) a selection means coupled to the storage register and adapted to recognize whether data stored in the storage register represents the result of the requested arithmetic operation or the requested arithmetic operation;
   (e) a first display means coupled to the selection means to display the result of the requested arithmetic operation;
   (f) a second display means coupled to the selection means to display a verification of the requested arithmetic operation;

3. A remote communicator having a receiving section comprising:
   (a) a counter coupled to an input line from a data processor to receive data bits during predetermined intervals, the counter adapted to count in response to the data bits received;
   (b) a normally unresponsive indicator driving circuit coupled to the counter and adapted to respond by emitting a signal if no data bit is received during the predetermined interval; and
   (c) an indicator coupled to receive the signal emitted by the indicator driving circuit.

4. A data processing system comprising:
   (a) a remote signal generating means constructed to generate a signal representative of a requested operation, the remote signal generating means having a first display means representative of the result of the operation and a second display means representative of the operation and a selection means for selecting the first and the second display means;
   (b) a data processing means configurated to perform the requested operation and to send signals representative of the result of the requested operation and of the requested operation to the selection means thereby causing the selection means to select the first output display means to display the result of the requested operation and the second output display means to display the requested operation.

References Cited

UNITED STATES PATENTS

| | | | |
|---|---|---|---|
| 3,032,746 | 5/1962 | Kautz | 340—172.5 |
| 3,071,753 | 1/1963 | Fritze et al. | 340—153 |
| 3,187,321 | 6/1965 | Kameny | 340—345 |
| 3,307,156 | 2/1967 | Durr | 340—172.5 |
| 3,323,119 | 5/1967 | Barcomb et al. | 340—324 |

ROBERT C. BAILEY, *Primary Examiner.*

R. B. ZACHE, *Assistant Examiner.*